(12) United States Patent
He

(10) Patent No.: US 12,133,610 B2
(45) Date of Patent: Nov. 5, 2024

(54) COOKING SYSTEM COMPRISING DIFFERENT COOKING APPARATUSES

(71) Applicant: Zhengxu He, Reno, NV (US)

(72) Inventor: Zhengxu He, Reno, NV (US)

( * ) Notice: Subject to any disclaimer, the term of this patent is extended or adjusted under 35 U.S.C. 154(b) by 599 days.

(21) Appl. No.: 17/070,059

(22) Filed: Oct. 14, 2020

(65) Prior Publication Data

US 2021/0321822 A1    Oct. 21, 2021

Related U.S. Application Data

(60) Provisional application No. 63/012,193, filed on Apr. 19, 2020.

(51) Int. Cl.
*A47J 37/12* (2006.01)
*A47J 44/00* (2006.01)

(52) U.S. Cl.
CPC ............ *A47J 37/1228* (2013.01); *A47J 44/00* (2013.01)

(58) Field of Classification Search
CPC ............................ A47J 37/1228; A47J 44/00
See application file for complete search history.

(56) References Cited

U.S. PATENT DOCUMENTS

| | | | |
|---|---|---|---|
| 2014/0161946 A1* | 6/2014 | Torricelli | A47J 43/0716 99/348 |
| 2014/0230660 A1* | 8/2014 | He | A47J 27/14 99/325 |
| 2015/0013550 A1* | 1/2015 | Lin | A47J 37/1228 99/404 |
| 2018/0132649 A1* | 5/2018 | He | B65B 43/16 |
| 2018/0249861 A1* | 9/2018 | Hiatt | A47J 36/00 |
| 2018/0279835 A1* | 10/2018 | He | A47J 36/06 |
| 2018/0310773 A1* | 11/2018 | Sekar | A47J 44/00 |
| 2019/0069722 A1* | 3/2019 | He | A47J 37/1228 |

FOREIGN PATENT DOCUMENTS

JP          2015043761 A   *   3/2015

* cited by examiner

*Primary Examiner* — Helena Kosanovic
*Assistant Examiner* — Thao Uyen Tran-Le

(57) ABSTRACT

The present application discloses a cooking system comprising more than one cooking apparatuses, each capable of cooking a food. A first cooking apparatus can boil or deep fry food or food ingredients to produce a semi-cooked food. The semi-cooked food may be cooked or mixed in a second cooking. The cooking apparatuses work together to produce cooked foods. A computer system is used to control the cooking system.

21 Claims, 55 Drawing Sheets

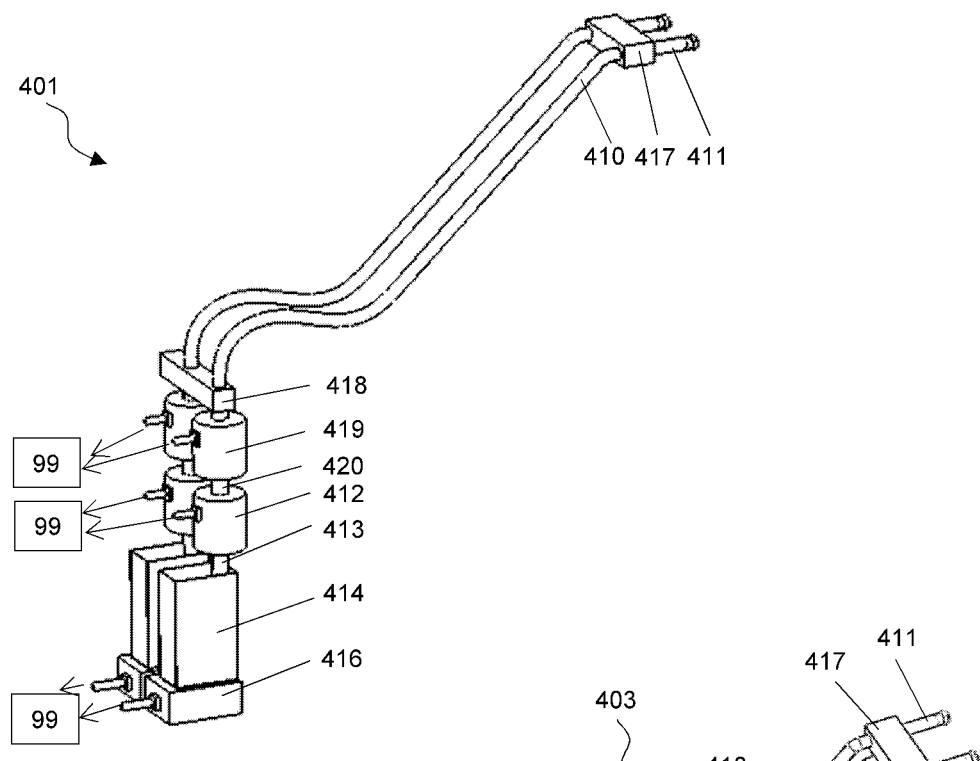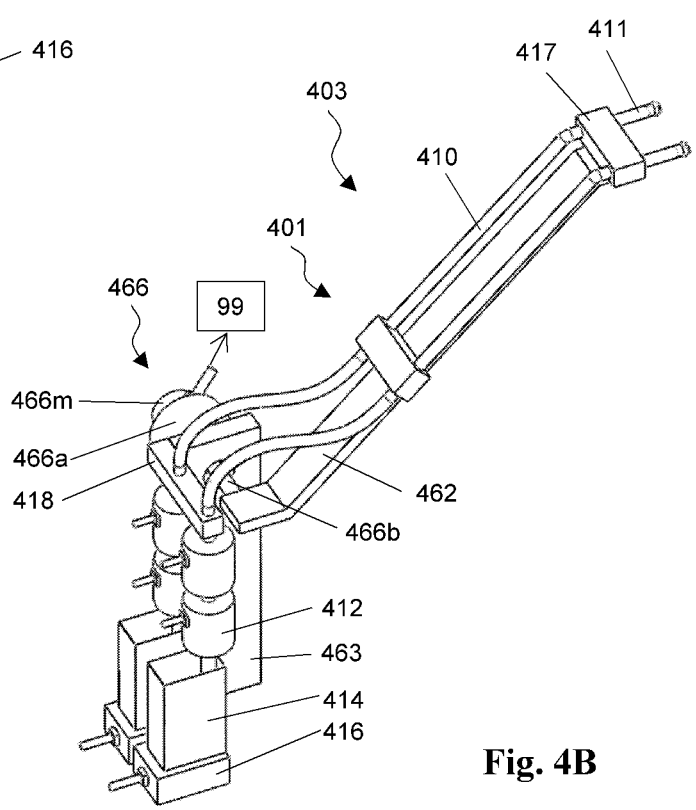
Fig. 4A
Fig. 4B

```
┌─────────────────────────────────────────────────────────────────────┐
│ The computer system 99 is configured to store a program configured to send or │
│ receive signals to and from the motion mechanisms, inductive stoves, temperature │
│ sensors, and pumps of the cooking system 901. 711                   │
└─────────────────────────────────────────────────────────────────────┘
                                  ↓
┌─────────────────────────────────────────────────────────────────────┐
│ The computer system 99 comprises a database. 712                    │
└─────────────────────────────────────────────────────────────────────┘
                                  ↓
┌─────────────────────────────────────────────────────────────────────┐
│ The computer system 99 stores the IDs of the cooking apparatuses, dispensing │
│ apparatus, liquid dispensing mechanism, ingredient dispensing mechanism, │
│ cookware cleaning mechanism, transport systems. 713                 │
└─────────────────────────────────────────────────────────────────────┘
                                  ↓
┌─────────────────────────────────────────────────────────────────────┐
│ The computer system 99 stores the information of the structure of each vehicle of │
│ the transfer system 302. 714                                        │
└─────────────────────────────────────────────────────────────────────┘
                                  ↓
┌─────────────────────────────────────────────────────────────────────┐
│ The computer system 99 stores programs for controlling the transport system 302 │
│ and the receiving system 690, said programs are configured to control a vehicle 790 │
│ to move to a position near a cooking apparatus of the cooking system 901, so that an │
│ ingredient container on a holder of a vehicle of the transport system 302 is at a │
│ dispensing position relative to a cooking apparatus at a pre-scheduled time, and said │
│ programs are also configured to control a vehicle 760 to move to a position near the │
│ transfer mechanism 670 of the receiving system 690. 715             │
└─────────────────────────────────────────────────────────────────────┘
                                  ↓
┌─────────────────────────────────────────────────────────────────────┐
│ The computer system 99 stores a list of food items which can be cooked by the │
│ cooking system 901. 716                                             │
└─────────────────────────────────────────────────────────────────────┘
                                  ↓
┌─────────────────────────────────────────────────────────────────────┐
│ For each food item of the list of Step 716, the computer system 99 stores a cooking │
│ program configured to control the motion mechanisms, inductive stoves, pumps and │
│ devices in the cooking system 901. 717                              │
└─────────────────────────────────────────────────────────────────────┘
                                  ↓
┌─────────────────────────────────────────────────────────────────────┐
│ For each food item of the list of Step 716, the computer system 99 stores types and │
│ quantities of food ingredients, relative timing of their dispensing and the respective │
│ ID of the destination cooking apparatus for each ingredient. 718    │
└─────────────────────────────────────────────────────────────────────┘
```

Fig. 26

The computer system 99 is configured to store a program configured to send or receive signals to and from the motion mechanisms, inductive stoves, temperature sensors, and pumps of the cooking system 902. 731

↓

The computer system 99 comprises a database. 732

↓

The computer system 99 stores the IDs of the cooking apparatuses, dispensing apparatus, liquid dispensing mechanism, ingredient dispensing mechanism, cookware cleaning mechanism, transport system. 733

↓

The computer system 99 stores the information of the structure of each vehicle of the transfer system 302. 734

↓

The computer system 99 stores programs for controlling the transport system 302 and the receiving system 690, said programs are configured to control a vehicle to move to a position near a cooking apparatus of the cooking system 902, so that an ingredient container on a holder of a vehicle in the transport system 302 is at a dispensing position relative to a cooking apparatus at a pre-scheduled time, and said programs are also configured to control the transport component 890 to move, so a food container 182 may move and stop at a pre-scheduled time at a position. 735

↓

The computer system 99 stores a list of food items which can be cooked by the cooking system 902. 736

↓

For each food item of the list of Step 736, the computer system 99 stores a cooking program configured to control the motion mechanisms, inductive stoves, pumps and devices in the cooking system 902. 737

↓

For each food item of the list of Step 736, the computer system 99 stores types and quantities of food ingredients, relative timing of their dispensing and the respective ID of the destination cooking apparatus for each ingredient. 738

Fig. 33

COOKING SYSTEM COMPRISING DIFFERENT COOKING APPARATUSES

This application claims the benefit of U.S. Provisional Application Ser. No. 63/012,193 filed Apr. 19, 2020, the disclosures of which are hereby incorporated herein by reference in their entireties.

CROSS-REFERENCE TO RELATED APPLICATIONS

U.S. Provisional Patent Application

Ser. No. 63/012,193; Filed Apr. 19, 2020, Inventor: Zhengxu He

U.S. Patent Applications

Ser. No. 15/706,136, filed Sep. 15, 2017, Inventor: Zhengxu He
Ser. No. 15/801,923, filed Nov. 2, 2017, Inventor: Zhengxu He
Ser. No. 15/798,357, filed Oct. 30, 2017, Inventor: Zhengxu He
Ser. No. 16/155,895, filed Oct. 10, 2018, Inventor: Zhengxu He
Ser. No. 16/510,982, filed Jul. 15, 2019, Inventor: Zhengxu He
Ser. No. 16/517,705, filed Jul. 22, 2019, Inventor: Zhengxu He
Ser. No. 16/997,196, filed Aug. 19, 2020, Inventor: Zhengxu He
Ser. No. 16/997,933, filed Aug. 20, 2020, Inventor: Zhengxu He
Ser. No. 17/069,707, filed Oct. 13, 2020, Inventor: Zhengxu He U.S. Patent U.S. Pat. No. 10,455,987, issued Oct. 29, 2019, Inventor: Zhengxu He.

BACKGROUND OF THE INVENTION

The present application relates to a cooking system for producing a cooked food from food or food ingredients. In the cooking of a food, e.g. a dish of food, one or more of the following steps are possibly required: (1) a first food or food ingredient is deep fried in oil or boiled in water; (2) a second food or food ingredient is stir fried or otherwise cooked in a wok or other cookware; (3) the above cooked foods are dispensed into a food container; (4) some powder or solid food or food ingredients are added to said food container; and (5) some liquid ingredients are added to said food container.

A cost-effective cooking apparatus or cooking system that does (some or) all of the above steps is important, as it can save labor and cost.

Furthermore, cost-effective transportation of food or food ingredients and dispensing into cookware or cooking containers are also important. Cost-effective transportation of the food containers is also important. The automation of such a cooking system depends on new computer algorithms.

BRIEF SUMMARY OF THE INVENTION

A cooking system here comprises some cooking apparatuses and other mechanisms and/or apparatuses. The present patent application discloses some cooking apparatuses comprising one or more of the following parts: (1) a plurality of baskets (or cooking containers) each configured to contain or otherwise hold food or food ingredients; (2) a plurality of basket holders each configured to position or hold a basket and a motion mechanism configured to cyclically move said holders and the baskets held by said holders; (3) a dispensing apparatus configured to grip and move a basket held by a said holder, said dispensing apparatus may be used to dispense a cooked or semi-cooked food held in a basket to a food container; (4) a liquid container configured to contain a liquid (e.g., oil for frying, water for boiling) and a heater configured to heat the liquid therein; (5) a cookware configured to contain or otherwise hold food or food ingredients for the purpose of cooking a food; (6) a stirring motion mechanism configured to move the cookware to stir or mix the food or food ingredients contained in the cookware; (7) a dispensing motion mechanism configured to directly or indirectly move the cookware to dispense a cooked or semi-cooked food into a food container; (8) a transport apparatus configured to move a food container to receive a cooked food from a said basket, and also to receive a cooked food from said cookware; and (9) a dispensing apparatus which dispenses food or food ingredients into the cookware and/or a basket (or cooking container), etc.

BRIEF DESCRIPTION OF THE SEVERAL VIEWS OF THE DRAWINGS

FIG. 4A shows an aerial view of a liquid dispensing sub-mechanism. FIG. 4B shows an aerial view of a liquid dispensing apparatus comprising the liquid dispensing sub-mechanism.

FIG. 26 is a flow chart showing the procedures of the computer system of the cooking system of FIG. 23 prior to cooking of a food.

FIG. 33 is a flow chart showing the procedures of the computer system of the cooking system of FIG. 30 prior to cooking of a food.

DETAILED DESCRIPTION OF THE INVENTION

For the present patent application, a food ingredient refers to any of the foods or substances that are combined to make a particular food, e.g. a dish of food. A food ingredient can be raw or pre-cooked. A food ingredient can be solid, powder, liquid, or a mixture, etc. A food ingredient can be raw meat, sausage, fresh vegetable, dry vegetable, cooking oil, vinegar, soy sauce, water, or salt, etc.

For the present patent application, a computer system is meant to be any system or apparatus that includes one or more computers. A computer system may or may not include a database. A computer system may or may not include a network. A computer system may or may not include a memory shared by more than one computers. A computer system may include software. A single computer with software can be considered to be a computer system.

For the present patent application, a shaft always comprises an axis. A shaft can have different shapes at different sections. A sectional shape of a shaft can be round or rectangular, or of other shapes. For the present patent application, a rotational movement refers to a rotational movement around an axis. A rotational mechanism refers to any mechanism comprising two mating parts which are constrained to rotate relative to each other; the axis of the relative rotation is referred to as the axis of the rotational mechanism. An example of a rotational mechanism comprises a shaft and a bearing housing as mating parts, wherein the shaft and bearing housing are connected by bearings and accessories.

In some applications or embodiments, a motor comprises a base component (e.g., a frame) which is a stationary member of the motor, and a shaft which is a moving member of the motor, wherein a (usually rotational) motion of the shaft relative to the base component can be produced. A motor may be connected to a computer via wires, and/or through a driver, and/or a controller and/or a relay and/or a wireless communication device. The base component of a motor may be referred to as the support component of the motor.

Similarly, an encoder may comprise a base component, and a shaft which is rotatable relative to the base component, where the encoder can detect the degree of rotation of the shaft relative to the base component, and then inform a computer of the degree by sending signals to the computer.

Various parts of our cooking apparatuses and cooking systems are described below.

Figure 1:
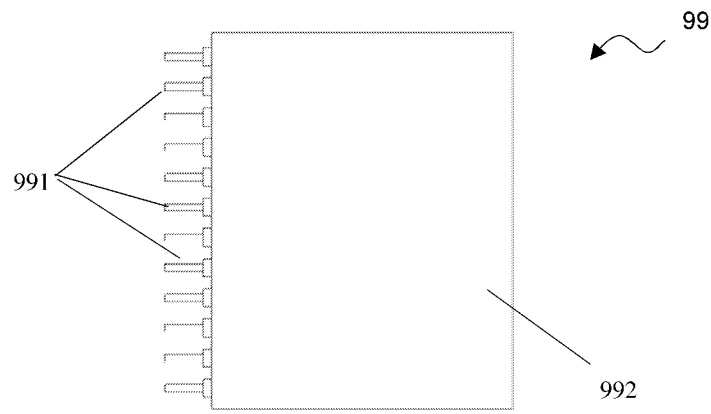
FIG. 1 shows an aerial view of a computer system.

Referring to FIG. 1, a computer system 99 comprises a computer 992 with I/O ports 991. Via said I/O ports 991, said computer 992 may be connected to other electric or electronic parts including but not limited to: motors (including motors with controllers), actuators, inductive stoves, sensors, etc., so that the computer may communicate with said devices by known techniques. The connection of the computer 992 to said electric or electronic parts may comprise wires, wireless communication devices, controllers, drivers, and/or circuit boards. The computer system 99 may control motors, actuators; stoves or heaters; and other devices by known techniques.

It should be noted that the computer system 99 may further comprise additional computers, a computer network, a database, computer programs, wireless communication ports, and/or other electric and electronic components.

A connection of said computer system 99 to an electric or electronic device may comprise a connection of a computer of said computer system to said device. Thus, a device is connected to said computer system 99 if said device is connected to a computer of said computer system.

Figure 2A:
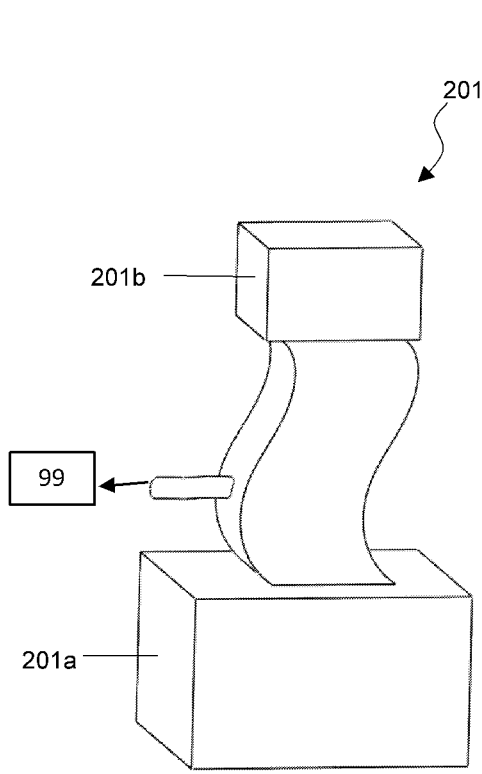
FIG. 2A shows an aerial view of a motion mechanism.

Referring to FIG. 2A, a motion mechanism 201 comprises a stationary member 201a and a moving member 201b, which is connected (but not rigidly connected) to the stationary member. In many applications the movement of the moving member 201b is constrained relative to the stationary member 201a. The motion mechanism 201 comprises a driving mechanism (not shown in figure) configured to produce a motion of the moving member 201b relative to the stationary member 201a. The motion mechanism 201 may be connected to the computer system 99 of FIG. 1 via wires or by wireless means and the computer system 99 may be configured to control the timing and speed of the motion mechanism 201.

The motion mechanism 201 is a generic motion mechanism. Implicitly, the motion mechanism 201 includes a connection configured to connect the moving member to the stationary member, wherein said connection may often comprise bearings, sliders, kinematic pairs, and/or transmission mechanisms. The driving mechanism may be connected to the computer system 99 (via wires or by wireless means). The driving mechanism may be powered by electricity or other energy sources. A typical example of driving mechanism is a motor.

Figure 2B:
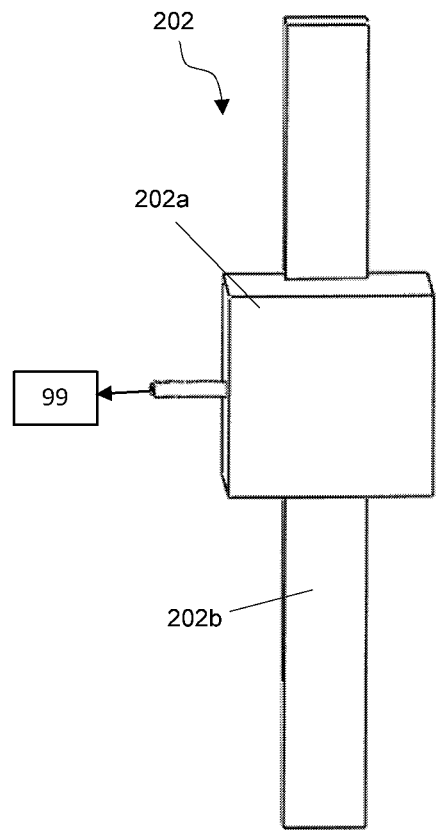
FIG. 2B shows an aerial view of a linear motion mechanism.

Referring to FIG. 2B, a linear motion mechanism 202 comprises a stationary member 202a and a moving member 202b, wherein the moving member 202b is constrained to move linearly relative to the stationary member 202a. The linear motion mechanism 202 comprises a driving mechanism (not shown in figure) configured to produce a linear motion of the moving member 202b relative to the stationary member 202a. The linear motion mechanism 202 may be connected to the computer system 99 of FIG. 1 via wires or by wireless means, and the computer system 99 may be configured to control the timing and speed of the linear motion mechanism 202.

The linear motion mechanism 202 is a generic one. Examples of linear motion mechanism include but are not limited to: a linear actuator; a mechanism comprising linear rail, a slider configured to slide linearly on the linear rail, and a driving mechanism configured to drive the linear motion of the slider; etc.

It should be noted that the linear motion mechanism 202 may comprise an electric (or pneumatic, hydraulic) putter, or other types of putter. The linear motion mechanism 202 may include a motor which produces a rotational motion and a transmission mechanism configured to convert a rotation into a linear motion; wherein the transmission mechanism may optionally comprise a gear and rack, a screw rod and nut, or a sprocket and chain, etc.

A linear motion mechanism (such as the mechanism 202) is called a vertical motion mechanism if the direction of the linear motion is vertical. A linear motion mechanism (such as the mechanism 202) is called a horizontal motion mechanism if the direction of the linear motion is horizontal.

Figure 2C:
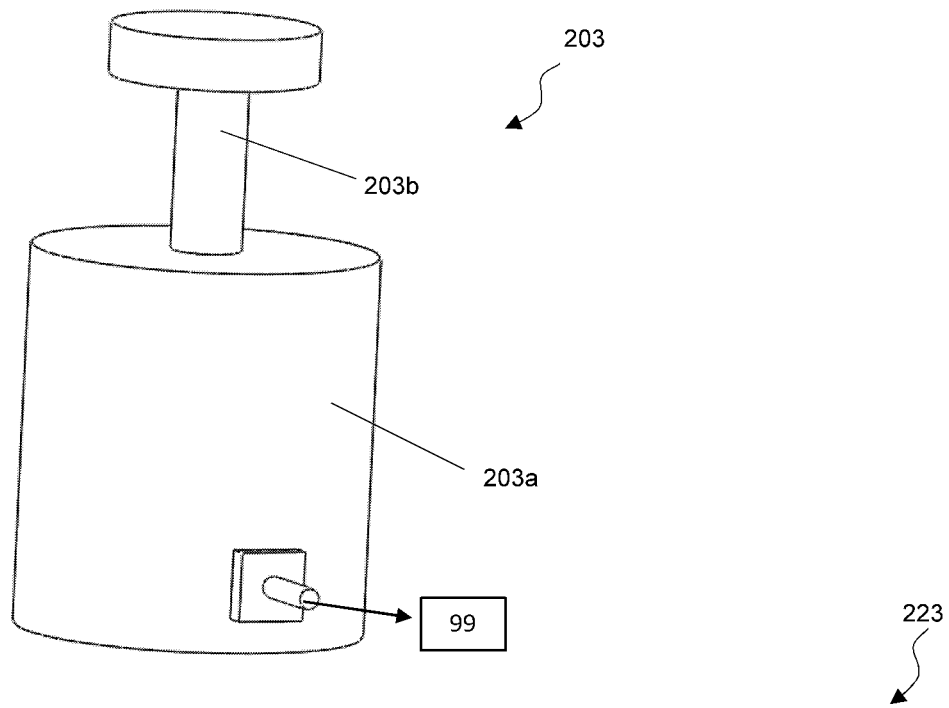
FIG. 2C shows an aerial view of a rotational motion mechanism.

Referring to FIG. 2C, a rotational motion mechanism 203 comprises a stationary member 203a and a moving member 203b which is constrained to rotate relative to the stationary member 203a. The rotational motion mechanism 203 comprises a driving mechanism (not shown in figure) configured to produce a rotation of the moving member 203b relative to the stationary member 203a around an axis, wherein the axis of the rotation is referred to as the axis of the rotational motion mechanism. The rotational motion mechanism 203 may be connected to the computer system 99 of FIG. 1 via wires or by wireless means, and the computer system 99 may be configured to control the timing and speed of the rotational motion mechanism 203.

Figure 2D:
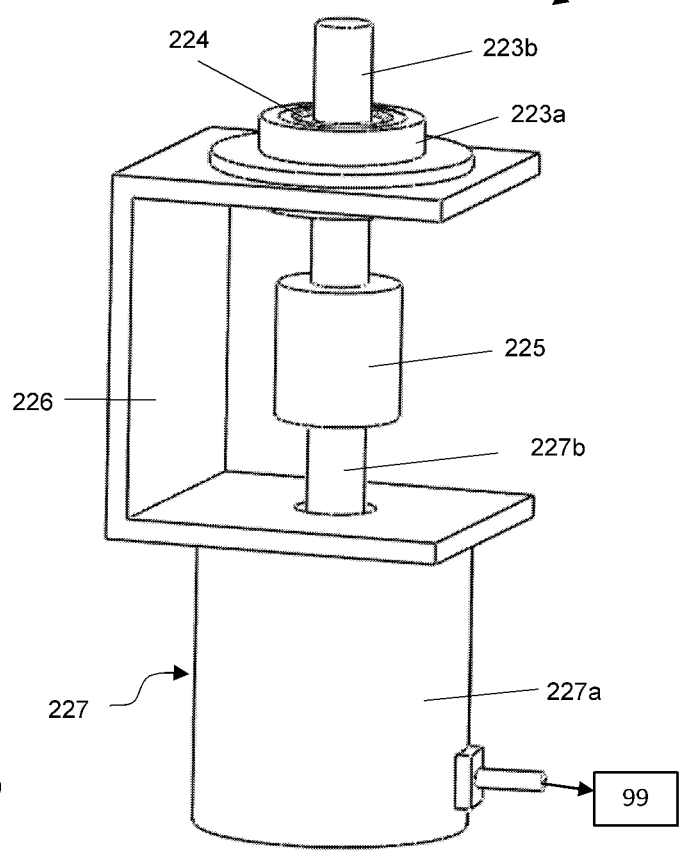
FIG. 2D shows an aerial view of a rotational motion mechanism.

Referring to FIG. 2D, a rotational motion mechanism 223 comprises: a bearing housing 223a as a stationary member; a shaft 223b as a moving member; and a motor 227 as a driving member, i.e., a driving mechanism. The bearing housing 223a and the shaft 223b are connected by bearings 224 and accessories so that the shaft 223b is constrained to rotate relative to the bearing housing 223a. The motor 227 comprises a base component 227a and a shaft 227b so that the motor may produce a rotation of the shaft 227b relative to the base component 227a. The base component 227a of the motor is rigidly or fixedly connected to the bearing housing 223a via a connector 226, and the shaft 227b of the motor is connected to the shaft 223b by a coupling 225. It should be clear that the motor 227 may produce a rotation of the shaft 223b relative to the bearing housing 223a. The motor 227 is a driving mechanism of the rotational mechanism 223.

It should be noted that the rotation produced by a rotational motion mechanism may be a continuous rotation, an intermittent motion, or a back-and-forth rotation between two end-positions.

Figure 2E:
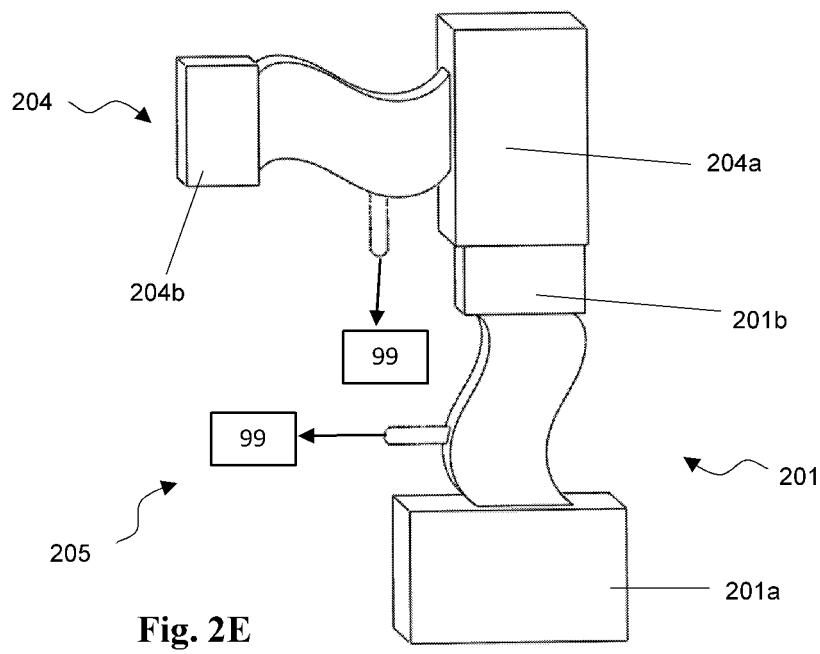
FIG. 2E shows an aerial view of a combination motion mechanism.

Referring to FIG. 2E, a motion mechanism 205 is a combination of two motion mechanisms 201 and 204, which may also be referred to as motion sub-mechanisms; wherein the motion mechanism 201 is as shown as in FIG. 2A; wherein the motion mechanism 204 is a motion mechanism comprising a stationary member 204a, and a moving member 204b which is connected to the stationary member 204a, and a driving mechanism (not shown in figure) configured to produce a motion of the moving member 204b relative to the stationary member 204a. The moving member 201b of the motion mechanism 201 is fixedly or rigidly connected to the stationary member 204a of the motion mechanism 204, so that the motion mechanism 201 can produce a motion of the stationary member 204a relative to the stationary member 201a of the motion mechanism 201. The combination motion mechanism 205 may be connected to the computer system 99 of FIG. 1 in the sense that the motion sub-mechanisms 201 and 204 are connected to the computer system 99 via wires or by wireless means, and the computer system 99 may be configured to control the motions produced by the motion sub-mechanisms of the combination motion mechanism 205.

The motion mechanism 205 is referred to as a combination motion mechanism. It should be noted that the motion sub-mechanisms 201 and 204 may produce motions simultaneously. This applies to any combination motion mechanism in the following. Combination motion mechanisms are special cases of motion mechanisms.

Figure 2F:
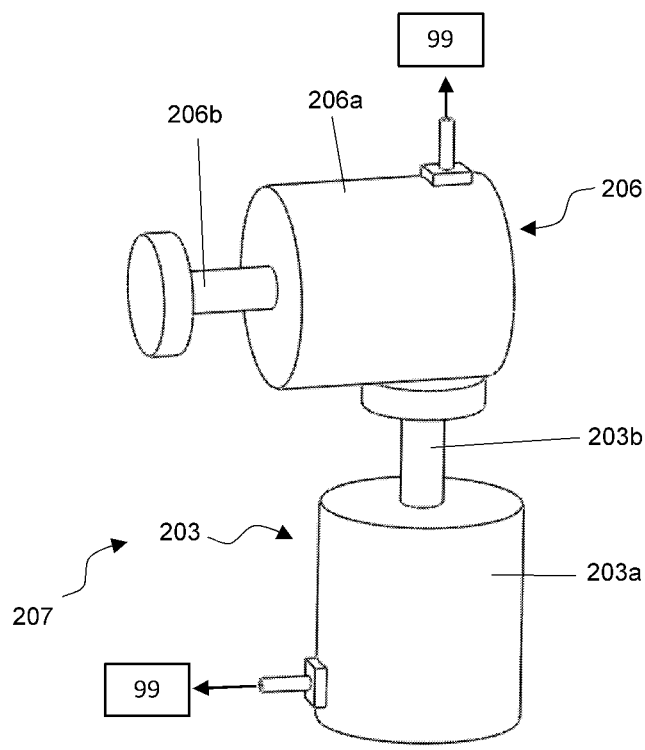
FIG. 2F shows an aerial view of a combination motion mechanism.

Referring to FIG. 2F, a combination motion mechanism 207 comprises rotational motion mechanisms 203 and 206, referred to as motion sub-mechanisms; wherein the motion mechanism 203 is shown in FIG. 2C; wherein the motion mechanism 206 is a rotational motion mechanism comprising a stationary member 206a, and a moving member 206b which is constrained to rotate relative to the stationary member 206a, and a driving mechanism (not shown in figure) configured to produce a rotational motion of the moving member 206b relative to the stationary member 206a. The moving member 203b of the motion mechanism 203 is fixedly or rigidly connected to the stationary member 206a of the rotational motion mechanism 206, so the rotational motion mechanism 203 can produce a rotation of the stationary member 206a relative to the stationary member 203a around the axis of the rotational motion mechanism 203. The combination motion mechanisms 207 may be connected to the computer system 99 of FIG. 1 in the sense that the motion sub-mechanisms 203 and 206 are connected to the computer system 99 via wires or by wireless means, and the computer system 99 may be configured to control the motions produced by the motion sub-mechanisms of the combination motion mechanism 207.

Figure 2G:
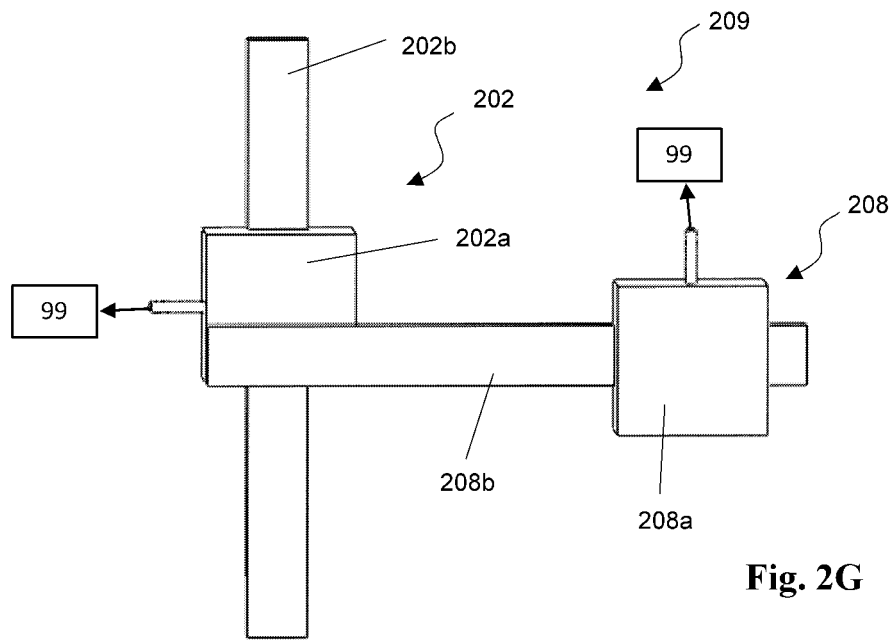
FIG. 2G shows an aerial view of a combination motion mechanism.

Referring to FIG. 2G, a combination motion mechanism 209 comprises two linear motion mechanisms 202 and 208, which may also be referred to as motion sub-mechanisms; wherein the motion mechanism 202 is shown in FIG. 2B; wherein the motion mechanism 208 is a linear motion mechanism comprising a stationary member 208a, and a moving member 208b which is constrained to move linearly relative to the stationary member 208a, and a driving mechanism (not shown in figure) configured to produce a linear motion of the moving member 208b relative to the stationary member 208a. The moving member 208b of the linear motion mechanism 208 is rigidly or fixedly connected to the stationary member 202a of the linear motion mechanism 202, so that the linear motion mechanism 208 can produce a linear motion of the stationary member 202a relative to the stationary member 208a. The combination motion mechanism 209 may be connected to the computer system 99 of FIG. 1 in the sense that the motion sub-mechanisms 202 and 208 are connected to the computer system 99 via wires or by wireless means, and the computer system 99 may be configured to control the motions produced by the motion sub-mechanisms of the combination motion mechanism 209.

Figure 2H:
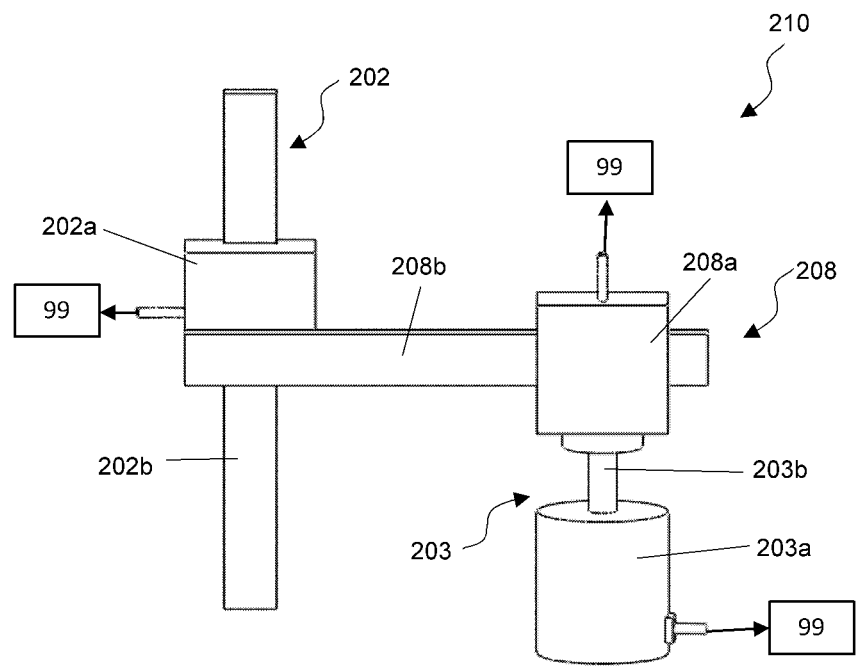
FIG. 2H shows an aerial view of a combination motion mechanism.

Referring to FIG. 2H, a combination motion mechanism 210 comprises a rotational motion mechanism 203 and two linear motion mechanisms 202 and 208; wherein motion mechanisms 203, 202 and 208 are referred to as motion sub-mechanisms. The moving member 208b of the linear motion mechanism 208 is rigidly or fixedly connected to the stationary member 202a of the linear motion mechanism 202, so that the linear motion mechanism 208 can produce a linear motion of the stationary member 202a relative to the stationary member 208a of the linear motion mechanism 208. The moving member 203b is fixedly connected to the stationary member 208a of the linear motion mechanism 208, so that the rotational motion mechanism 203 can produce a rotation of the stationary member 208a relative to the stationary member 203a. The combination motion mechanisms 210 may be connected to the computer system 99 of FIG. 1 in the sense that the motion sub-mechanisms 202, 203 and 208 are connected to the computer system 99 via wires or by wireless means, and the computer system 99 may be configured to control the motions produced by the motion sub-mechanisms of the combination motion mechanism 210.

Figure 2I:
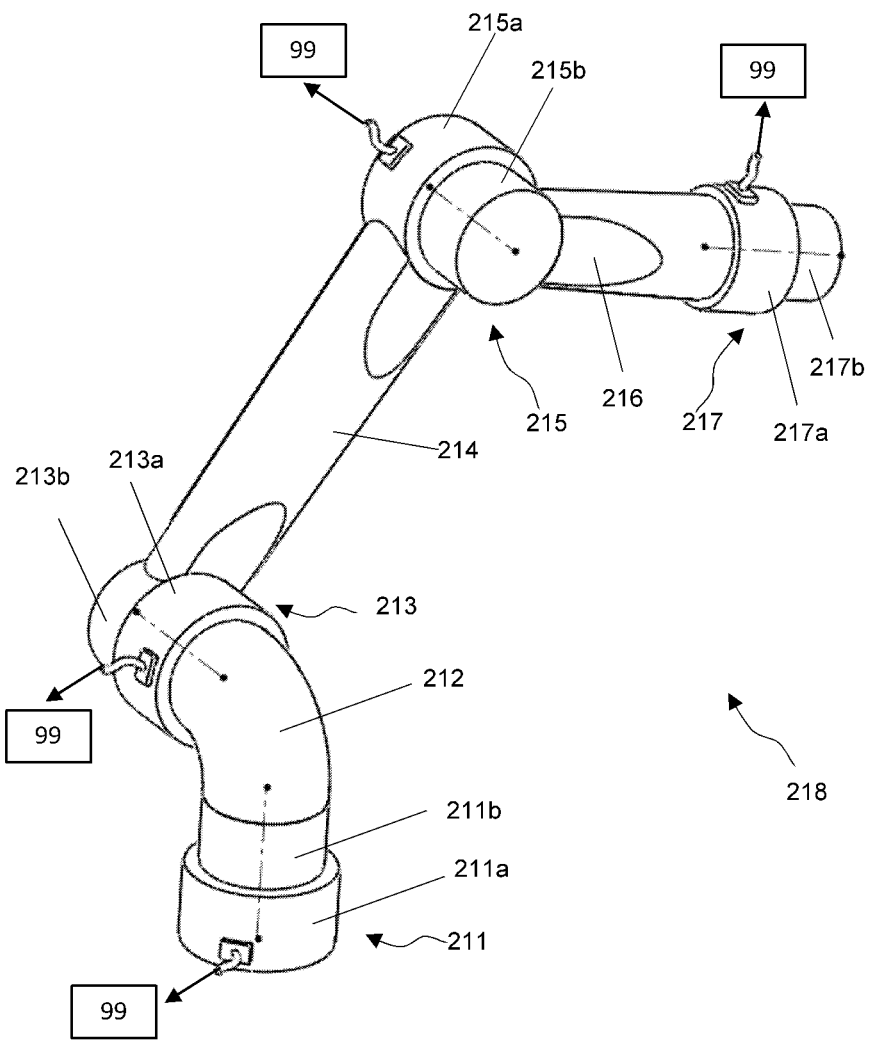
FIG. 2I shows an aerial view of a robot arm.

Referring to FIG. 2I, a robot arm 218 comprises a plurality of rotational motion mechanisms 211, 213, 215 and 217; wherein the motion mechanisms 211, 213, 215 and 217 are referred to as motion sub-mechanisms. The rotational motion mechanism 211, 213, 215 or 217 comprises: a stationary member 211a, 213a, 215, or respectively 217a; a moving member 211b, 213b, 215b, or respectively 217b which is constrained to rotate relative to the respective stationary member; and a driving member comprising a motor (not shown in figure) configured to drive a rotation of the respective moving member relative to the respective stationary member around an axis. The moving member 211b of the rotational motion mechanism 211 is rigidly connected to the stationary member 213a of the rotational motion mechanism 213 via a connector 212; wherein the axis of the rotational motion mechanism 211 may optionally be perpendicular to the axis of the rotational motion mechanism 213. Thus, the motion mechanism 211 can produce a rotation of the stationary member 213a relative to the stationary member 211a. The moving member 213b of the rotational motion mechanism 213 is rigidly connected to the stationary member 215a of the rotational motion mechanism 215 via a rigid connector 214; wherein the axis of the rotational motion mechanism 213 may optionally be parallel to the axis of the rotational motion mechanism 215. The rotational motion mechanism 213 can produce a rotation of the stationary member 215a relative to the stationary member 213a. The moving member 215b of the rotational motion mechanism 215 is rigidly connected to the stationary member 217a of the rotational motion mechanism 217 via a connector 216; wherein the axis of the rotational motion mechanism 215 may optionally be perpendicular to the axis of the rotational motion mechanism 217, and the rotational motion mechanism 215 can produce a rotation of the stationary member 217a relative to the stationary member 215a. The robot arm 218 may be connected to the computer system 99 of FIG. 1 in the sense that the motion sub-mechanisms 211, 213, 215 and 217 are connected to the computer system 99 via wires or by wireless means, and the computer system 99 may be configured to control the motions produced by the motion sub-mechanisms of the robot arm 218.

The robot arm 218 is a combination motion mechanism which is a combination of the motion sub-mechanisms 211, 213, 215 and 217. Any robot arm of prior art may be used as a motion mechanism for our applications. Any motion mechanism of prior art may be used for our applications.

It should be possible to construct a combination motion mechanism from a rather arbitrary sequence of motion mechanisms, referred to as motion sub-mechanisms.

Figure 3:
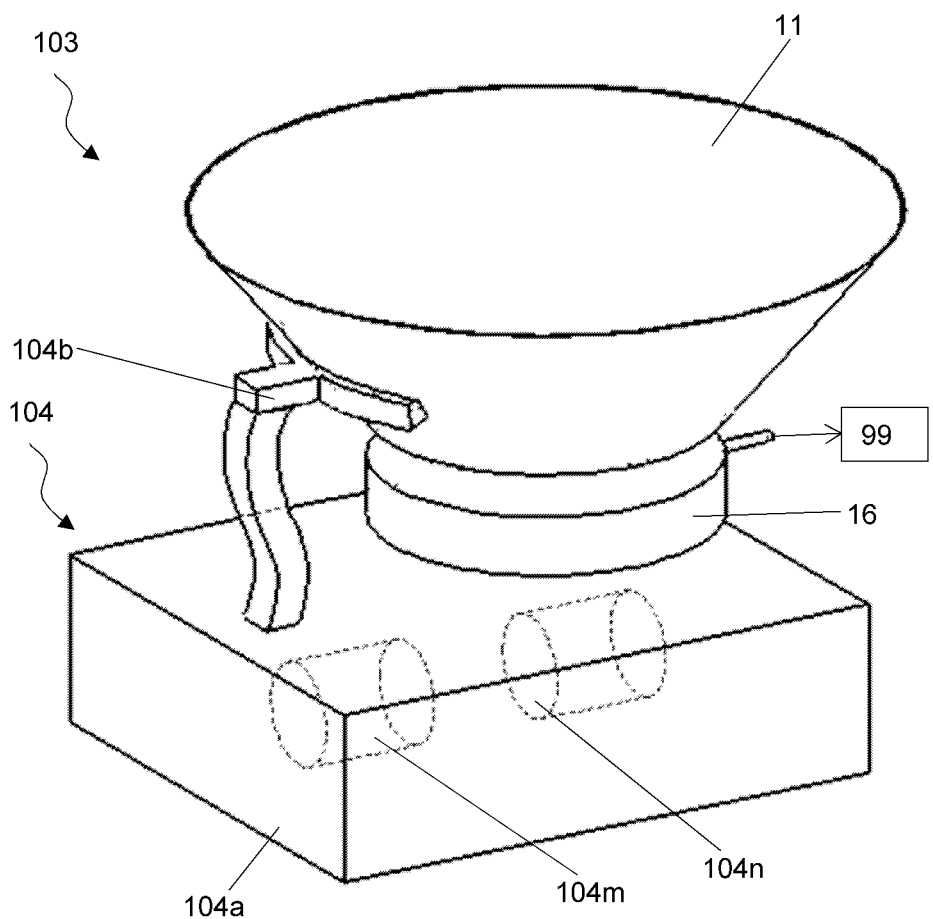
FIG. 3 shows an aerial view of parts of a cooking apparatus.

Referring to FIG. 3, a cooking apparatus 103 comprises: a cookware 11; a heater (such as inductive stove, gas burner, electric burner, etc.) 16; and a motion mechanism 104 comprising a stationary component 104a and a moving component 104b. The moving component 104b is rigidly, fixedly, or otherwise connected to the cookware 11 at least during time of operation. The heater 16 is configured to heat the cookware 11 and hence the food or food ingredients held in said cookware. The motion mechanism 104 may produce a motion of the cookware to stir or mix the food or food ingredients in the cookware, using known techniques. The motion mechanism 104 may also be able to produce a motion (e.g. a rotation around a horizontal axis) of the cookware 11 to dispense a cooked food from the cookware 11, using known techniques. The motion mechanism 104 is driven by motors 104m and 104n, which are connected to the computer system 99 of FIG. 1 by wires or by wireless means.

As an example, the motion mechanism 104 may comprise a robot arm, wherein a moving part of the robot arm is connected to the cookware. The connection to the cookware may be temporary or permanent, depending on the particular application.

It should be noted that the heater may optionally be fixedly connected to the cookware. See, e.g., U.S. patent application Ser. No. 15/801,923, the disclosures of which are hereby incorporated herein by reference in its entirety. In other applications, the heater may optionally be fixedly connected to the ground.

The motion mechanism 104 of the cooking apparatus 103 may be substituted by the stirring motion mechanism, the unloading motion mechanism (or unloading apparatus in the terms of some patent applications), the dispensing apparatus, or the combination of the above, as disclosed in U.S. patent application Ser. Nos. 16/997,196, 15/706,136, 15/801,923, 16/155,895, and 17/069,707. The entire contents of the applications are incorporated herein by reference.

Referring to FIG. 4A, a liquid dispensing sub-mechanism 401 comprises: a plurality of liquid pipes 411, 413 and 420; a plurality of flexible pipes 410; a plurality of flowmeters 419; a plurality of liquid pumps 412; a plurality of electronic balances 416; and a plurality of liquid containers 414. Each liquid container 414 is configured to contain a liquid ingredient, e.g., cooking oil, vinegar, or water. Each liquid pipe 411 is connected to a flexible pipe 410. Each flowmeter 419 is connected to a pair of corresponding pipes 420 and 410. Each pump 412 is connected to a pair of corresponding pipes 420 and 413; and said pipe 413 is inserted into a corresponding liquid container 414, so that the pump can pump liquid from the liquid container and the flowmeter can measure the flow in the corresponding pipes. Each container 414 is positioned on an electronic balance 416, so that the electronic balance 416 can weigh the corresponding container 414. Connectors 417 and 418 are configured to fixedly connect the pipes 410 to improve rigidity or stability of the pipes. The pumps 412, flowmeters 419, and electronic balances 416 are connected by wired or wireless means to the computer system 99 of FIG. 1, so that the computer system may control the timing and amount of liquid to be drawn from the corresponding liquid container. The connector 416 fixedly connects the pipes 411 to improve rigidity or stability of the pipes.

Referring to FIG. 4B, a liquid dispensing apparatus 403 comprises: a liquid dispensing sub-mechanism 401; a shaft 464 comprising a horizontal axis; a rotational motion mechanism 466 comprising a stationary member 466a and a moving member 466b which is constrained to rotate relative to the stationary member 466a. The moving member 466b is fixedly connected to the connector 417 of the liquid dispensing sub-mechanism 401 via a connector 462, and the stationary member 466a is fixedly connected to the ground via a rigid component 463 referred to as a support component. The rotational motion mechanism 466 further comprises a motor 466m referred to as a driving member, which can drive a back-and-forth motion of the moving member 466b, and hence of the connector 462, between a first end-position and a second end-position, relative to the stationary member 466a (or equivalently, relative to the support component 463). The pipes 410 of the liquid dispensing sub-mechanism 401 are attached to the connector 462. The connector 418 of the liquid dispensing sub-mechanism 401 is fixedly connected to the rigid component 463. The rotational motion mechanism 466 is connected to the computer system 99 of FIG. 1 in the sense that the motor 466m is connected to the computer system 99 via wires or by wireless means, and the computer system 99 may be configured to control the timing and speed of the rotational motion mechanism 466.

It should be noted the flowmeters 419, the liquid pumps 412, the electronic balance 416 of the liquid dispensing sub-mechanism 401 are configured to be fixedly connected to the ground via connectors, wherein the connectors are not showing in the figures.

Figure 5A:
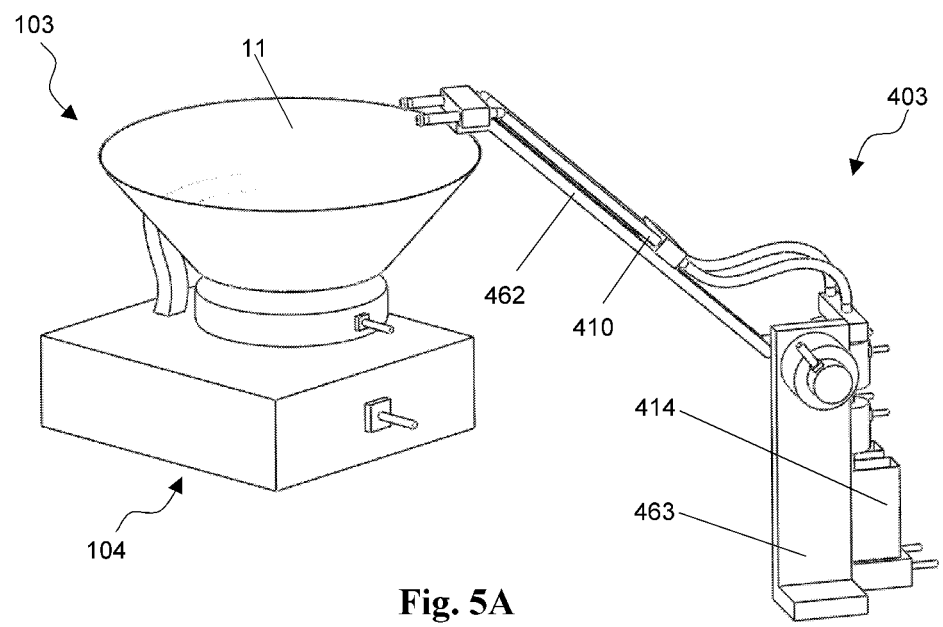
FIGS. 5A-5B show aerial views of the relative positions of the cooking apparatus of FIG. 3 and the liquid dispensing apparatus.
Figure 5B:
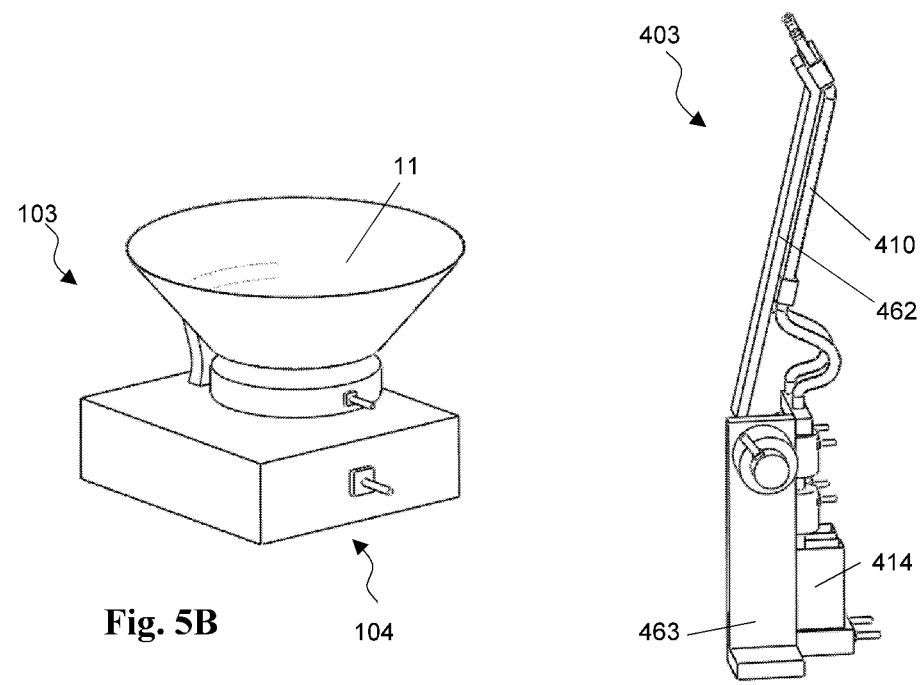

FIGS. 5A-5B show the relative positions of the above liquid dispensing apparatus 403 and the cookware 11 of a cooking apparatus 103. At a first end-position of the connector 462 (in the back-and-forth rotation produced by the rotational motion mechanism 466), an open end of the pipes 411 is to be positioned above the cookware 11 when the cookware 11 is at the upright position (see FIG. 5A), so that the liquid may flow into the cookware 11. The liquid dispensing sub-mechanism 401 of the liquid dispensing apparatus 403 is used to dispense a plurality of liquid ingredients into the cookware 11 of a cooking apparatus 103 when the connector 462 is at the first end-position and the cookware 11 is at the upright position. When the connector 462 is rotated to the second end-position, the connector 462 and the pipes 411 are all rotated by an angle, away from the cookware 11.

Figure 6A:
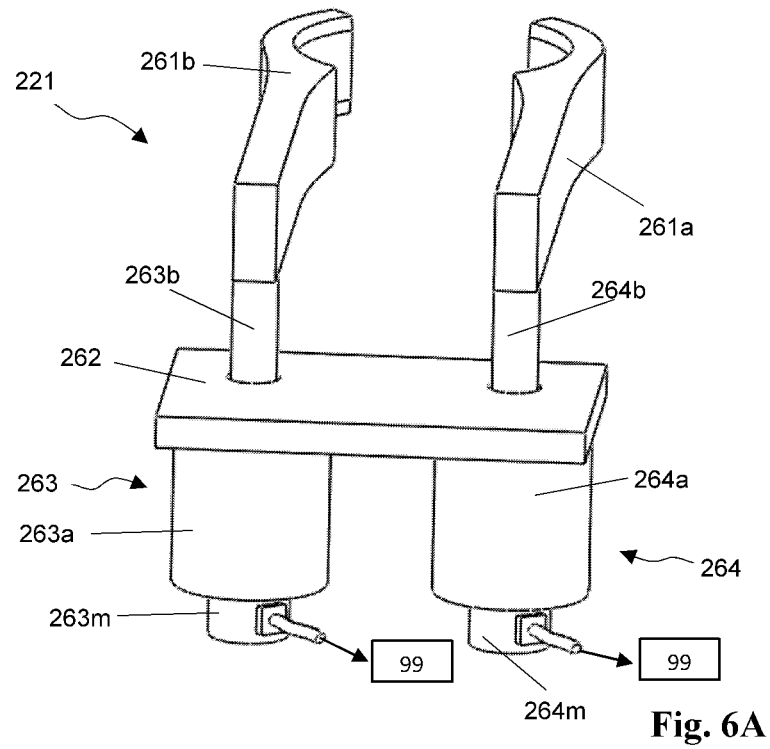
FIG. 6A shows an aerial view of a gripping mechanism.

Referring to FIG. 6A, a gripping mechanism 221 comprises: grippers 261a and 261b which can optionally be rigid or elastic components; and rotational motion mechanisms 263 and 264. The rotational motion mechanism 263 comprises a stationary member 263a and a moving member 263b, and the rotational motion mechanism 263 is configured to produce a rotation of the moving member 263b relative to the stationary member 263a. The rotational motion mechanism 264 comprises a stationary member 264a and a moving member 264b, and the rotational motion mechanism 264 is configured to produce a rotation of the moving member 264b relative to the stationary member 264a. The stationary members 263a and 264a are fixedly connected to a support component 262. The gripper 261a is rigidly or fixedly connected to the moving member 264b. The rotational motion mechanism 264 can produce a rotation of the gripper 261a around the axis of the rotational motion mechanism 264 relative to the stationary member 264a. Similarly, the gripper 261b is rigidly or fixedly connected to the moving member 263b. The rotational motion mechanism 263 can produce a rotation of the gripper 261b around the axis of the rotational motion mechanism 263 relative to the stationary member 263a. As the gripper 261a or 261b is rigidly connected to the moving member 264b or respectively 263b, the rotational motion mechanism 264 or 263 can produce a rotation of the gripper 261a or respectively 261b. The axis of rotation of the rotational motion mechanism 264 is parallel to the axis of rotation of the rotational motion mechanism 263, and the rotational motion mechanisms 264 and 263 are configured to rotate the respective grippers 261a and 261b in opposite directions simultaneously. Thus, the grippers 261a and 261b can be rotated anti-synchronously around a pair of parallel axes. Each of the grippers 261a and 261b is rotated between a first end-position and a second end-position. At the first end-positions, the grippers 261a and 261b may together grip a container or other object. At the second end-positions, the grippers 261a and 261b can open up and release the container or object. The motion mechanisms 263 or 264 is driven by a motor 263m or respectively 264m. The gripping mechanism 221 may be connected to the computer system 99 of FIG. 1 in the sense that the motors 263m and 264m are connected to the computer system 99 via wires or by wireless means, and the computer system 99 may be configured to control the motions of the grippers 261a and 261b produced by the motion mechanisms 263 and 264. Thus, the gripping mechanism 221 may be controlled by the computer system 99 to grip or release a container or other object.

Figure 6B:
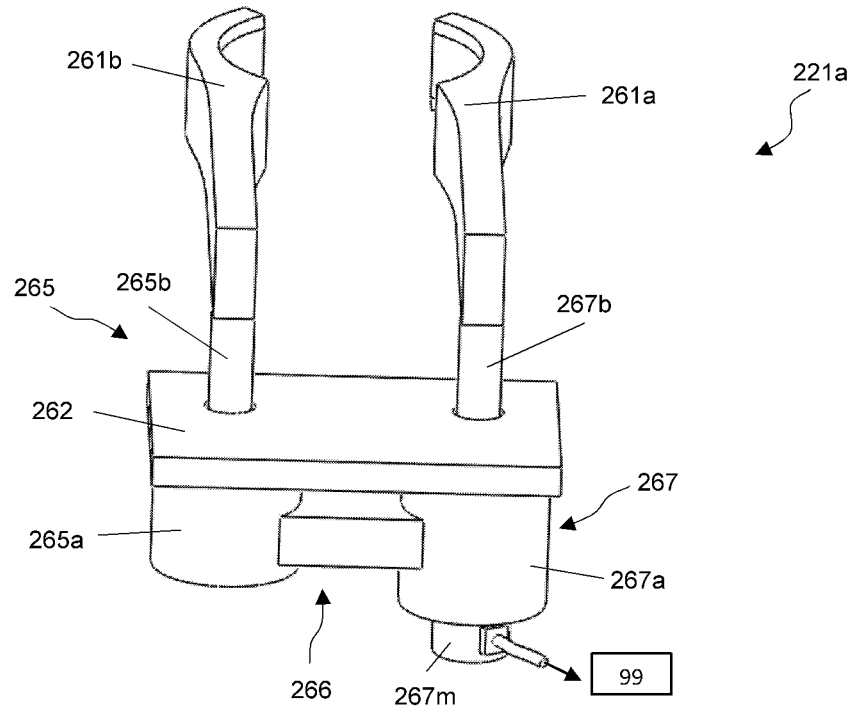
FIG. 6B shows an aerial view of a gripping mechanism.

Referring to FIG. 6B, a gripping mechanism 221a comprises: grippers 261a and 261b which are optionally rigid or elastic components; a rotational motion mechanism 267 comprising a stationary member 267a and a moving member (a shaft) 267b; and a rotational mechanism 265 comprising a first mating part 265a and a second mating part (a shaft) 265b which is constrained to rotate relative to the first mating part 265a. The rotational motion mechanism 267 is configured to produce a rotational motion of the moving member 267b relative to the stationary member 267b. The stationary members 267a and the first mating part 265a are rigidly or fixedly connected to a support component 262. The gripper 261a is rigidly or fixedly connected to the moving member 267b. The gripper 261b is rigidly or fixedly connected to the second mating part (a shaft) 265b. The axis of rotation of the rotational motion mechanism 267 and the axis of the rotational mechanism 265 are configured to be parallel to each other. A transmission mechanism 266 is configured to connect the rotational motion mechanism 267 and the rotational mechanism 265, so that a rotation of the shaft 267b relative to the stationary member 267a is transmitted to an anti-synchronous rotation of the shaft 265b. Thus, the grippers 261a and 261b can be rotated anti-synchronously around a pair of parallel axes. Each of the grippers 261a and 261b is rotated between a first end-position and a second end-position. At the first end-positions, the grippers 261a and 261b may together grip a container or other object. At the second end-positions, the grippers 261a and 261b can open up and release the container or object. The motion mechanism 267 is driven by a motor 267m. The gripping mechanism 221a may be connected to the computer system 99 of FIG. 1 in the sense that the motor 267m is connected to the computer system 99 via wires or by wireless means, and the computer system 99 may be configured to control the motions of the grippers 261a and 261b produced by the motion mechanism 267. Thus, the gripping mechanism 221a may be controlled by the computer system 99 to grip or release a container or other object.

For examples of gripping mechanism 221a described above, see FIGS. 39A-39B ("gripping mechanism 701"), or FIGS. 47A-47C ("gripping mechanism 905"), of U.S. patent application Ser. No. 16/517,705. The entire content of the US Patent Application is hereby incorporated herein by reference.

Figure 6C:
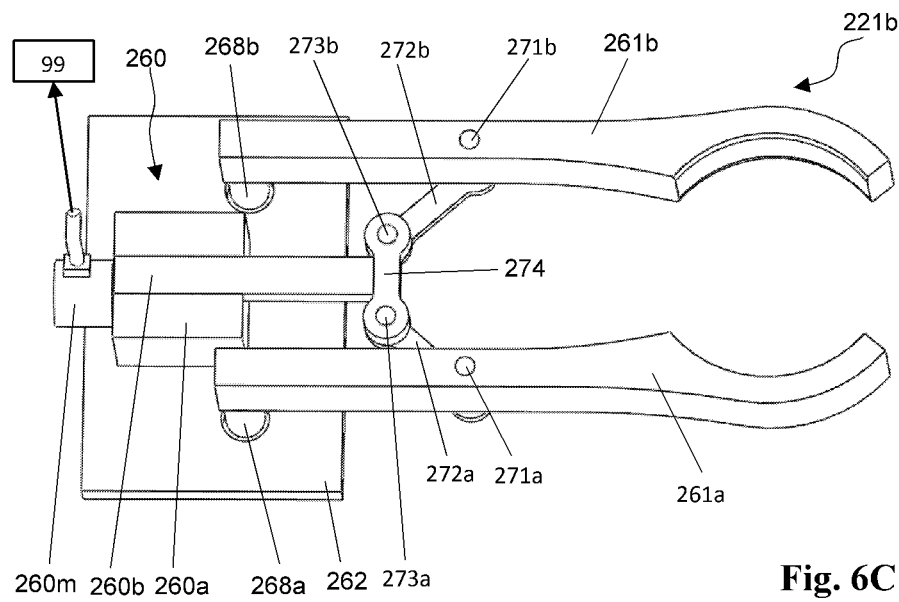
FIG. 6C shows an aerial view of a gripping mechanism.

Referring to FIG. 6C, a gripping mechanism 221b comprises: a support component 262 which is a rigid component; grippers 261a and 261b; a linear motion mechanism 260; a rigid component 274; shafts 273a and 273b; links 272a and 272b; and shafts 271a and 271b. The linear motion mechanism 260 comprises a stationary member 260a and a moving member 260b which is configured to move linearly (along a horizontal direction) relative to the stationary member 260a. A pair of shafts 268a and 268b are constrained to rotate relative to the support component 262 respectively around a pair of vertical axes. The shaft 273a (or respectively 273b) is configured to connect the link 272a (or respectively 272b) to the rigid component 274 so that the link 272a (or respectively 272b) is constrained to rotate relative to the rigid component 274 around the axis of the shaft 273a (or respectively 273b). The shaft 271a (or 271b) is configured to connect the link 272a (or respectively 272b) to the gripper 261a (or respectively 261b) so that the gripper 261a (or respectively 261b) is rotatable relative to the link 272a (or respectively 272b). The gripper 261a (or 261b) is rigidly or fixedly connected to the shaft 268a (or respectively 268b). Thus, the gripper 261a (or respectively 261b) is constrained to rotate relative to the support component 262 around the axis of the shaft 268a (or respectively 268b). The parts 268a, 271a, 272a, and 273a are mirror images of the parts 268b, 271b, 272b, and 273b about a vertical plane which is parallel to the direction of the linear motion of the moving member 260b relative to the stationary member 260a; wherein said stationary member 260a is rigidly or fixedly connected to the support component 262. The rigid component 274 is rigidly or fixedly connected to the moving member 260b. Thus, the linear motion mechanism 260 may produce a horizontal motion of the rigid component 274 and hence anti-synchronous rotations of the grippers 261a and 261b. Each of the grippers 261a and 261b is rotated between a first end-position and a second end-position. At the first end-positions, the grippers 261a and 261b may together grip a container or other object. At the second end-positions, the grippers 261a and 261b can open up and release the container or object. The motion mechanism 260 is driven by a motor 260m. The gripping mechanism 221b may be connected to the computer system 99 of FIG. 1 in the sense that the motor 260m is connected to the computer system 99 via wires or by wireless means, and the computer system 99 may be configured to control the motions of the grippers 261a and 261b produced by the motion mechanism 260. Thus, the gripping mechanism 221b may be controlled by the computer system 99 to grip or release a container or other object.

A gripping mechanism may also be referred to as a gripper mechanism.

Figure 6D:
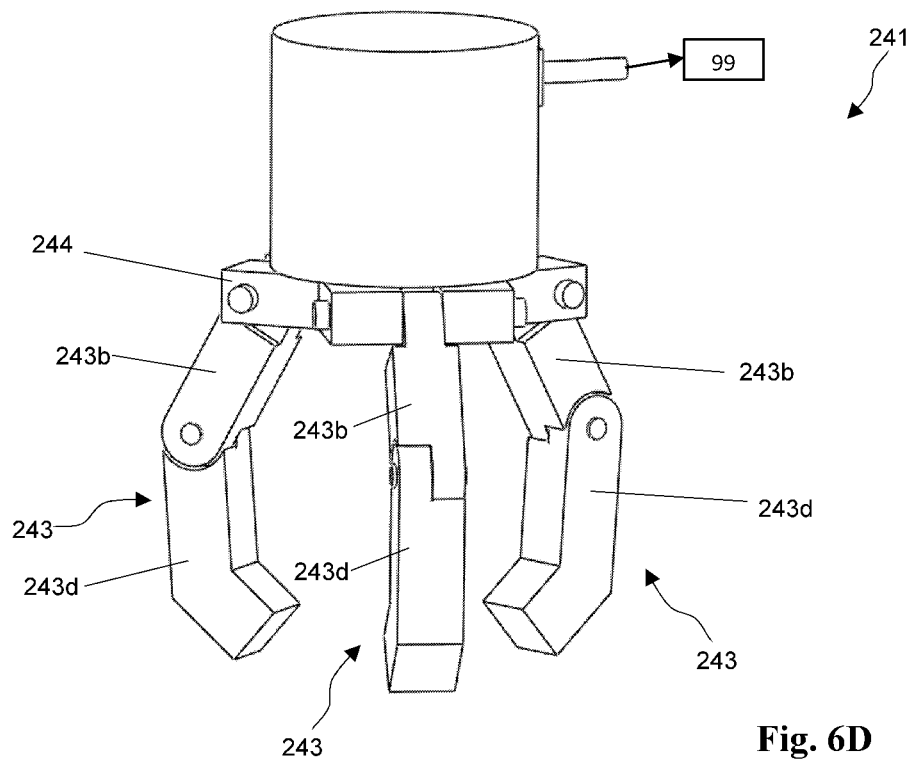
FIG. 6D shows an aerial view of a gripping mechanism.

Referring to FIG. 6D, a gripping mechanism 241 comprises a support component (or base component) 244 and a plurality of gripper sub-mechanisms 243 which are referred to as robotic fingers. Each gripper sub-mechanism 243 comprises: grippers 243d and 243b wherein the gripper 243d is rotatable relative to the gripper 243b and the gripper 243b is rotatable relative to the support component 244; a motion mechanism comprising a motor (hidden in figure) which drives a rotation of the gripper 243d relative to the gripper 243b; and a motion mechanism comprising a motor (hidden in figure) which drives a rotation of the gripper 243b relative to the support component 244. (It should be noted that an optional transmission mechanism may be used to link the rotation of the grippers 243d and 243b and then only one motor is needed to drive the rotations of both grippers.) The gripping mechanism 241 may be connected to the computer system 99 of FIG. 1 in the sense that all motors are connected to the computer system 99 via wires or by wireless means, and the computer system 99 may be configured to control the motions produced by the motors in the gripping mechanism 241. The gripping mechanism 241 may be controlled by the computer system 99 to grip or release a container or other object.

Figure 6E:
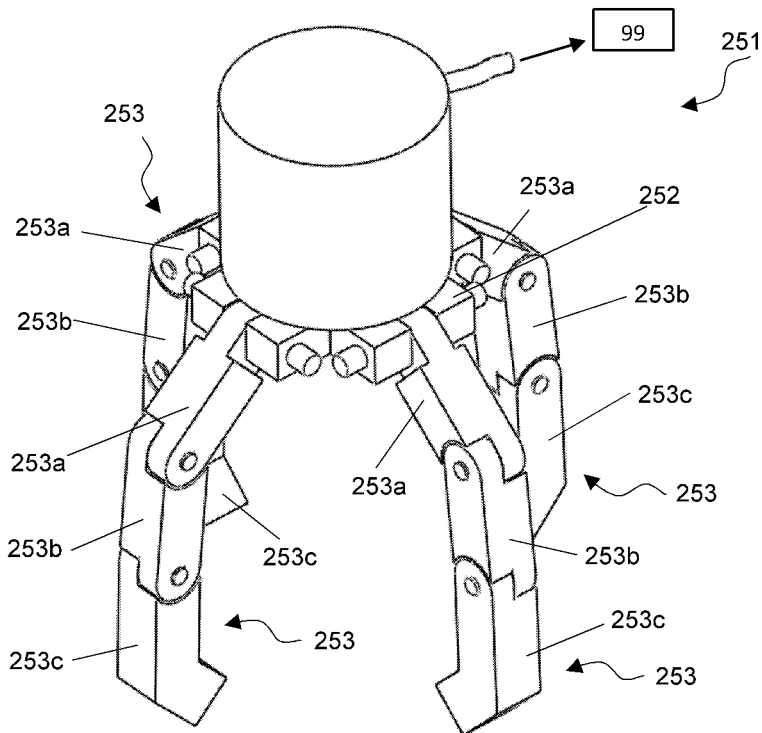
FIG. 6E shows an aerial view of a gripping mechanism.

Referring to FIG. 6E, a gripping mechanism 251 comprises: a support component (or base component) 252 and a plurality of gripper sub-mechanisms 253 which are referred to as robotic fingers. Each gripper sub-mechanism 253 comprises: grippers 253a, 253b and 253c, wherein the gripper 253c is rotatable relative to the gripper 253b, the gripper 253b is rotatable relative to the gripper 253a, and the gripper 253a is rotatable relative to the support component 252; a motion mechanism comprising a motor (hidden in figure) which drives a rotation of the gripper 253c relative to the gripper 253b; a motion mechanism comprising a motor (hidden in figure) which drives a rotation of the gripper 253b relative to the gripper 253a; and a motion mechanism comprising a motor (hidden in figure) which drives a rotation of the gripper 253a relative to the support component 252. (It should be noted that an optional transmission mechanism may be used to link the rotation of the grippers 253a, 253b and 253c and then only one motor is needed to drive the rotations of all the grippers). The gripping mechanism 251 may be connected to the computer system 99 of FIG. 1 in the sense that all motors are connected to the computer system 99 via wires or by wireless means, and the computer system 99 may be configured to control the motions produced by the motors in the gripping mechanism 251. The gripping mechanism 251 may be controlled by the computer system 99 to grip or release a container or other object.

The gripping mechanisms 241 (FIG. 6D) and 251 (FIG. 6E) are commonly referred to as robot hands. The gripper sub-mechanisms 243 and 253 are referred to as robot fingers. In fact, any robot hand may be used as a gripping mechanism for our purposes here. Robot hands may also be referred to as robot end effectors. Similarly, any robot arm may be used as a motion mechanism for our purpose.

Figure 7:
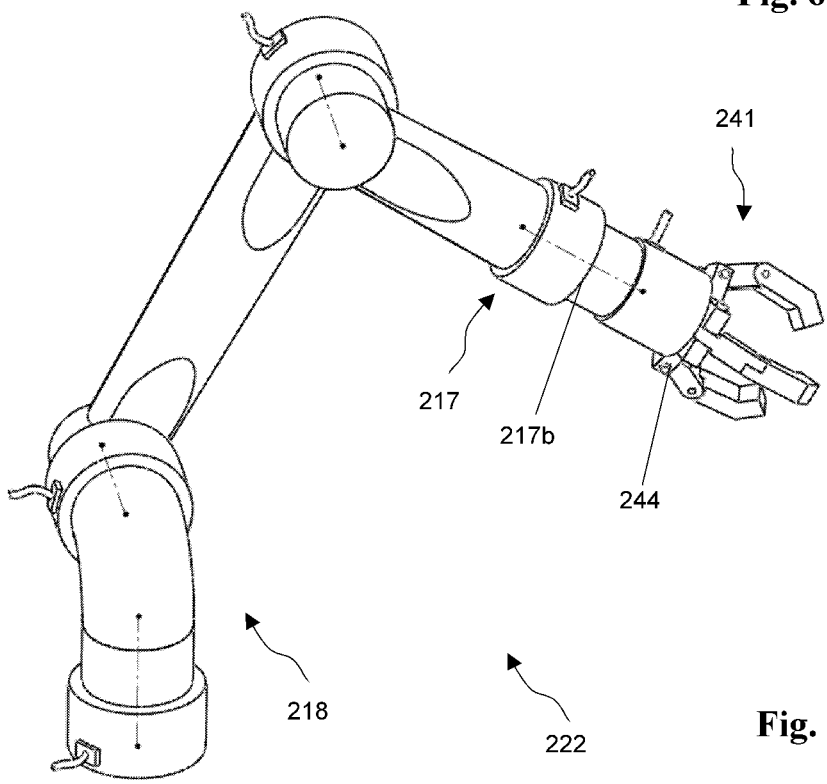
FIG. 7 shows an aerial view of a robotic apparatus.

Referring to FIG. 7, a robotic apparatus 222 comprises a robot arm 218 and a gripping mechanism 241. The gripping mechanism 241 is configured to grip or release a container or other object. The support component 244 of the gripping mechanism 241 is fixedly connected to the moving member 217b of the rotational motion mechanism 217 of the robot arm 218, so that the robot arm can move the gripping mechanism 241. When the gripping mechanism 241 grips a container or other object, the robotic apparatus 222 can transfer the container or object to another position. The robot arm 218 and the gripping mechanism 241 may be connected to the computer system 99 of FIG. 1 via wires or by wireless means, and the computer system 99 may be configured to control the motions produced the motion mechanism in the robotic apparatus 222. The robotic apparatus 222 may be controlled by the computer system 99 to grip a container or other object, and then move the container or object, and then release the container or object at a different position. The robotic apparatus 222 may substitute a transfer apparatus to grip and move a container or other object. The robotic apparatus 222 may also substitute a dispensing apparatus to grip and move a container to dispense food or food ingredients from the container.

It should be noted that the gripping mechanism 221 of the robotic apparatus 222 may be substituted by the gripping mechanism 221a (or 221b) or another gripping mechanism.

It should be noted that the gripping mechanisms 221, 221a, 221b, 241 and 251 are some realizations of gripping mechanisms. They may be substituted by other types of gripping mechanism such as electric grippers, pneumatic grippers, etc.

Figure 8:
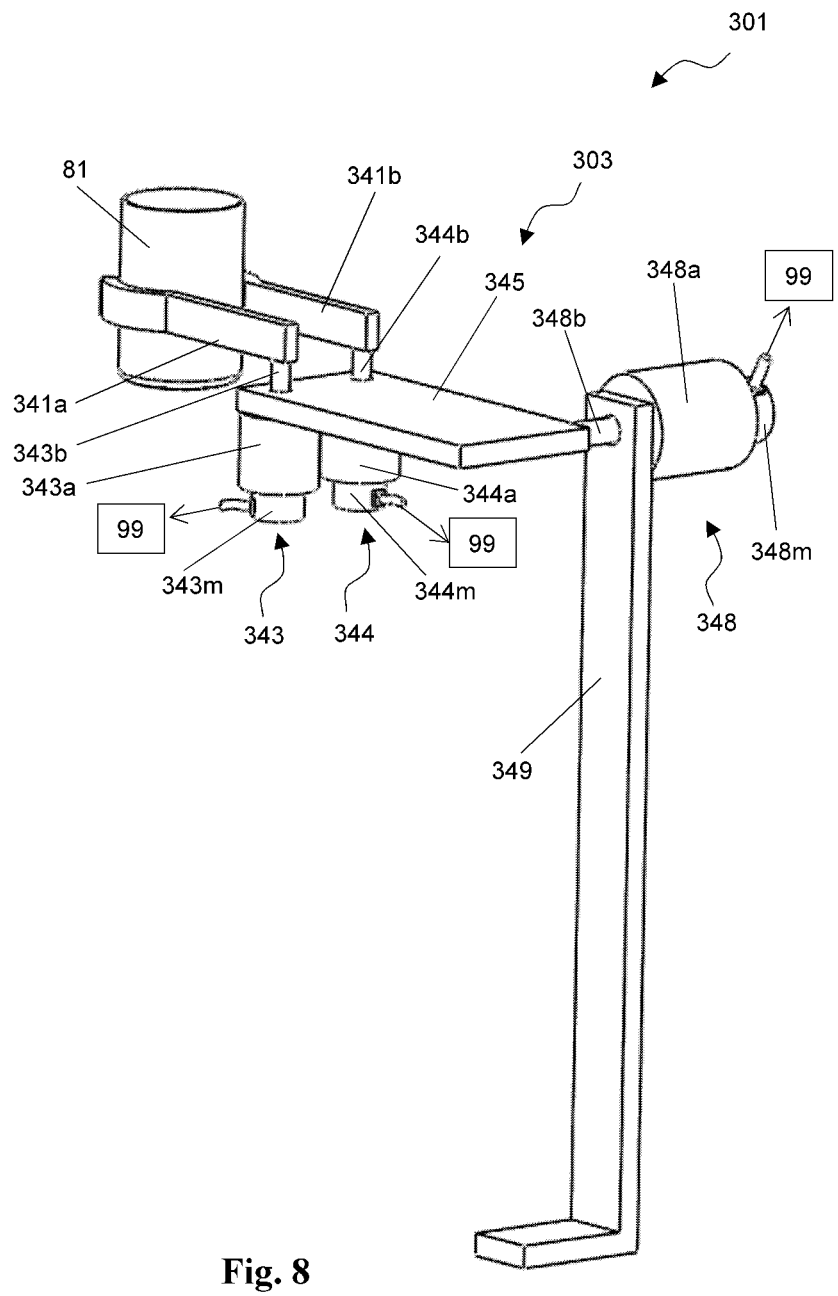
FIG. 8 shows an aerial view of an ingredient dispensing apparatus.

Referring to FIG. 8, an ingredient dispensing apparatus 301 comprises a container gripping mechanism 303 comprising: a support component 345; gripping devices (also referred to as grippers) 341a and 341b; and rotational motion mechanisms 343 and 344. The gripping device 341a or 341b may comprise a rubber or silica gel or other elastic material. The rotational motion mechanism 343 comprises a stationary member 343a and a moving member 343b which is constrained to rotate relative to the stationary member 343a. The rotational motion mechanism 344 comprises a stationary member 344a and a moving member 344b which is constrained to rotate relative to the stationary member 344a. The stationary members 343a and 344a are fixedly connected to the support component 345. The gripping device 341a is rigidly or fixedly connected to the moving member 343b. The rotational motion mechanism 343 further comprises a motor 343m referred to as a driving member, which can drive a rotation of the moving member 343b and hence of the gripping device 341a relative to the stationary members 343a. Similarly, the gripping device 341b is rigidly or fixedly connected to the moving member 344b. The rotational motion mechanism 344 further comprises a motor 344m referred to as a driving member, which can drive a rotation of the moving member 344b, and hence of the gripping device 341b, relative to the stationary members 344a. The axis of rotation of the rotational motion mechanism 343 is parallel to the axis of rotation of the rotational motion mechanism 344, and the rotational motion mechanisms 343 and 344 are configured to rotate the respective gripping devices 341a and 341b anti-synchronously around a pair of parallel axes. Each of the gripping devices 341a and 341b is rotated between a first end-position and a second end-position. At the first end-positions, the gripping devices 341a and 341b may together grip an ingredient container 81. At the second end-positions, the gripping devices 341a and 341b can open up and release the container.

The ingredient dispensing apparatus 301 further comprises a rotational motion mechanism 348 comprising a stationary member 348a and a moving member 348b. The moving member 348b is rigidly or fixedly connected to the support component 345 of the container gripping mechanism 303, and the stationary member 348a is fixedly connected to the ground via a rigid component 349 referred to as a support component. The rotational motion mechanism 348 further comprises a motor 348m referred to as a driving member, which can drive a back-and-forth rotation of the moving member 348b, and hence of the support component 345, between a first end-position and a second end-position, relative to the stationary member 348a (or equivalently, relative to the rigid component 349). The rotational motion mechanisms 343, 344 and 348 are connected to the computer system 99 of FIG. 1 in the sense that the motors 343m, 344m and 348m are connected to the computer system 99 via wires or by wireless means, and the computer system 99 may be configured to control the motions produced by the motion mechanisms of the ingredient dispensing apparatus 301. The ingredient dispensing apparatus 301 may be controlled by the computer system 99 to grip an ingredient container 81, and then rotate it a pre-assigned angle (e.g., 150 degrees) to dispense the food or food ingredients contained in the ingredient container 81.

When the support component 345 of the container gripping mechanism 303 is rotated to the first end-position of the back-and-forth rotation, the gripping devices 341a and 341b in the container gripping mechanism 303 can be rotated to their first end-positions to grip an ingredient container 81, wherein the ingredient container 81 may contain or otherwise hold food or food ingredients. When the ingredient container 81 is gripped, the axis of the gripped ingredient container 81 is configured to be vertical (although this is not a strict requirement). When the ingredient container 81 is being gripped by the container gripping mechanism 303, the computer system 99 would control the rotational motion mechanism 348 to rotate the support component 345 of the container gripping mechanism 303 to the second end-position. This way, the ingredient container 81 and the gripping devices 341a and 341b are rotated with the support component 345 and the food or food ingredients contained in the ingredient container 81 can be dispensed as the ingredient container 81 is turned. After the dispensing of the food or food ingredients contained or held in the ingredient container 81, the gripped container and (the support component of) the container gripping mechanism 303 may be returned to the first end-position, when the rotational motion mechanism 348 rotates the support component 345 backward.

Figure 9A:
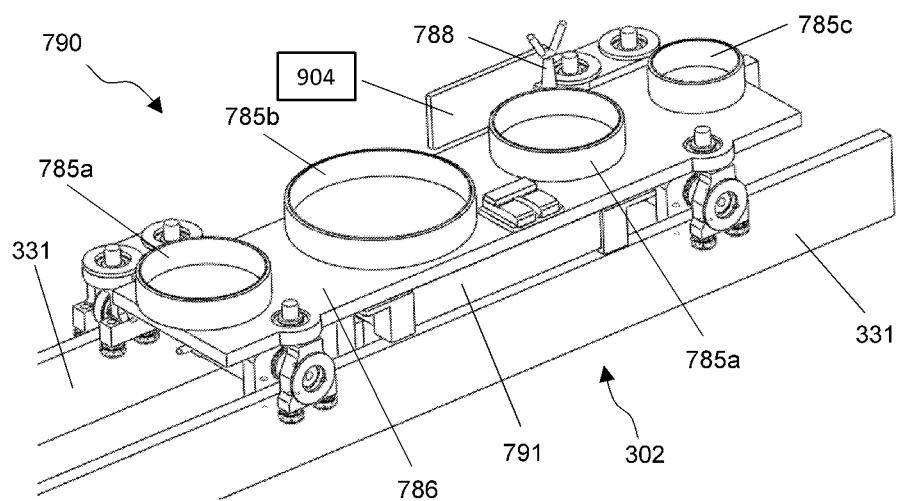
FIG. 9A shows an aerial view of a transport system which includes a vehicle on tracks.

Referring to FIG. 9A, a vehicle 790 comprises: a support component 786; a computer 904; a plurality of wheels; motors configured to drive rotations of some of the wheels; a rechargeable battery 791; and a plurality of container holders 785a, 785b and 785c wherein each container holder 785a, 785b or 785c is rotationally symmetrical with a vertical axis. Each container holder 785a, 785b or 785c is configured to hold an ingredient container 81 of a specific diameter. Each container holder on a vehicle 790 may hold an ingredient container 81 so that the movement of said ingredient container may be restricted or limited when the vehicle 790 is moving.

It should be noted that the vehicle 790 may move on a pair of curved rail tracks whose widths are smaller than the widths of straight rail tracks. The vehicle 790 can carry and transport a plurality of ingredient containers.

It should be noted that the any of container holders in the vehicle 790 may be substituted by a solid shape which can position or hold an ingredient container.

Referring to FIG. 9A, a transport system 302 comprises tracks each comprising pairs of mini-rails 331 and a plurality of vehicles 790. Each mini-rail 331 of the transport system 302 is fixedly connected to the ground. The vehicle 790 and the container holders 785a on the vehicle 790 may move along the mini-rails 331. The transport system 302 is configured to transfer ingredient containers. The computer 904 is connected to the computer system 99 of FIG. 1 via wireless means, and the computer system 99 is configured to control the timing and speed of the vehicles 790.

See U.S. patent application Ser. Nos. 16/517,705 and 16/997,933 for more details of the vehicle 790. The entire contents of these applications are hereby incorporated herein.

Figure 9B:
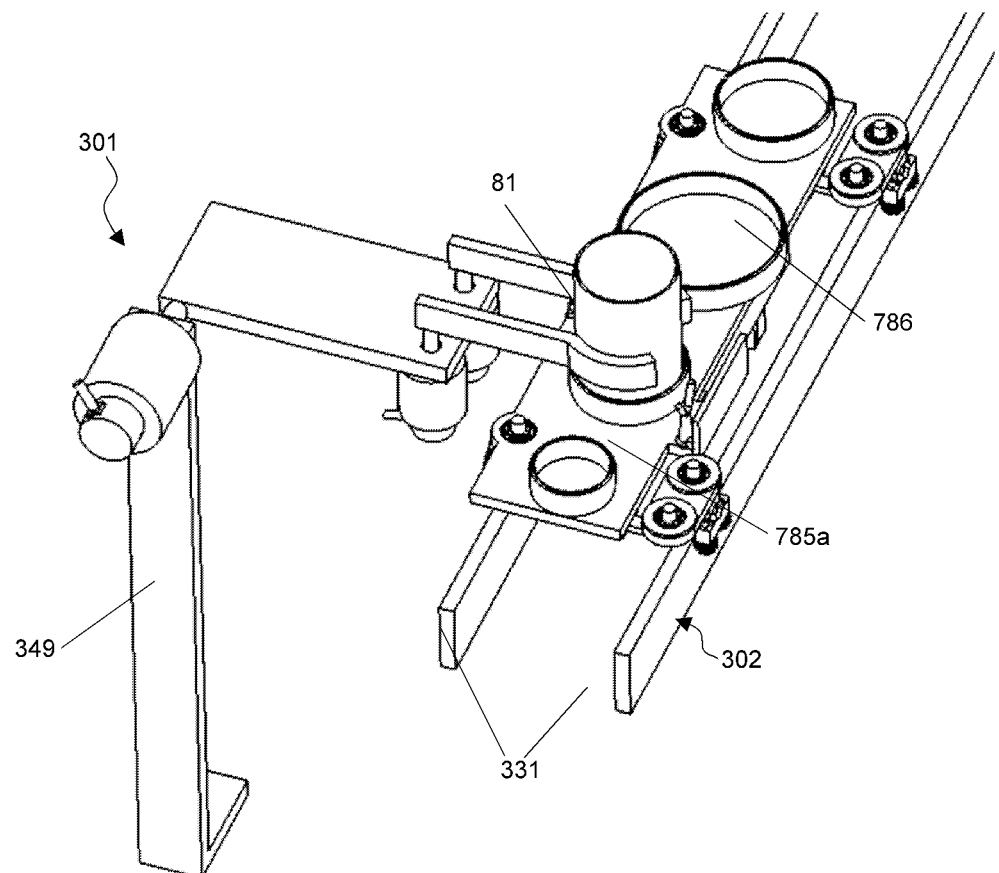
FIG. 9B shows an aerial view of some tracks, a vehicle on the tracks and the ingredient dispensing apparatus of FIG. 8.

Referring to FIG. 9B, a vehicle 790 in the transport system 302 may move an ingredient container 81 to a dispensing position relative to the support component 349 of the ingredient dispensing apparatus 301. Then the support component 345 of the container gripping mechanism 303 may be rotated to the first end-position relative to the support component 349 while the gripping devices 341a and 341b are kept at their second end-positions, and then, the gripping devices 341a and 341b are rotated to their first end-position to grip the ingredient container 81.

Figure 10:
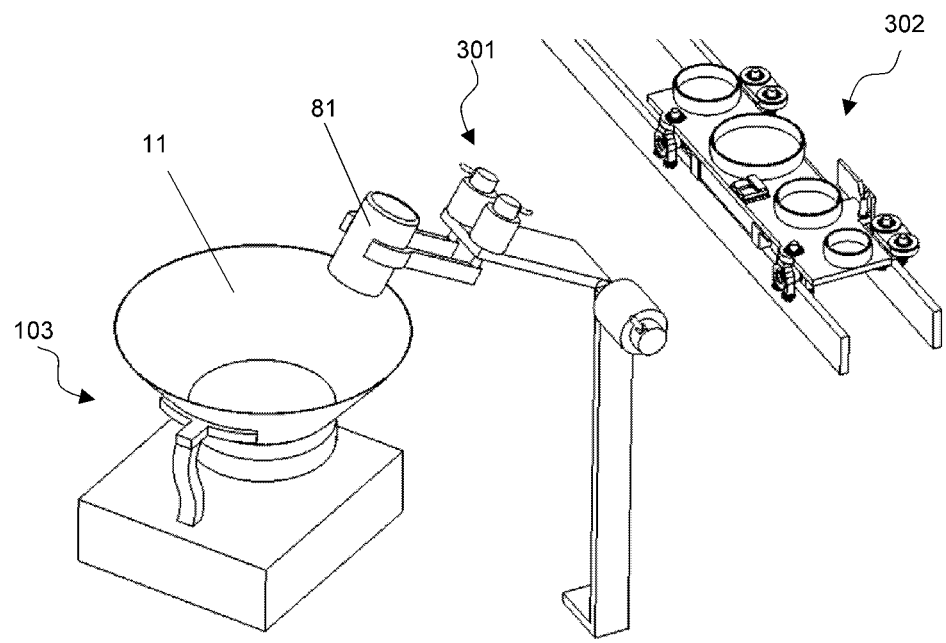
FIG. 10 shows an aerial view of the relative positions of the cooking apparatus of FIG. 3, the ingredient dispensing apparatus of FIG. 8 and the transport system of FIG. 9A.

FIG. 10 shows the relative positions of the cooking apparatus 103 (as in FIG. 4), the ingredient dispensing apparatus 301 (as in FIG. 8) and the transport system 302 (as in FIG. 9A). A vehicle 790 of the transport system 302 moves an ingredient container 81, which contains food or food ingredients, to a dispensing position relative to the support component 349 of the ingredient dispensing apparatus 301. The support component 345 of the ingredient dispensing apparatus 301 may be rotated to the first end-position, and then the gripping devices 341a and 341b may be moved to their first end-positions to grip the ingredient container 81. Then the support component 345 is rotated to the second end-position, to dispense the food or food ingredients from the ingredient container 81 into the cookware 11 of the cooking apparatus 103. The ingredient dispensing apparatus 301 is configured so that virtually entire contents held in the ingredient container 81 are dispensed into the cookware 11; wherein exception (to the "virtually entire content") may be a very small quantity of ingredients which are undesirably stubbornly sticking to a surface of the ingredient container 81 and this small quantity of ingredients will be waste. Afterwards, the support component 345 is rotated back to the first end-position, and after that, the gripping devices 341a and 341b are rotated to their second end-positions, as to release the emptied container, so as to be placed on the container holders 785a of the vehicle 790. It should be noted that the vehicle 790 is braked during the time of the above procedures.

Figure 11:
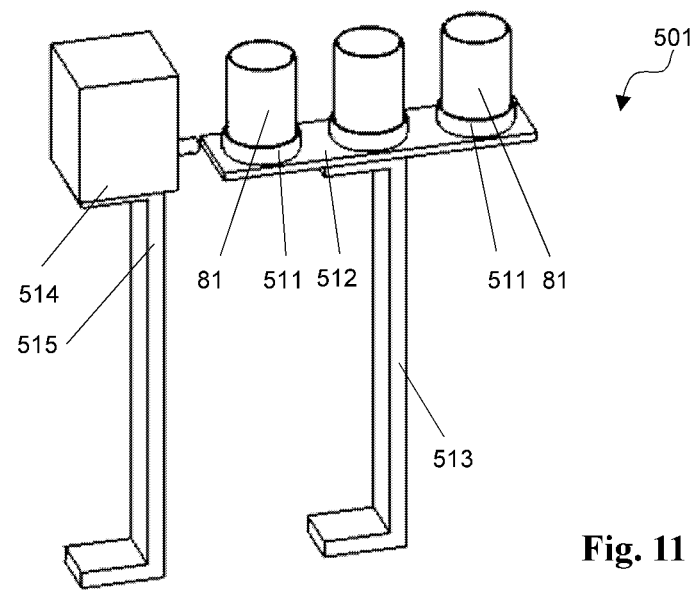
FIG. 11 shows an aerial view of a storage apparatus which can store ingredient containers.

Referring to FIG. 11, a storage apparatus 501 comprises: a plurality of positions 511; and a support component 512, wherein an ingredient container 81 may be placed at one of the positions 511. The support component 512 is fixedly connected to the ground by a rigid connector 513. The storage apparatus 501 also comprises a refrigeration mechanism 514 configured to refrigerate the ingredient containers 81 to keep the food or food ingredients in the containers fresh. The refrigeration mechanism 514 is fixedly connected to the ground by a rigid connector 515.

It should be noted that the storage apparatus 501 may be substituted by the storage system 560 of FIGS. 20A-24 of U.S. patent application Ser. No. 16/517,705 and similar storage systems disclosed in U.S. patent application Ser. No. 16/997,933. The entire contents of these applications are incorporated herein by reference.

It should be noted that the storage apparatus 501 may be substituted by any other storage or containers of food or food ingredients.

Figure 12:
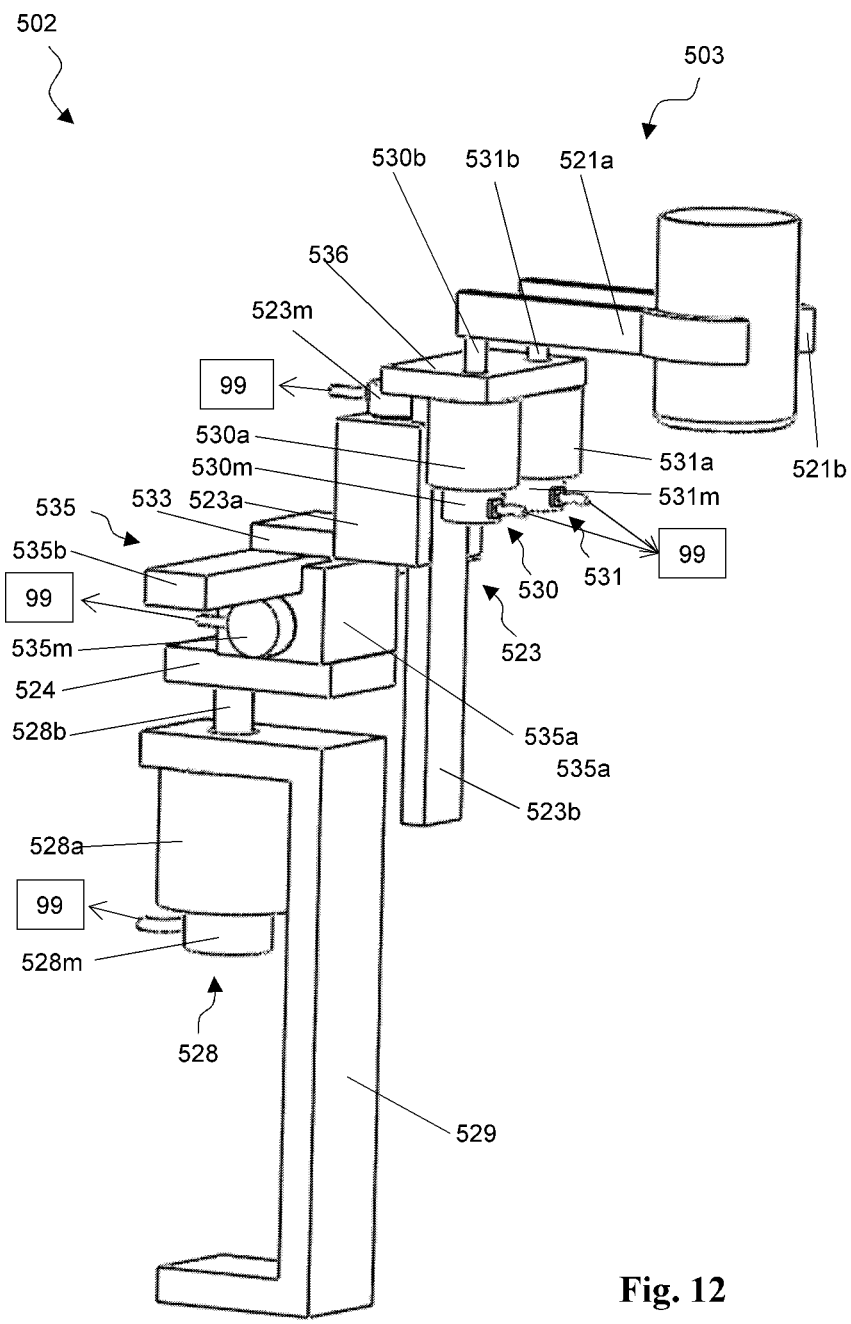
FIG. 12 shows an aerial view of a loading apparatus.
Figure 13A:
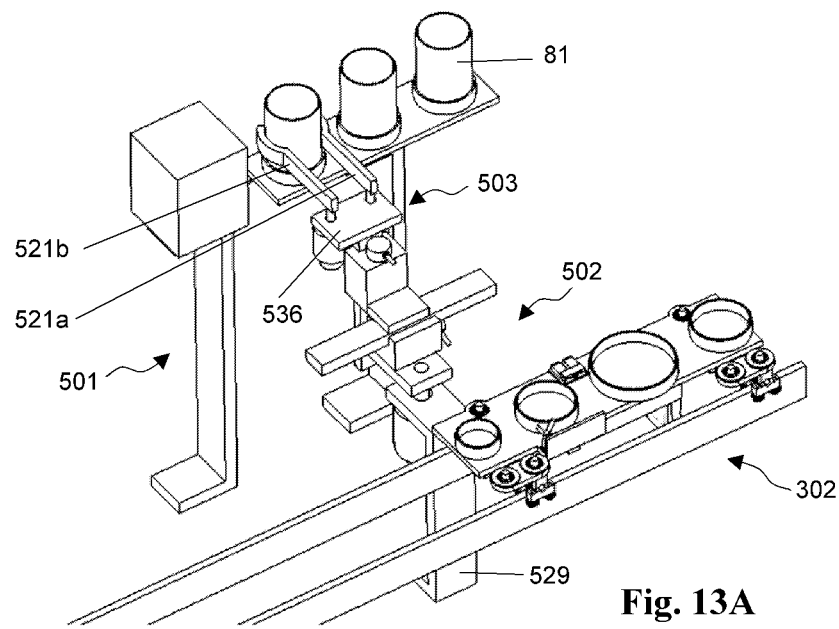
FIGS. 13A-13D show aerial views of the relative positions of the storage apparatus of FIG. 11, the loading apparatus of FIG. 12, and the transport system of FIG. 9A.
Figure 13B:
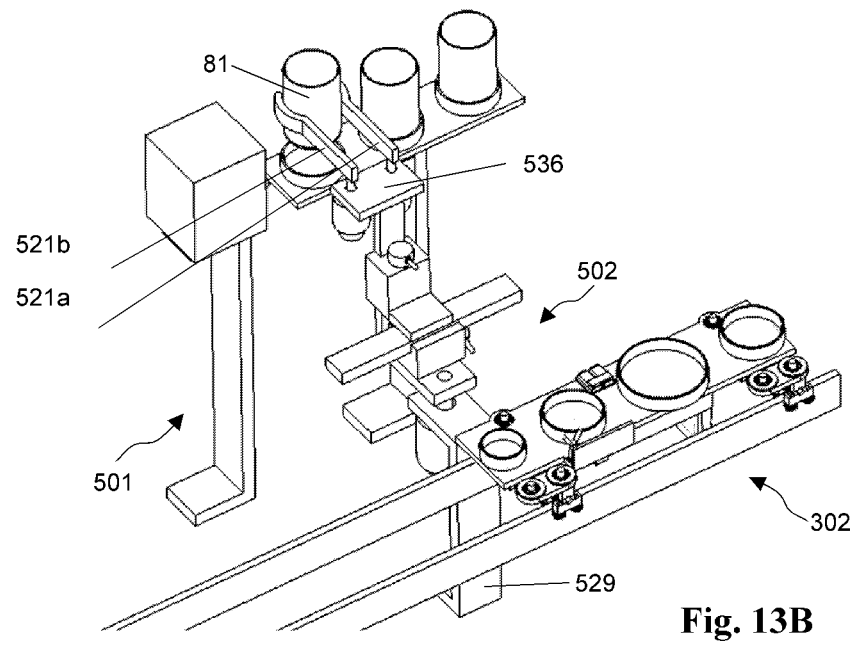
Figure 13C:
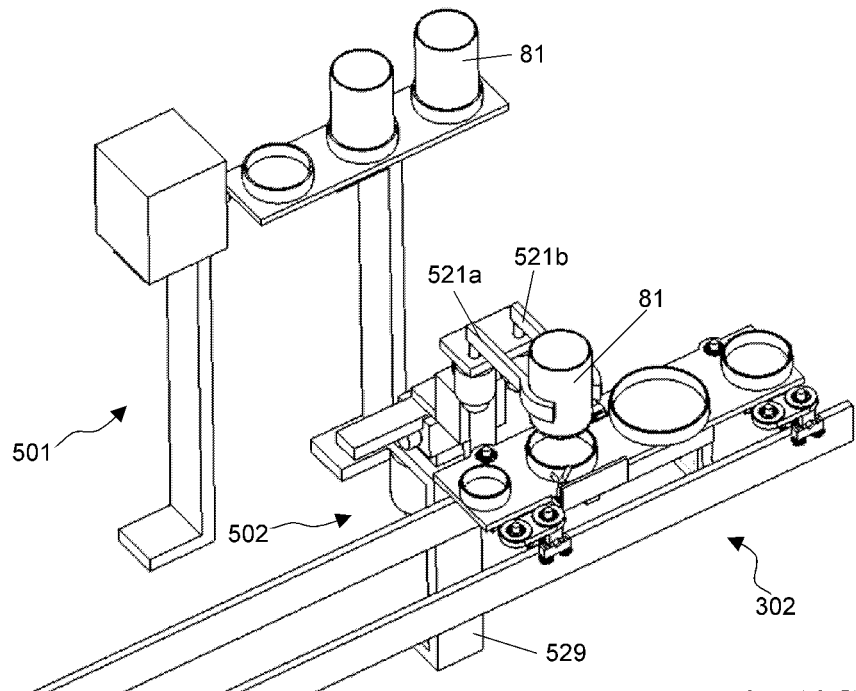
Figure 13D:
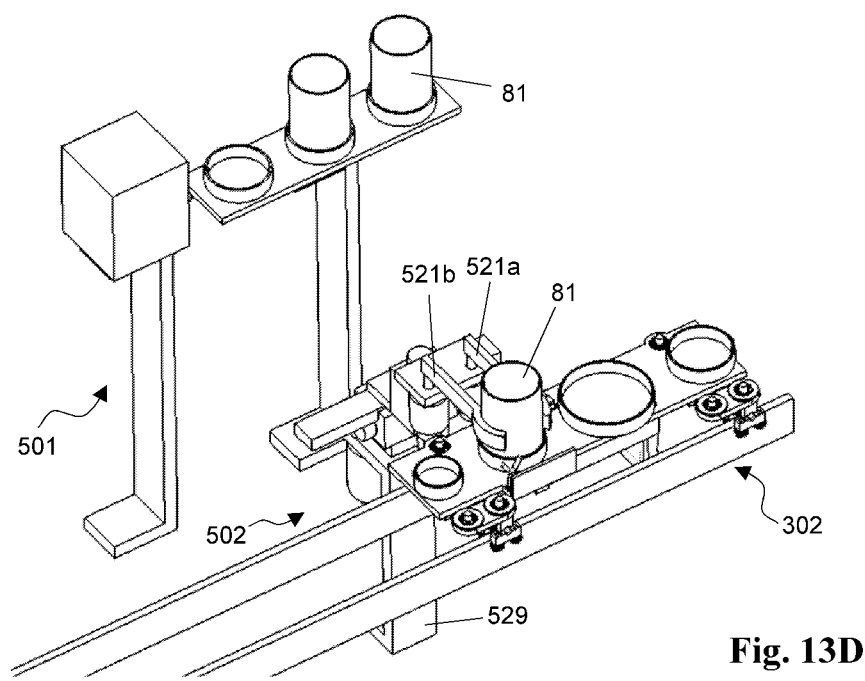

Referring to FIG. 12, a loading apparatus 502 comprises a gripping mechanism 503 comprising: a support component 536; gripping devices (also referred to as grippers) 521a and 521b; and rotational motion mechanisms 530 and 531. The gripping device 521a or 521b may comprise a rubber or silica gel or other elastic material. The rotational motion mechanism 530 comprises a stationary member 530a and a moving member 530b which is constrained to rotate relative to the stationary member 530a. The rotational motion mechanism 531 comprises a stationary member 531a and a moving member 531b which is constrained to rotate relative to the stationary member 531a. The stationary members 530a and 531a are fixedly connected to the support component 536. The gripping device 521a is rigidly or fixedly connected to the moving member 530b. The rotational motion mechanism 530 further comprises a motor 530*m* referred to as a driving member, which can drive a rotation of the moving member 530*b*, and hence of the gripping device 521*a*, relative to the stationary members 530*a*. Similarly, the gripping device 521*b* is rigidly or fixedly connected to the moving member 531*b*. The rotational motion mechanism 531 further comprises a motor 531*m* referred to as a driving member, which can drive a rotation of the moving member 531*b*, and hence of the gripping device 521*b*, relative to the stationary members 531*a*. The axis of rotation of the rotational motion mechanism 530 is parallel to the axis of rotation of the rotational motion mechanism 531, and the rotational motion mechanisms 530 and 531 are configured to rotate the respective gripping devices 521*a* and 521*b* anti-synchronously around a pair of parallel axes. Each of the gripping devices 521*a* and 521*b* is rotated between a first end-position and a second end-position. At the first end-positions, the gripping devices 521*a* and 521*b* may together grip an ingredient container 81. At the second end-positions, the gripping devices 521*a* and 521*b* can open up and release the container.

The loading apparatus 502 further comprises a vertical motion mechanism 523 and a horizontal motion mechanism 535. Said vertical motion mechanism 523 comprises a stationary member 523*a* and a moving member 523*b* which is configured to be moved vertically and linearly relative to the stationary member 523*a*. The moving member 523*b* is rigidly connected to the support component 536 of the gripping mechanism 503. The vertical motion mechanism 523 further comprises a motor 523*m* referred to as a driving member, which can drive a vertical linear motion of the moving member 523*b*, and hence of the support component 536, relative to the stationary member 523*a*. Said horizontal motion mechanism 535 comprises a stationary member 535*a* and a moving member 535*b* which is configured to be moved horizontally and linearly relative to the stationary member 535*a*. The moving member 535*b* of the horizontal motion mechanism 535 is fixedly connected to the stationary member 523*a* of the vertical motion mechanism 523 via a connector 533. The horizontal motion mechanism 535 further comprises a motor 535*m* referred to as a driving member, which can drive a horizontal linear motion of the moving member 535*b*, and hence of the stationary member 523*a*, relative to the stationary member 535*a*.

The loading apparatus 502 further comprises a rotational motion mechanism 528 comprising a stationary member 528*a* and a moving member 528*b* which is constrained to rotate relative to the stationary member 528*a*. The moving member 528*b* is fixedly connected to the stationary member 535*a* of the horizontal motion mechanism 535 via a rigid connector 524, and the stationary member 528*a* is fixedly connected to the ground via a rigid component 529 referred to as a support component. The rotational motion mechanism 528 further comprises a motor 528*m* referred to as a driving member, which can drive a back-and-forth rotation of the moving member 528*b*, and hence of the stationary member 535*a*, relative to the stationary member 528*a* (or equivalently, relative to the rigid component 529). The motion mechanisms 530, 531, 523, 535 and 528 are connected to the computer system 99 of FIG. 1 in the sense that the motors 530*m*, 531*m*, 523*m*, 535*m* and 528*m* are connected to the computer system 99 via wires or by wireless means, and the computer system 99 may be configured to control the motions produced by the motion mechanisms of the loading apparatus 502. The loading apparatus 502 may be controlled by the computer system 99 to grip a container 81, and then move the container vertically, and then horizontally, and then release the container 81 at a different position.

It should be noted that the loading apparatus 502 may be substituted by other mechanisms for the purpose of transferring an ingredient container. Such mechanisms may comprise a robot arm and a vacuum chuck.

FIGS. 13A-13D show the relative positions of the storage apparatus 501 (as in FIG. 11), the loading apparatus 502 (as in FIG. 12) and the transport system 302 (as in FIG. 9A). A vehicle 790 of the transport system 302 moves to a certain position relative to the support component 529 of the loading apparatus 502. When the moving member 528*b* (or the horizontal motion mechanism 535) is at the first end-position in the back-and-forth rotation produced by the rotational motion mechanism 528, and when the moving member 523*b* is at the lower end-position in the vertically linear motion produced by the vertical motion mechanism 523, and when the moving member 535*b* is moved to a certain position by the horizontal motion mechanism 535, the gripping devices 521*a* and 521*b* can be moved to the first end-positions to grip a container (see FIG. 13A). Then, the moving member 523*b* is vertically moved to the upper end-position while the ingredient container is gripped by the gripping devices 521*a* and 521*b* (see FIG. 13B). Then, the moving member 528*b* and the vertical motion mechanism 523 are rotated by the rotational motion mechanism 528 to the second end-position while the ingredient container is gripped by the gripping devices 521*a* and 521*b* (see FIG. 13C). Then, the moving member 523*b* is vertically moved to the lower end-position, and then the gripping devices 521*a* and 521*b* may be moved to release the ingredient container to a container holder 785*a* of a vehicle 790 (see FIG. 13D). The computer system 99 may control the timing and speed of the rotational motion mechanisms 528, the horizontal motion mechanism 535 and the vertical motion mechanism 523. It should be noted that the vehicle 790 is braked during the time of the above procedures.

Figure 14A:
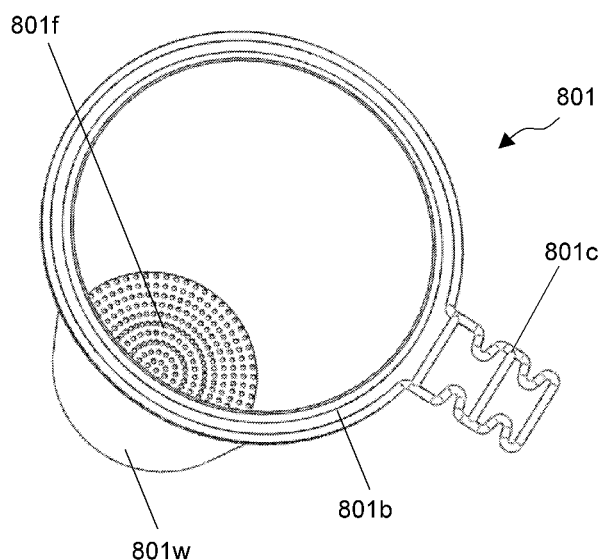
FIG. 14A shows an aerial view of a basket.

Referring to FIG. 14A, a basket 801 comprises a truncated cone 801*w*, a porous bottom 801*f*, an edge 801*b* at the top, and a handle 801*c* at the top. The truncated cone 801*w* may optionally be made of metal sheet with or without holes. The porous bottom 801*f* may comprise a mesh, a net, or a sheet (e.g., metal sheet) with small holes. The (truncated cone 801*w* and the porous bottom 801*f* of the) basket 801 can hold food or food ingredients. The basket 801 may be placed into a cooking liquid (heated water or heated oil) so that the food or food ingredients held in the basket may be boiled or deep fried.

Figure 14B:
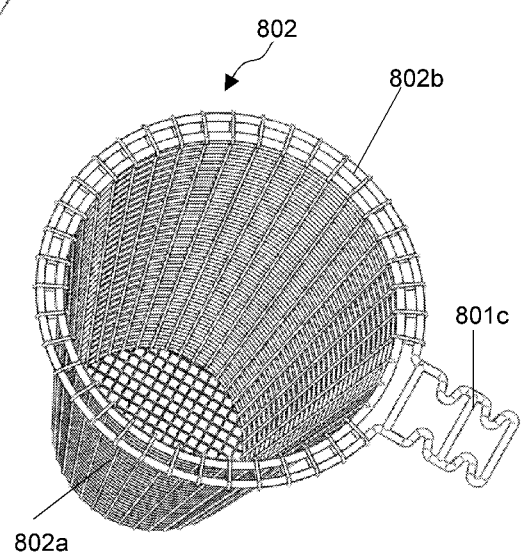
FIG. 14B shows an aerial view of a basket.

Referring to FIG. 14B, a basket 802 comprises a mesh 802*a* (in the shape of a truncated cone with a bottom), an edge 802*b* at the top, and a handle 801*c* at the top. The (mesh 802*a* of the) basket 802 can hold food or food ingredients.

Figure 14C:
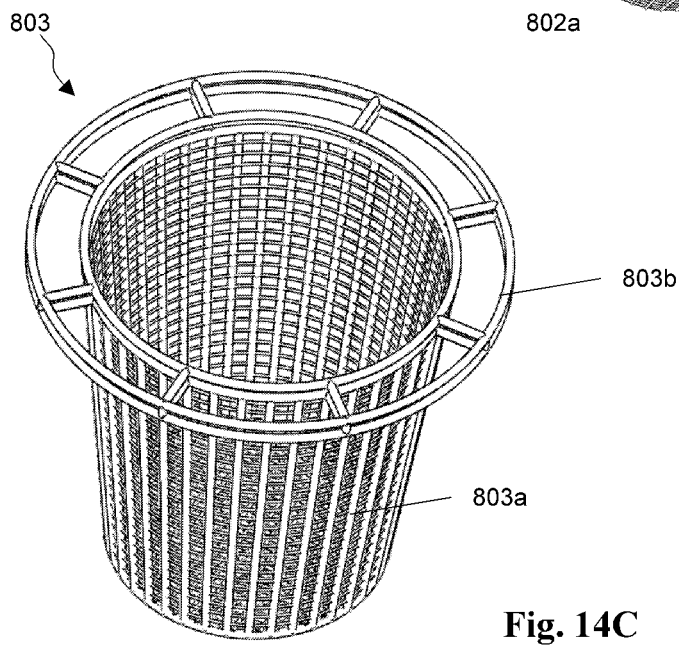
FIG. 14C shows an aerial view of a basket.

Referring to FIG. 14C, a basket 803 comprises a mesh 803*a* (in the shape of a truncated cone with a bottom) and a ring-shaped edge 803*b* at the top. The (mesh 803*a* of the) basket 803 may hold food or food ingredients.

It should be noted that the basket 801, 802, or 803 may be made of stainless steel or other material which can endure high temperatures (of heated oil) and be safe for touching food.

It should be noted that the basket 801, 802, or 803, is a special type of cooking container which can contain or otherwise hold food or food ingredients during a cooking process, e.g., deep frying, boiling. The food or food ingredients held by the basket may not be liquid (or gel) and each piece may need to have a big enough diameter so as not to be dropped out from the basket. The minimum diameter depends on the size of the holes or the density of the net in the basket.

It should also be noted that a basket may optionally have a sectional shape of circle, oval, square, or other shape.

In the following applications, the basket 801 may be substituted by the basket 802, or by other types of basket. The same applies to the basket 803.

Figure 14D:
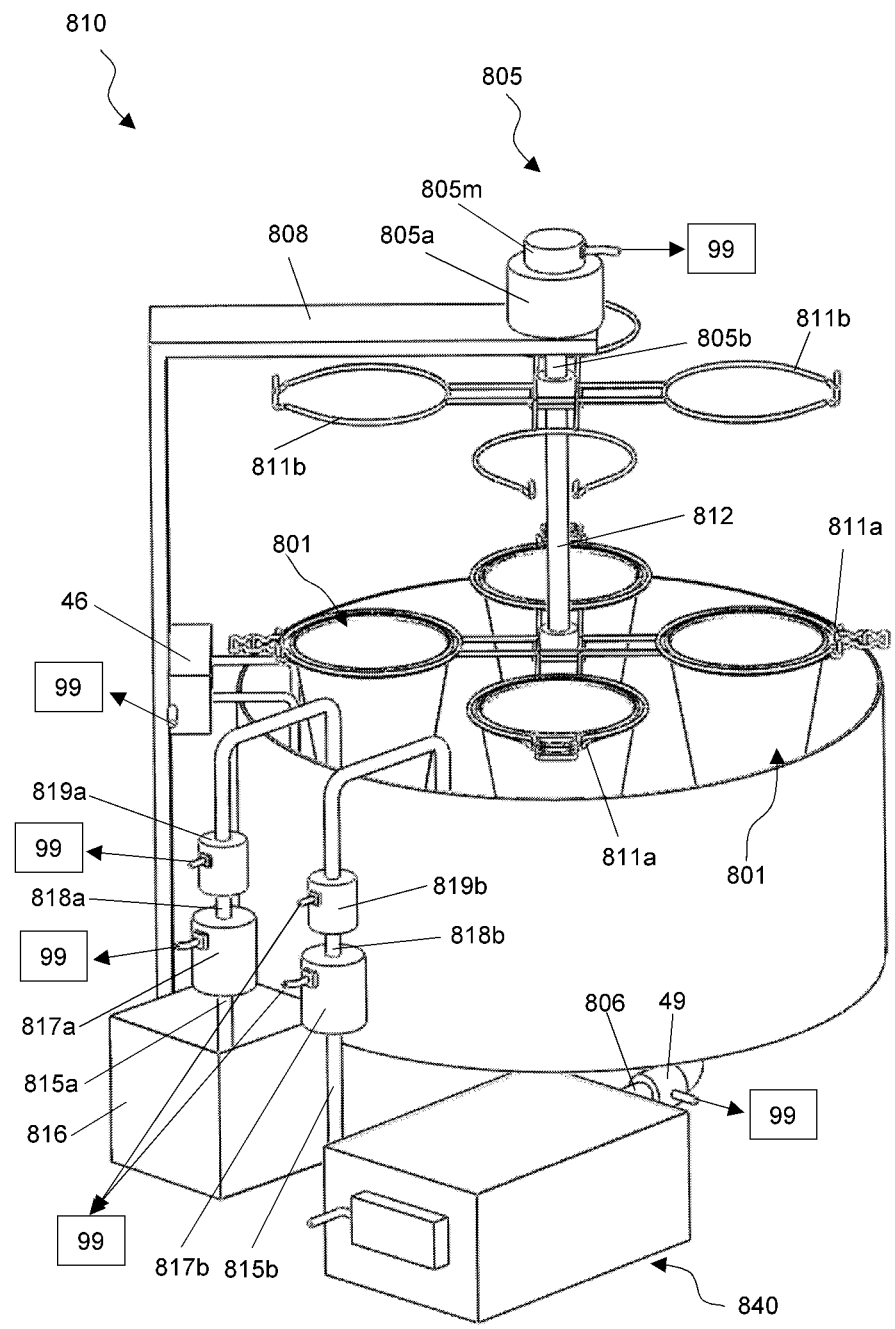
FIGS. 14D-14E show aerial views of a cooking apparatus comprising a liquid container and a plurality of baskets.
Figure 14E:
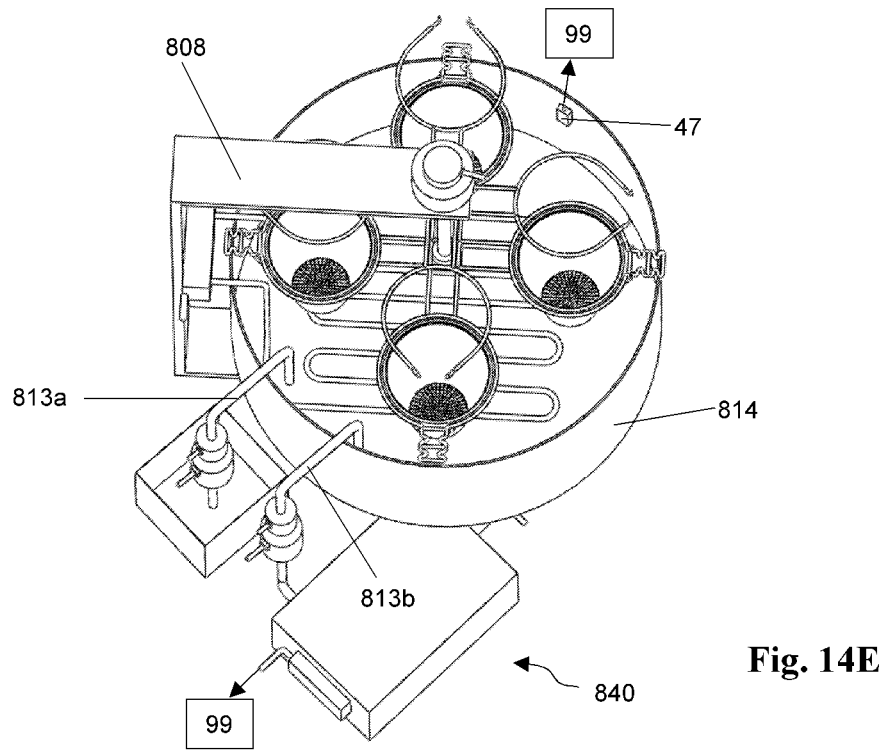

Referring to FIGS. 14D-14E, a cooking apparatus 810 comprises: a plurality of baskets 801 (as in FIG. 14A); a support component 808; and a shaft 812. Each basket 801 is porous in the sense that a liquid, such as water or oil, contained in the basket 801 may leak out when the basket 801 is positioned at an upright position and is held in the air. Moreover, the basket 801, at or near said upright position, is configured to contain or otherwise hold solid food or food ingredients, wherein said solid food or food ingredients should have reasonably big enough diameters in comparison with the holes at or near the bottom of the basket 801.

The cooking apparatus 810 further comprises a rotational motion mechanism 805 and a plurality of basket holders 811a and 811b which are fixedly connected to the shaft 812. The basket holders 811a are at lower heights and are called lower holders or first holders; the basket holders 811b are at higher heights and are called upper holders or second holders. A basket 801 may be held by a said basket holder 811a or 811b but it is detached from the holder. The rotational motion mechanism 805 comprises a stationary member 805a and a moving member 805b which is constrained to rotate relative to the stationary member 805a. The stationary member 805a is fixedly connected to the support component 808, and the moving member 805b is fixedly connected to the shaft 812. The rotational motion mechanism 805 further comprises a motor 805m referred to as a driving member, which can drive a cyclic rotation of the moving member 805b, and hence of the shaft 812, the basket holders 811a and 811b, and the baskets 801 held by the basket holders 811a and 811b relative to the stationary member 805a (or equivalently, relative to the support component 808); wherein the axis of said cyclic rotation is vertical. The rotational motion mechanism 805 is connected to the computer system 99 of FIG. 1 in the sense that the motor 805m are connected to the computer system 99 via wires or by wireless means, and the computer system 99 is configured to control timings and speeds of the rotational motion mechanism 805.

The cooking apparatus 810 further comprises: a resistive heater 46; a liquid container 814; and temperature sensors 47. The resistive heater 46 is connected to the computer system 99 which is configured to control the heating power and timing of said resistive heater 46. The temperature sensors 47 may sense the temperature of the liquid in the liquid container 814. The temperature sensors 47 are connected to the computer system 99, which is configured to receive signals from said temperature sensors. The liquid container 814 is configured to contain a cooking liquid, such as water or cooking oil. The resistive heater 46 can heat the liquid contained in the liquid container 814.

The cooking apparatus 810 further comprises: a pair of liquid pipes 815a and 815b; a pair of liquid pipes 818a and 818b; a pair of liquid pipes 813a and 813b; a pair of flowmeters 819a and 819b; a pair of liquid pumps 817a and 817b; a liquid container 816; a filtering mechanism 840; a liquid pipe 862 configured to connect the liquid container 814 with the filtering mechanism 840; and a solenoid valve 49 mounted on the liquid pipe 862. The solenoid valve 49 may open or stop the used liquid in the liquid container 814 from flowing to the filtering mechanism 840 through the liquid pipe 862, and the used liquid can get filtered by the filtering mechanism 840 and be reused. It should be noted that the filtering mechanism 840 does not allow the liquid to circulate indefinitely. After the liquid is filtered and reused a number of times, the used liquid should be disposed of as waste. An end of the pipe 813a or 813b is inserted into the liquid contained in the liquid container 814 of the cooking apparatus 810. The liquid container 816 is configured to hold a fresh liquid, e.g., water or cooking oil. The pump 817a (or 817b) is connected to a pair of corresponding pipes 815a and 818a (or respectively 815b and 818b), and an end of said pipe 815a is inserted in the liquid contained in the liquid container 816 and the other end of said pipe 815b is connected to the filtering mechanism 840. Each flowmeter 819a (or respectively, 819b) is connected to a pair of corresponding pipes 818a and 813a (or respectively, 818b and 813b) and said pipe 813a (or respectively, 813b) is inserted into the liquid container 814. The pump 817a can draw fresh liquid from the liquid container 816 and pump it into the liquid container 814. The pump 817b can draw (filtered) liquid from the filtering mechanism 840 and pump it into the liquid container 814. The flowmeter 819a and 819b can measure the flow of liquid pumped into the liquid container 814. Pumps 817a, 817b and flowmeters 819a and 819b are connected to the computer system 99 via wires, and the computer system 99 is configured to control the timing and amount of liquid to be drawn by the pump from the corresponding liquid container. The filtering mechanism 840 and the solenoid valve 49 are connected to the computer system 99 via wires, and the computer system 99 is configured to control the timing of used liquid in the liquid container 814 to flow to the filtering mechanism 840 and the timing of the used liquid in the filtering mechanism 840 to be filtered.

It should be noted that a basket 801 which is held by a lower basket holder 811a can be partially immersed in liquid contained in the liquid container 814.

Figure 15:
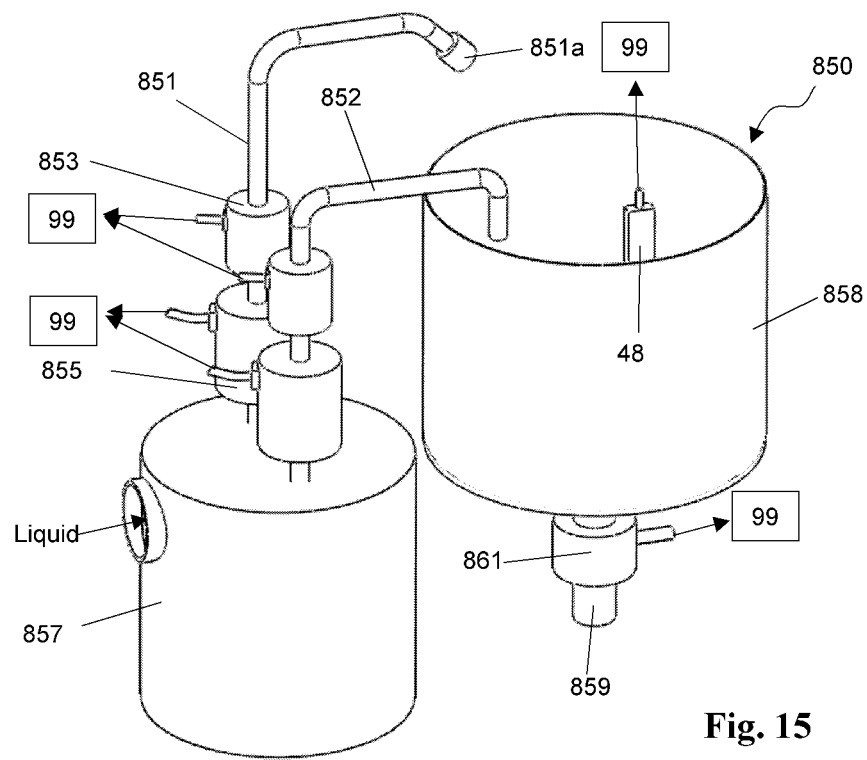
FIG. 15 shows an aerial view of a spraying and soaking apparatus.

Referring to FIG. 15, a spraying and soaking apparatus 850 comprises: a liquid source 857; and a liquid container 858 configured to contain used liquid. Liquid can flow through a pipe 851, a flowmeter 853, and a liquid pump 855, from a liquid source 857 to a spray 851a, which is positioned above the liquid container 858, wherein the liquid pump is used to make the liquid flow and the flowmeter measures the flux of the liquid flow. Liquid can also flow through a liquid pipe 852, a flowmeter 853, a liquid pump 855, from the liquid source 857 to the liquid container 858. The used liquid in the liquid container 858 may flow out through a liquid pipe 859, a solenoid valve 861, and a garbage disposal (not shown in figure), wherein the pipe 859 goes through the solenoid valve 861 and connects the liquid container 858 to the garbage disposal. The solenoid valve 861 may open or stop the fluid flow through the pipe 859. The level gauge 48 is mounted on the liquid container 858 and senses the level of liquid in the container 858. The solenoid valve 861, the pumps 855, the flowmeters 853, and the level gauge 48 are connected to the computer system 99 of FIG. 1. The computer system 99 is configured to control the liquid level in the liquid container 858. The computer system 99 is also configured to control the timing and amount of liquid to be drawn by the pump from the liquid source.

The spray 851a is at a certain level above the container 858, so that a semi-cooked food, such as fried vegetables, may be sprayed with a liquid (such as water) to wash out the semi-cooked food. Alternatively, a semi-cooked food may be soaked in the liquid in the container 858.

It should be noted that if the liquid in the apparatus 850 is water, the liquid source 857 may be connected to a source of tap water (or generally, the liquid source may be a liquid tank with high pressure). In this case, the pumps 855 may be substituted by valves to control the timing of the flow of the liquid through the respective pipes.

Figure 16A:
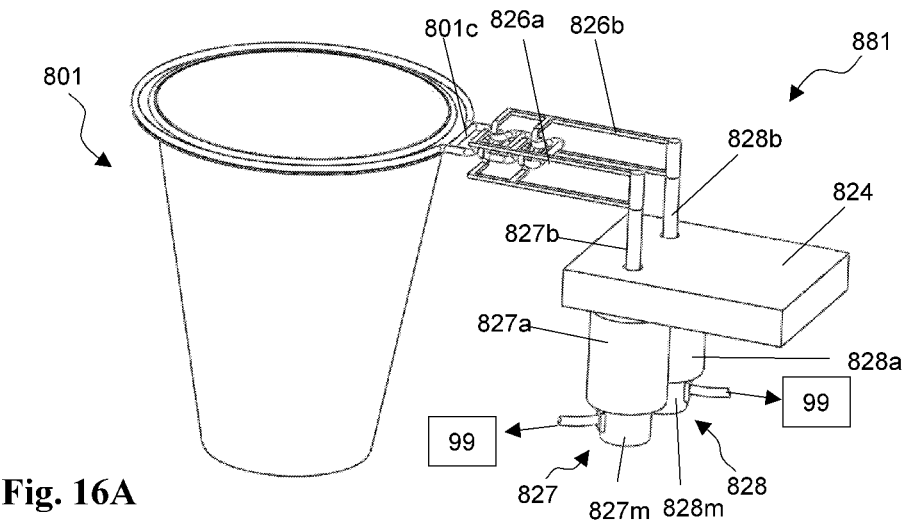
FIG. 16A shows an aerial view of a gripping mechanism gripping the basket of FIG. 14A.

Referring to FIG. 16A, a gripping mechanism 881 comprises: grippers 826a and 826b which can optionally be rigid or elastic components; and rotational motion mechanisms 827 and 828. The rotational motion mechanism 827 comprises a stationary member 827a and a moving member 827b which is constrained to rotate relative to the stationary member 827a. The rotational motion mechanism 828 comprises a stationary member 828a and a moving member 828b which is constrained to rotate relative to the stationary member 828a. The stationary members 827a and 828a are fixedly connected to a support component 824. The gripper 826a is rigidly or fixedly connected to the moving member 827b. The rotational motion mechanism 827 further comprises a motor 827m referred to as a driving member, which can drive a rotation of the moving member 827b, and hence of the gripper 826a, relative to the stationary member 827a (or equivalently, relative to the support component 824). Similarly, the gripper 826b is rigidly or fixedly connected to the moving member 828b. The rotational motion mechanism 828 further comprises a motor 828m referred to as a driving member, which can drive a rotation of the moving member 828b, and hence of the gripper 826b, relative to the stationary member 828a (or equivalently, relative to the support component 824). As the gripper 826a or 826b is rigidly connected to the moving member 827b or respectively 828b, the rotational motion mechanism 827 or 828 can produce a rotation of the gripper 826a or respectively 826b. The axis of rotation of the rotational motion mechanism 827 is parallel to the axis of rotation of the rotational motion mechanism 828, and the rotational motion mechanisms 827 and 828 are configured to rotate the respective grippers 826a and 826b in opposite directions simultaneously. Thus, the grippers 826a and 826b can be rotated anti-synchronously around a pair of parallel axes. Each of the grippers 826a and 826b is rotated between a first end-position and a second end-position. The grippers 826a and 826b are matched to the handle 801c of the basket 801 or 802. At the first end-positions, the grippers 826a and 826b may together grip a basket 801 or 802. At the second end-positions, the grippers 826a and 826b can open up and release the basket. The gripping mechanism 881 may be connected to the computer system 99 of FIG. 1 in the sense that the motors 827m and 828m are connected to the computer system 99 via wires or by wireless means, and the computer system 99 may be configured to control the motions of the grippers 826a and 826b produced by the motion mechanisms 827 and 828. Thus, the gripping mechanism 881 may be controlled by the computer system 99 to grip or release a basket 801 or 802.

Figure 16B:
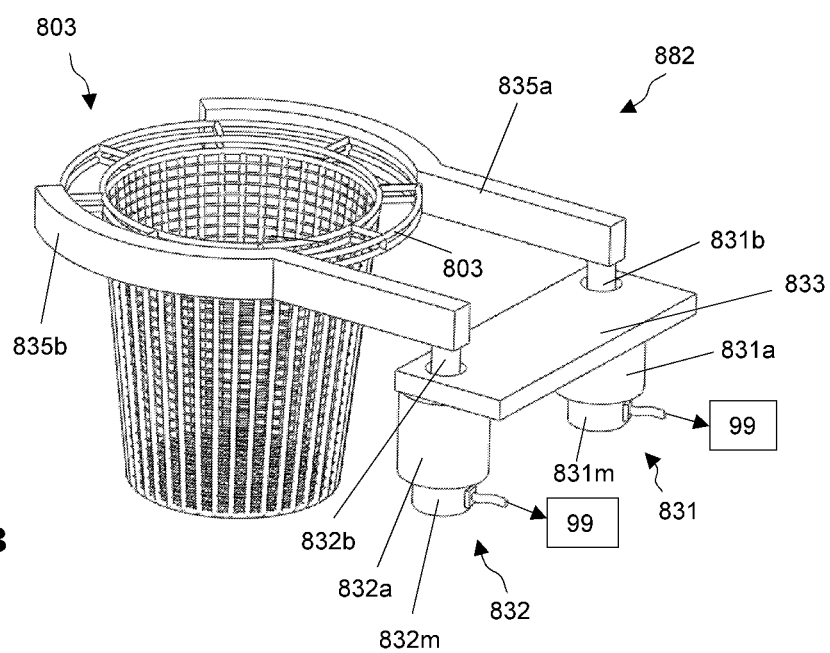
FIG. 16B shows an aerial view of a gripping mechanism gripping the basket of FIG. 14C.

Referring to FIG. 16B, a gripping mechanism 882 comprises: grippers 835a and 835b which can optionally be rigid or elastic components; and rotational motion mechanisms 831 and 832. The rotational motion mechanism 831 comprises a stationary member 831a and a moving member 831b which is constrained to rotate relative to the stationary member 831a. The rotational motion mechanism 832 comprises a stationary member 832a and a moving member 832b which is constrained to rotate relative to the stationary member 832a. The stationary members 831a and 832a are fixedly connected to a support component 833. The gripper 835a is rigidly or fixedly connected to the moving member 831b. The rotational motion mechanism 831 further comprises a motor 831m referred to as a driving member, which can drive a rotation of the moving member 831b, and hence of the gripper 835a, relative to the stationary member 831a (or equivalently, relative to the support component 833). Similarly, the gripper 835b is rigidly or fixedly connected to the moving member 832b. The rotational motion mechanism 832 further comprises a motor 832m referred to as a driving member, which can drive a rotation of the moving member 832b, and hence of the gripper 835b, relative to the stationary member 832a (or equivalently, relative to the support component 833). As the gripper 835a or 835b is rigidly connected to the moving member 831b or respectively 832b, the rotational motion mechanism 831 or 832 can produce a rotation of the gripper 835a or respectively 835b. The axis of rotation of the rotational motion mechanism 831 is parallel to the axis of rotation of the rotational motion mechanism 832, and the rotational motion mechanisms 831 and 832 are configured to rotate the respective grippers 835a and 835b in opposite directions simultaneously. Thus, the grippers 835a and 835b can be rotated anti-synchronously around a pair of parallel axes. Each of the grippers 835a and 835b is rotated between a first end-position and a second end-position. The grippers 835a and 835b are matched to the ring-shaped edge 803b of the basket 803. At the first end-positions, the grippers 835a and 835b may together grip a basket 803. At the second end-positions, the grippers 835a and 835b can open up and release the basket. The gripping mechanism 882 may be connected to the computer system 99 of FIG. 1 in the sense that the motors 831m and 832m are connected to the computer system 99 via wires or by wireless means, and the computer system 99 may be configured to control the motions of the grippers 835a and 835b produced by the motion mechanisms 831 and 832. Thus, the gripping mechanism 882 may be controlled by the computer system 99 to grip or release a basket 803.

Figure 16C:
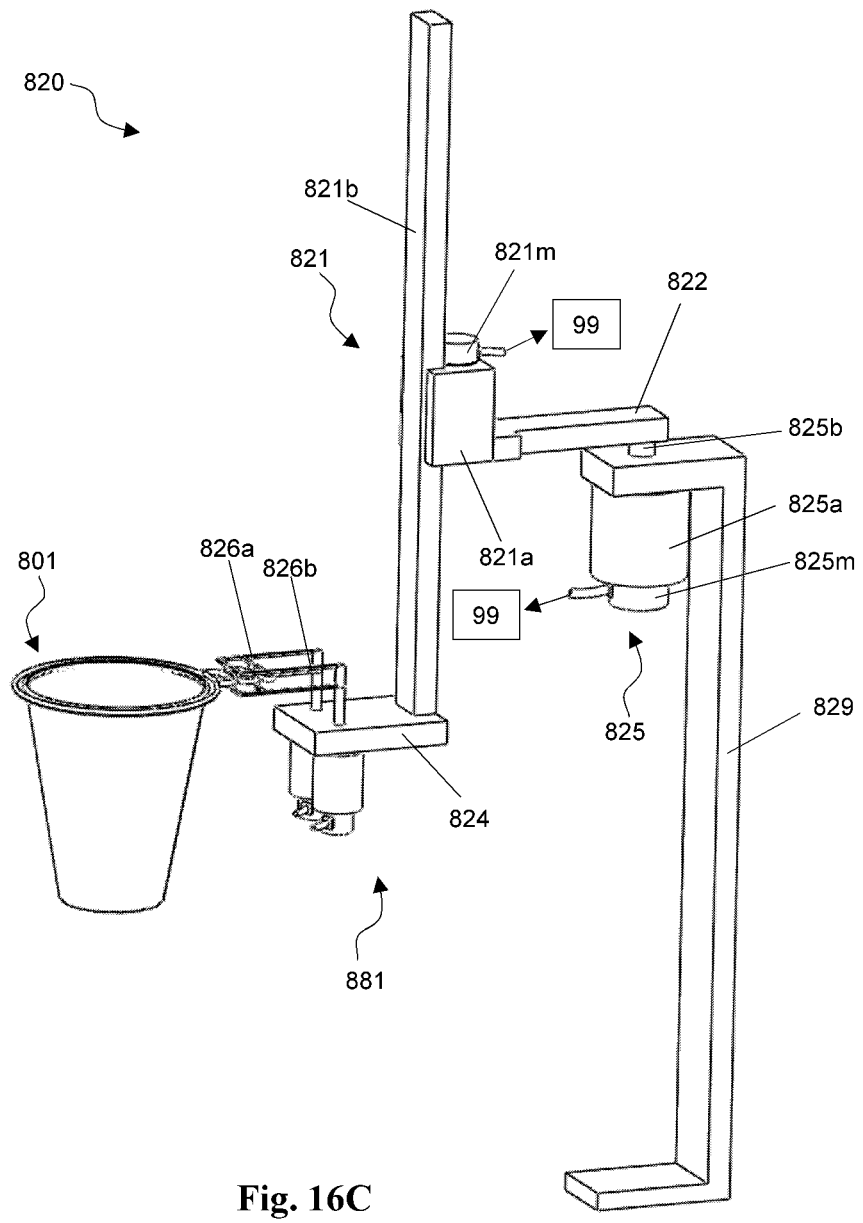
FIG. 16C shows an aerial view of a transfer apparatus.

Referring to FIG. 16C, a transfer apparatus 820 comprises the gripping mechanism 881 and a vertical motion mechanism 821 comprising a stationary member 821a and a moving member 821b which is configured to be moved vertically and linearly relative to the stationary member 821a. The moving member 821b is rigidly connected to the support component 824 of the gripping mechanism 881. The vertical motion mechanism 821 further comprises a motor 821m referred to as a driving member, which can drive a vertical linear motion of the moving member 821b, and hence of the support component 824, relative to the stationary member 821a.

The transfer apparatus 820 further comprises a rotational motion mechanism 825 comprising a stationary member 825a and a moving member 825b which is constrained to rotate relative to the stationary member 825a. The moving member 825b is fixedly connected to the stationary member 821a of the vertical motion mechanism 821 via a rigid connector 822, and the stationary member 825a is fixedly connected to the ground via a rigid component 829 referred to as a support component. The rotational motion mechanism 825 further comprises a motor 825m referred to as a driving member, which can drive a back-and-forth rotation of the moving member 825b, and hence of the stationary member 821a, between a first end-position and a second end-position, relative to the stationary member 825a (or equivalently, relative to the rigid component 829). The motion mechanisms 827, 828, 821 and 825 are connected to the computer system 99 of FIG. 1 in the sense that the motors 827m, 828m, 821m and 825m are connected to the computer system 99 via wires or by wireless means, and the computer system 99 may be configured to control the motions produced by the motion mechanisms of the transfer apparatus 820. The transfer apparatus 820 may be controlled by the computer system 99 to grip a basket 801, and then move the basket vertically, and then horizontally, and then release the basket 801 at a different position.

At the first end-position of the stationary member 821a of the vertical motion mechanism 821 in the back-and-forth rotation, and when the moving member 821b is at a certain position relative to the support component 829, the grippers 826a and 826b of the gripping mechanism 881 can be moved to the first end-positions to grip a basket 801. When the stationary member 821a of the vertical motion mechanism 821 is rotated to the second end-position while the basket 801 is gripped by the grippers 826a and 826b, the basket 801 is also rotated.

It should be noted that the transfer apparatus 820 may be substituted by other mechanisms for the purpose of moving a basket. Such mechanisms may comprise a robot arm.

Figure 16D:
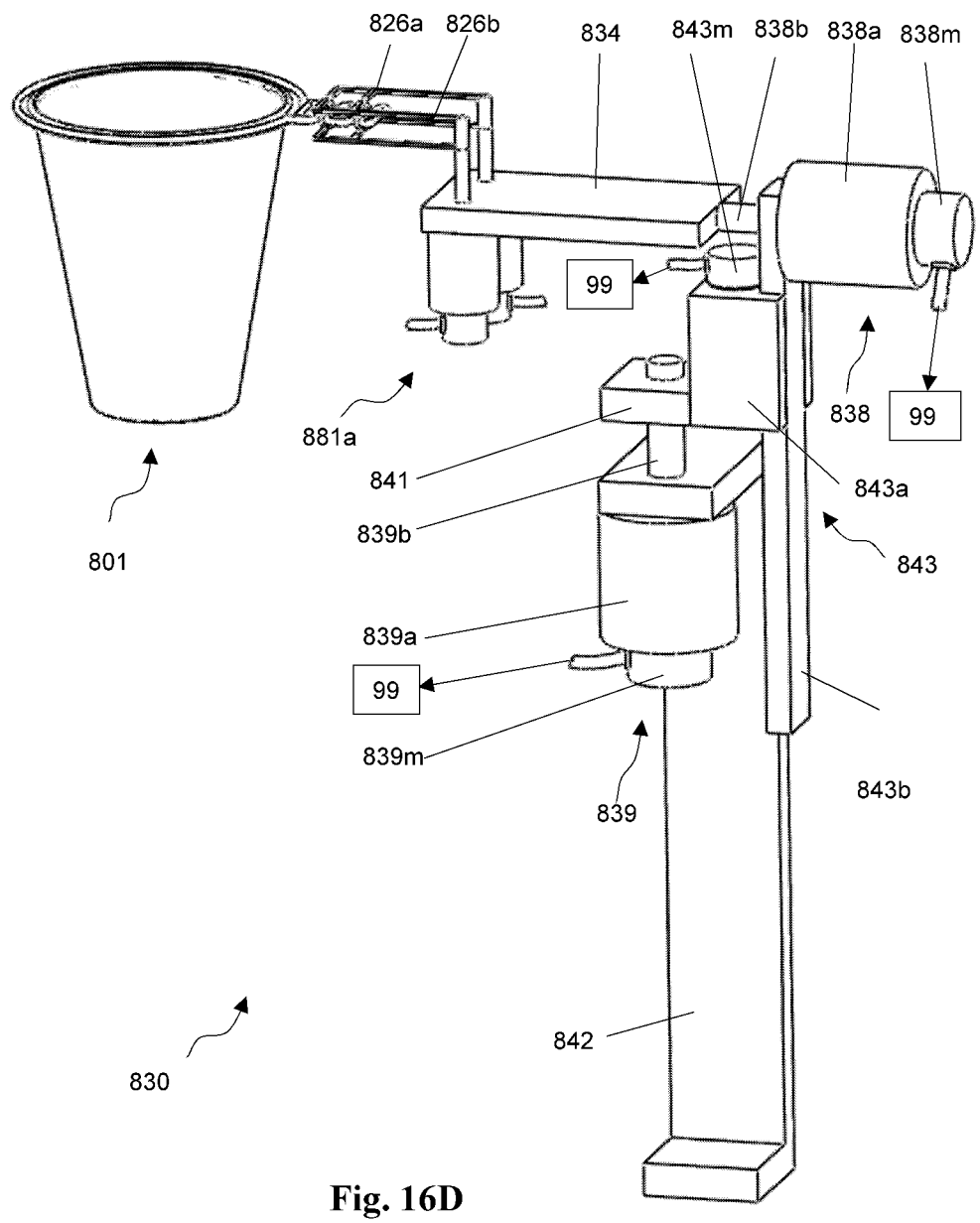
FIG. 16D shows an aerial view of a food dispensing apparatus.

Referring to FIG. 16D, a food dispensing apparatus 830 comprises a gripping mechanism 881a and a rotational motion mechanism 838. The gripping mechanism 881a is the same as the gripping mechanism 881 except that the support component 824 of the gripping mechanism 881 is substituted by a support component 834. Said rotational motion mechanism 838 comprises a stationary member 838a and a moving member 838b which is constrained to rotate relative to the stationary member 838a. The moving member 838b is fixedly connected to the support component 834 of the gripping mechanism 881a. The rotational motion mechanism 838 further comprises a motor 838m referred to as a driving member, which can drive a back-and-forth rotation of the moving member 838b, and hence of the support component 834, between a first end-position and a second end-position, relative to the stationary member 838a.

The food dispensing apparatus 830 further comprises a vertical motion mechanism 843 comprising: a stationary member 843a; and a moving member 843b, which is configured to be moved vertically and linearly relative to the stationary member 843a. The moving member 843b is rigidly connected to the stationary member 838a of the rotational motion mechanism 838. The vertical motion mechanism 843 further comprises a motor 843m referred to as a driving member, which can drive a vertical linear motion of the moving member 843b, and hence of the stationary member 838a, relative to the stationary member 843a.

The food dispensing apparatus 830 further comprises a rotational motion mechanism 839 comprising a stationary member 839a and a moving member 839b which is constrained to rotate relative to the stationary member 839a. The moving member 839b is fixedly connected to the stationary member 843a of the vertical motion mechanism 843 via a rigid connector 841, and the stationary member 839a is fixedly connected to the ground via a rigid component 842 referred to as a support component. The rotational motion mechanism 839 further comprises a motor 839m referred to as a driving member, which can drive a back-and-forth rotation of the moving member 839b, and hence of the stationary member 843a, between a first end-position and a second end-position, relative to the stationary member 839a (or equivalently, relative to the rigid component 842). The motion mechanisms 827, 828, 838, 843 and 839 are connected to the computer system 99 of FIG. 1 in the sense that the motors 827m, 828m, 838m, 843m and 839m are connected to the computer system 99 via wires or by wireless means, and the computer system 99 may be configured to control the motions produced by the motion mechanisms of the food dispensing apparatus 830. The food dispensing apparatus 830 may be controlled by the computer system 99 to grip a basket 801, and then move the basket vertically, and then horizontally, and then turn the basket 801.

When the support component 834 of the gripping mechanism 881a is at the first end-position in the back-and-forth rotation, when the stationary member 843a of the vertical motion mechanism 843 is at the first end-position in the back-and-forth rotation, when the moving member 843b is moved to a certain position relative to the support component 842, then the gripper 826a and 826b of the gripping mechanism 881a can be moved to the first end-positions to grip a basket 801 which is held by an upper basket holder 811b and which contains food or food ingredients under the condition that the basket 801 is at a certain position relative to the support component 842. Then, the moving member 843b is moved up to another position, and the stationary member 843a of the vertical motion mechanism 843 is rotated to the second end-position, and the support component 834 of the gripping mechanism 881a is rotated to the second end-position while the basket 801 is gripped by the gripper 826a and 826b of the gripping mechanism 881a, so that the basket 801 is turned by an angle above a food container to dispense food or food ingredients into the food container. Virtually the entire contents of the basket are dispensed by the turning of the basket.

It should be noted that the food dispensing apparatus 830 may be substituted by other mechanisms for the purpose of transferring a basket. Such mechanisms may comprise a robot arm.

Figure 17A:
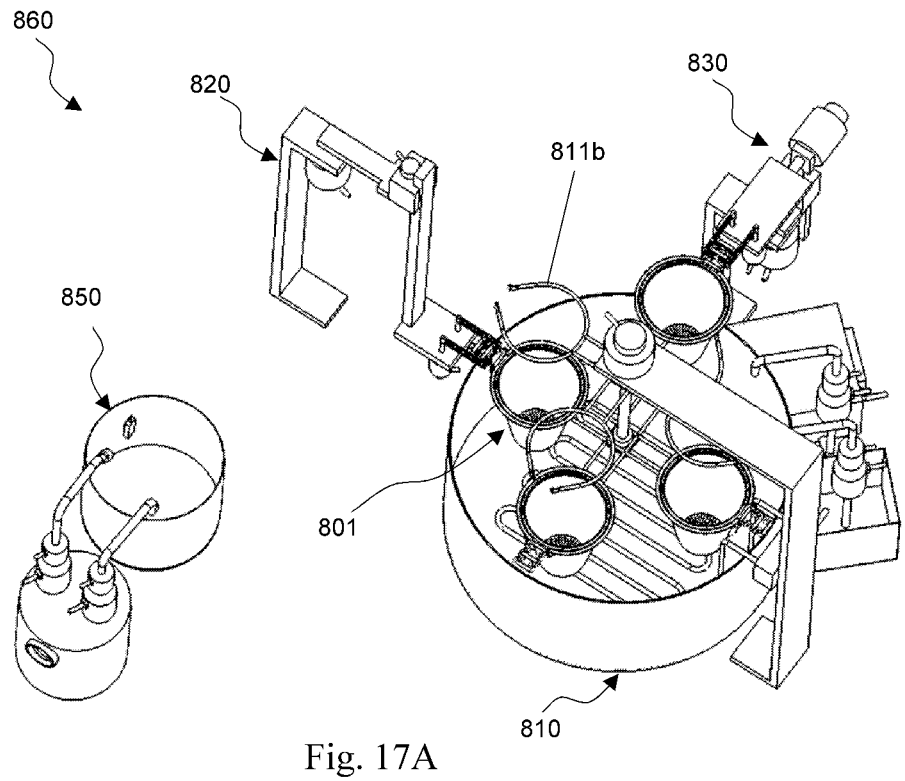
FIGS. 17A-17C show aerial views of a cooking apparatus comprising the cooking apparatus of FIG. 14D, the transfer apparatus of FIG. 16C, the food dispensing apparatus of FIG. 16D and the spraying and soaking apparatus of FIG. 15.
Figure 17B:
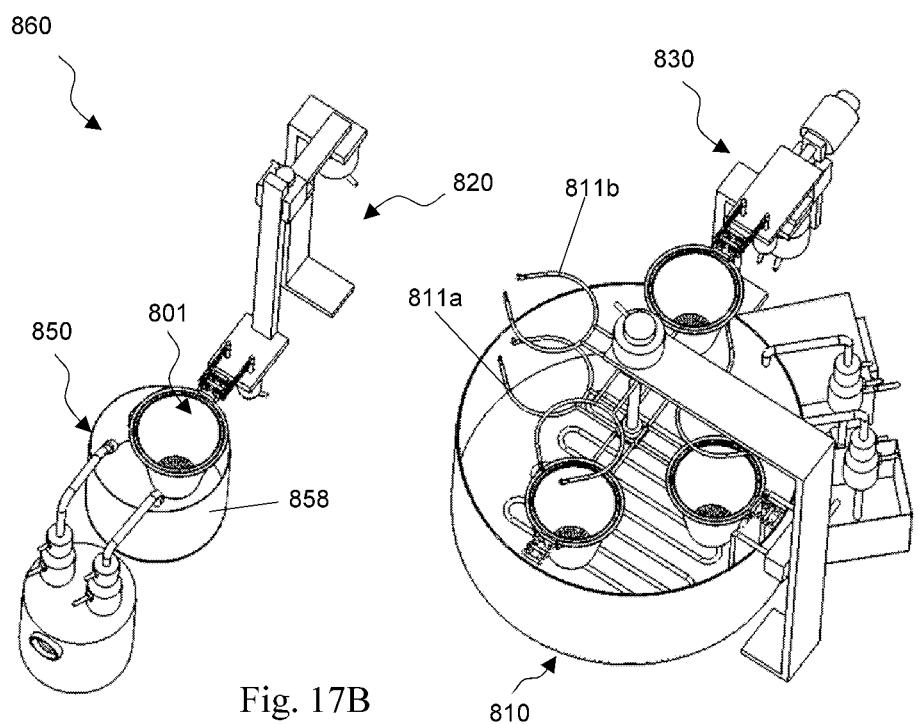
Figure 17C:
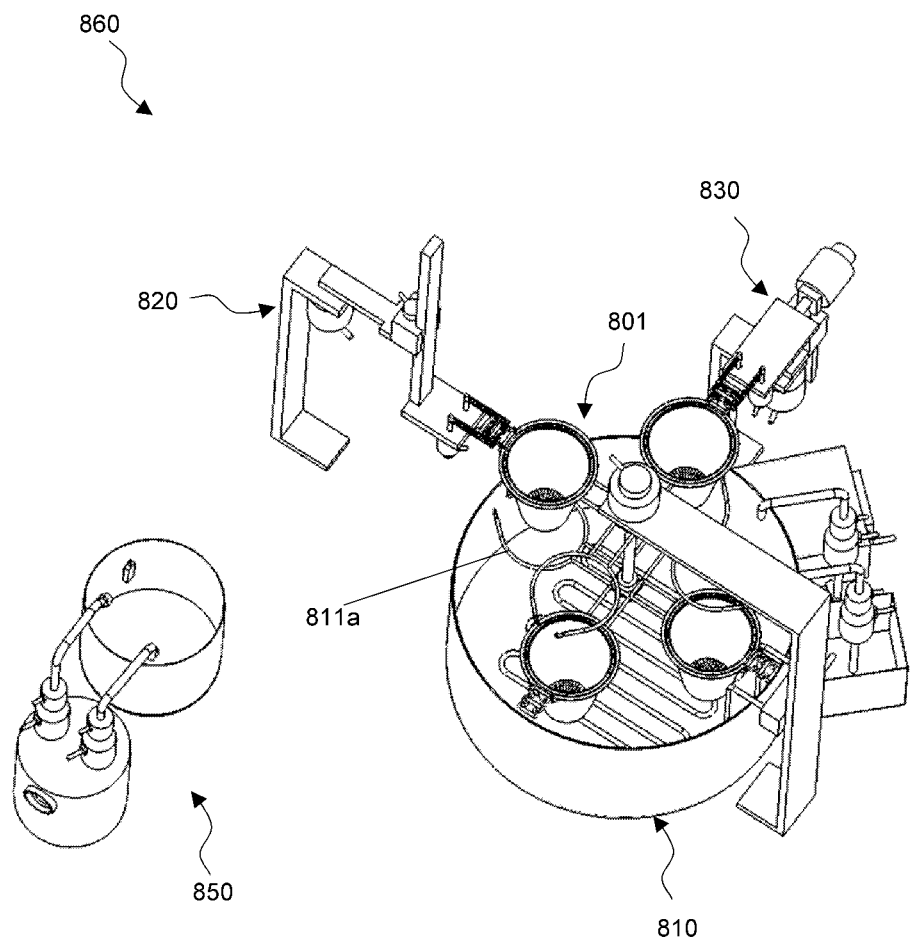

Referring to FIGS. 17A-17C, a cooking apparatus 860 comprises a cooking apparatus 810 (as in FIGS. 14D-14E), a transfer apparatus 820 (as in FIG. 16C), a food dispensing apparatus 830 (as in FIG. 16D) and a spraying and soaking apparatus 850 (as in FIG. 15). When a basket 801 of the cooking apparatus 810 held by a lower basket holder 811a of the cooking apparatus 810 is rotated to a certain position relative to the support component 808, the gripper devices 826a and 826b in the gripping mechanism 881 of the transfer apparatus 820 may work together to grip the basket 801, as shown in FIG. 17A. When the transfer apparatus 820 moves the gripped basket 801 to a certain position relative to the support component 829, the gripped basket 801 is partially immersed in the liquid of the liquid container 858. When the gripped basket 801 is moved to another position, the sprayer 851a of the spraying and soaking apparatus 850 can spray liquid into food or food ingredients held in the gripped basket 801 (see FIG. 17B). When the gripped basket 801 is moved to a third position relative to the support component 829, the gripped basket 801 may be released by rotating the gripping devices 826a and 826b of the gripping mechanism 881 to their second end-positions, and then the basket 801 may be dropped onto an upper basket holder 811b. When said basket 801 is held by said upper basket holder 811b, said basket 801 is entirely above the liquid container 814, as shown in FIG. 17C. When the upper basket holder 811b is rotated to a certain position, the basket 801 held by said upper basket holder 811b may be gripped by the gripper 826a and 826b of the gripping mechanism 881a of the food dispensing apparatus 830, as shown in FIGS. 17A-17C. Then the food dispensing apparatus 830 may move and rotate the basket 801 to dispense a cooked or cooked food from the basket 801.

It should be noted that the food dispensing apparatus 830 and the transfer apparatus 820 may be combined into one mechanism comprising a robot arm.

It should be noted that basket 801 of the cooking apparatus 860 may be substituted by the basket 802 or 803. If the basket 801 is substituted by the basket 803, the gripping mechanism 881 of the transfer apparatus 820 and the gripping mechanism 881*a* of the food dispensing apparatus 830 need to be substituted by the gripping mechanism 882.

Figure 18:
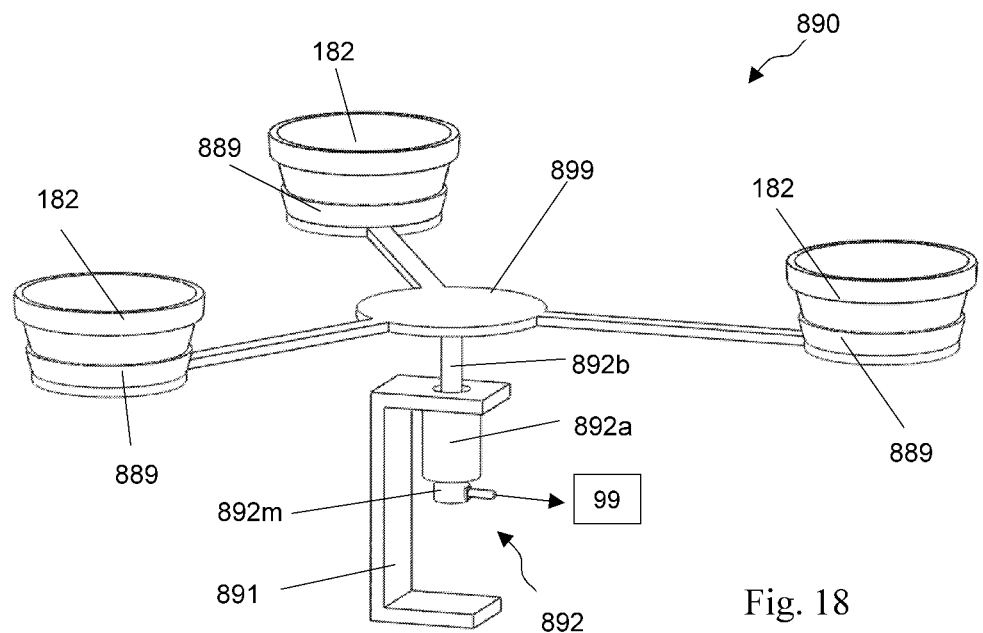
FIG. 18 shows an aerial view of a transport apparatus.

Referring to FIG. 18, a transport apparatus 890 comprises: a rotatable component 899; a plurality of container holders 889 which are fixedly mounted on the rotatable component 899; and a rotational motion mechanism 892 comprising a stationary member 892*a* and a moving member 892*b* which is constrained to rotate relative to the stationary member 892*a*. The holders 889 are cyclically and symmetrically positioned around the axis of the rotational motion mechanism 892. Each container holder 889 may position and hold a food container 182 so that the movement of said food container is restricted or limited when the rotatable component 899 is rotated; wherein the food container 182 is configured to contain or otherwise hold food. The moving member 892*b* is fixedly connected to the rotatable component 899, and the stationary member 892*a* is fixedly connected to the ground via a rigid component 891 referred to as a support component. The rotational motion mechanism 892 further comprises a motor 892*m* referred to as a driving member, which can drive an intermittent rotation of the moving member 892*b*, and hence of the rotatable component 899, relative to the stationary member 892*a* (or equivalently, relative to the rigid component 891). The angle of each intermittent rotation may be the same, although this is not a strict requirement. The motion mechanism 892 is connected to the computer system 99 in the sense that the motor 892*m* is connected to the computer system 99 via wires or by wireless means, and the computer system 99 may be configured to control the motions produced by the motion mechanism 892.

It should be noted that the container holders 889 may be substituted by a solid shape which can position or hold a food container.

Figure 19A:
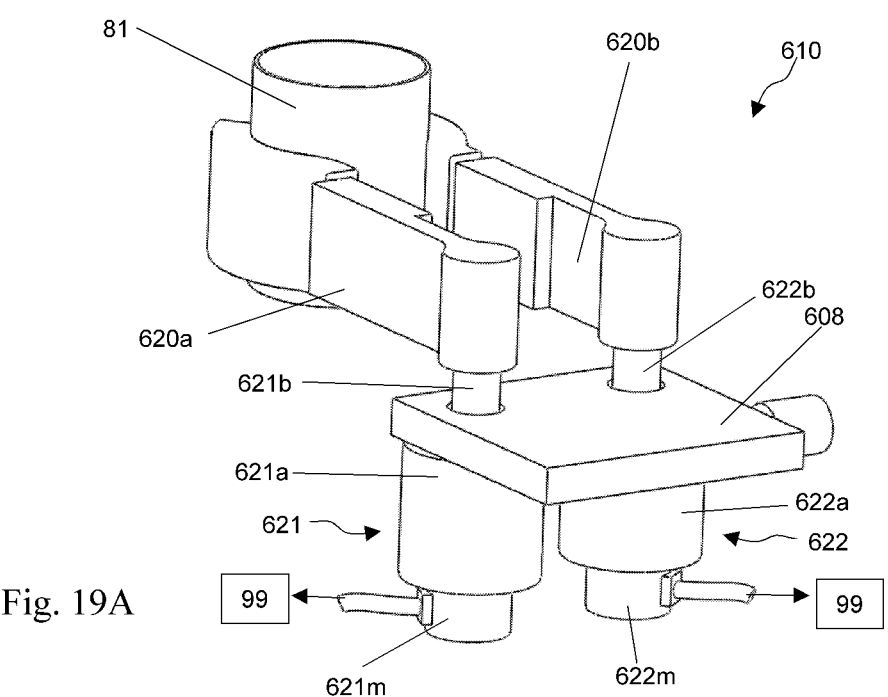
FIGS. 19A-19C show aerial views of parts of an ingredient dispensing apparatus.

Referring to FIG. 19A, a container gripping mechanism 610 comprises: grippers 620*a* and 620*b* which can optionally be rigid or elastic components; and rotational motion mechanisms 621 and 622. The rotational motion mechanism 621 comprises a stationary member 621*a* and a moving member 621*b* which is constrained to rotate relative to the stationary member 621*a*. The rotational motion mechanism 622 comprises a stationary member 622*a* and a moving member 622*b* which is constrained to rotate relative to the stationary member 622*a*. The stationary members 621*a* and 622*a* are fixedly connected to a support component 608. The gripper 620*a* is rigidly or fixedly connected to the moving member 621*b*. The rotational motion mechanism 621 further comprises a motor 621*m* referred to as a driving member, which can drive a rotation of the moving member 621*b*, and hence of the gripper 620*a*, relative to the stationary member 621*a* (or equivalently, relative to the support component 608). Similarly, the gripper 620*b* is rigidly or fixedly connected to the moving member 622*b*. The rotational motion mechanism 622 further comprises a motor 622*m* referred to as a driving member, which can drive a rotation of the moving member 622*b*, and hence of the gripper 620*b*, relative to the stationary member 622*a* (or equivalently, relative to the support component 620). As the gripper 620*a* or 620*b* is rigidly connected to the moving member 621*b* or respectively 622*b*, the rotational motion mechanism 621 or 622 can produce a rotation of the gripper 620*a* or respectively 620*b*. The axis of rotation of the rotational motion mechanism 621 is parallel to the axis of rotation of the rotational motion mechanism 622, and the rotational motion mechanisms 621 and 622 are configured to rotate the respective grippers 620*a* and 620*b* in opposite directions simultaneously. Thus, the grippers 620*a* and 620*b* can be rotated anti-synchronously around a pair of parallel axes. Each of the grippers 620*a* and 620*b* is rotated between a first end-position and a second end-position. At the first end-positions, the grippers 620*a* and 620*b* may together grip an ingredient container 81. At the second end-positions, the grippers 620*a* and 620*b* can open up and release the ingredient container. The container gripping mechanism 610 may be connected to the computer system 99 of FIG. 1 in the sense that the motors 621*m* and 622*m* are connected to the computer system 99 via wires or by wireless means, and the computer system 99 may be configured to control the motions of the grippers 620*a* and 620*b* produced by the motion mechanisms 621 and 622. Thus, the container gripping mechanism 610 may be controlled by the computer system 99 to grip or release an ingredient container 81.

It should be noted that the support component 608 may be referred as the support component of the container gripping mechanism 610.

Figure 19B:
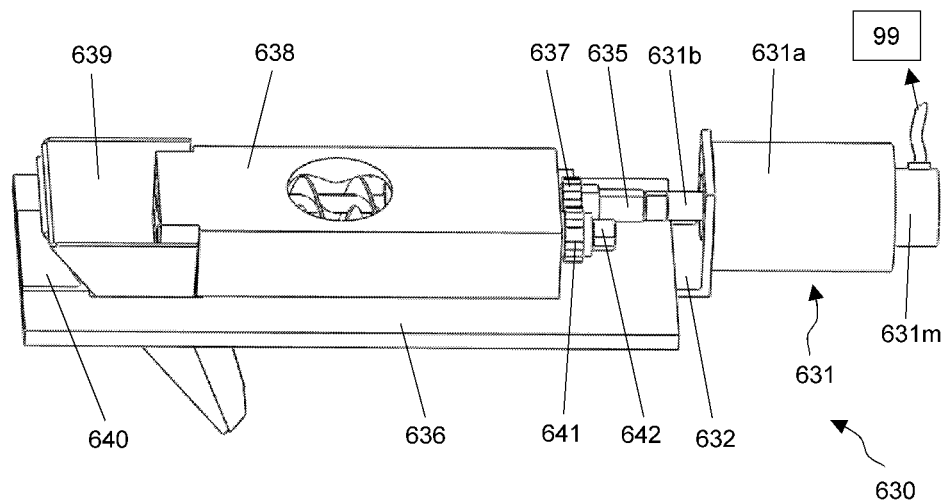

Referring to FIG. 19B, a double screw mechanism 630 comprises: screw shafts 635 and 642; gears 637 and 641; and a support component 636. The gear 637 is rigidly connected to the screw shaft 635, and the gear 641 is rigidly connected to the screw shaft 642. The gear 637 is engaged with the gear 641. Thus, the screw shafts 635 and 642 can be constrained to rotate in opposite directions around their respective axes. The double screw mechanism 630 further comprises: a container 638 configured to be fixedly connected to the support component 636, wherein the container 638 comprises an inlet and an outlet; a funnel 639 configured to be fixedly connected to the support component 636 by a rigid connector 640; and a rotational motion mechanism 631 comprising a stationary member 631*a* and a moving member 631*b* which is constrained to rotate relative to the stationary member 631*a*. The moving member 631*b* is fixedly connected to the screw shaft 635, and the stationary member 631*a* is fixedly connected to the support component 636 via a rigid connector 632. The rotational motion mechanism 631 further comprises a motor 631*m* referred to as a driving member, which can drive a rotation of the moving member 631*b*, and hence of the screw shaft 635, relative to the stationary member 631*a* (or equivalently, relative to the support component 636). The outlet of the container 638 is connected to the funnel 639. As explained before, the rotational motion mechanism 631 may rotate the screw shafts 635 and 642. The screw shafts 635 and 642 are located inside the container 638, so that the rotations of the screw shafts 635 and 642 can dispense the food or food ingredients into the container 638 through the funnel 639. The motion mechanism 631 is connected to the computer system 99 of FIG. 1 in the sense that the motor 631*m* is connected to the computer system 99 via wires or by wireless means, and the computer system 99 may be configured to control the motions produced by the motion mechanism 631.

Figure 19C:
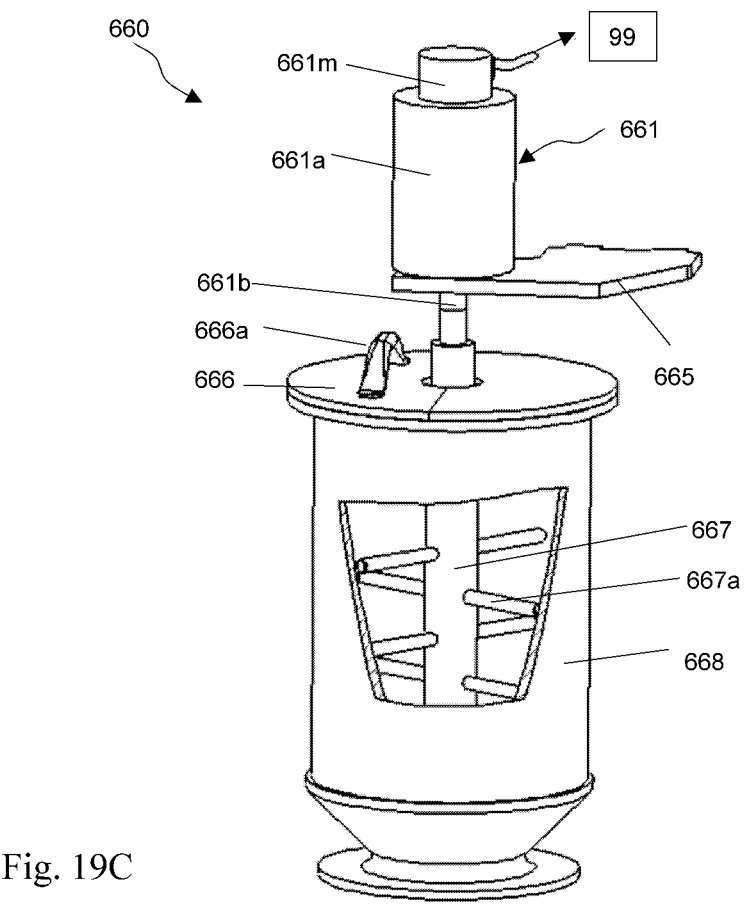

Referring to FIG. 19C, a mixing mechanism 660 comprises: a main shaft 667 comprising a plurality of mixer shafts 667*a*, wherein the main shaft 667 comprises a vertical axis; a support component 665; a container 668 comprising a cover 666, wherein the cover 666 comprises a handle 666, wherein the container 668 comprises an inlet and an outlet; and a rotational motion mechanism 661 comprising a stationary member 661*a* and a moving member 661*b* which is constrained to rotate relative to the stationary member 661*a*. The moving member 661*b* is fixedly connected to the main shaft 667, and the stationary member 661a is fixedly connected to the support component 665. The rotational motion mechanism 661 further comprises a motor 661m referred to as a driving member, which can drive a rotation of the moving member 661b, and hence of the main shaft 635, relative to the stationary member 661a (or equivalently, relative to the support component 665). The main shaft 667 is located inside the container 668, so that the rotations of the mixer shafts 667a of the main shaft 667 can dispense the food or food ingredients from the container 668. The motion mechanism 661 is connected to the computer system 99 of FIG. 1 in the sense that the motor 661m is connected to the computer system 99 via wires or by wireless means, and the computer system 99 may be configured to control the motions produced by the motion mechanism 661.

Figure 19D:
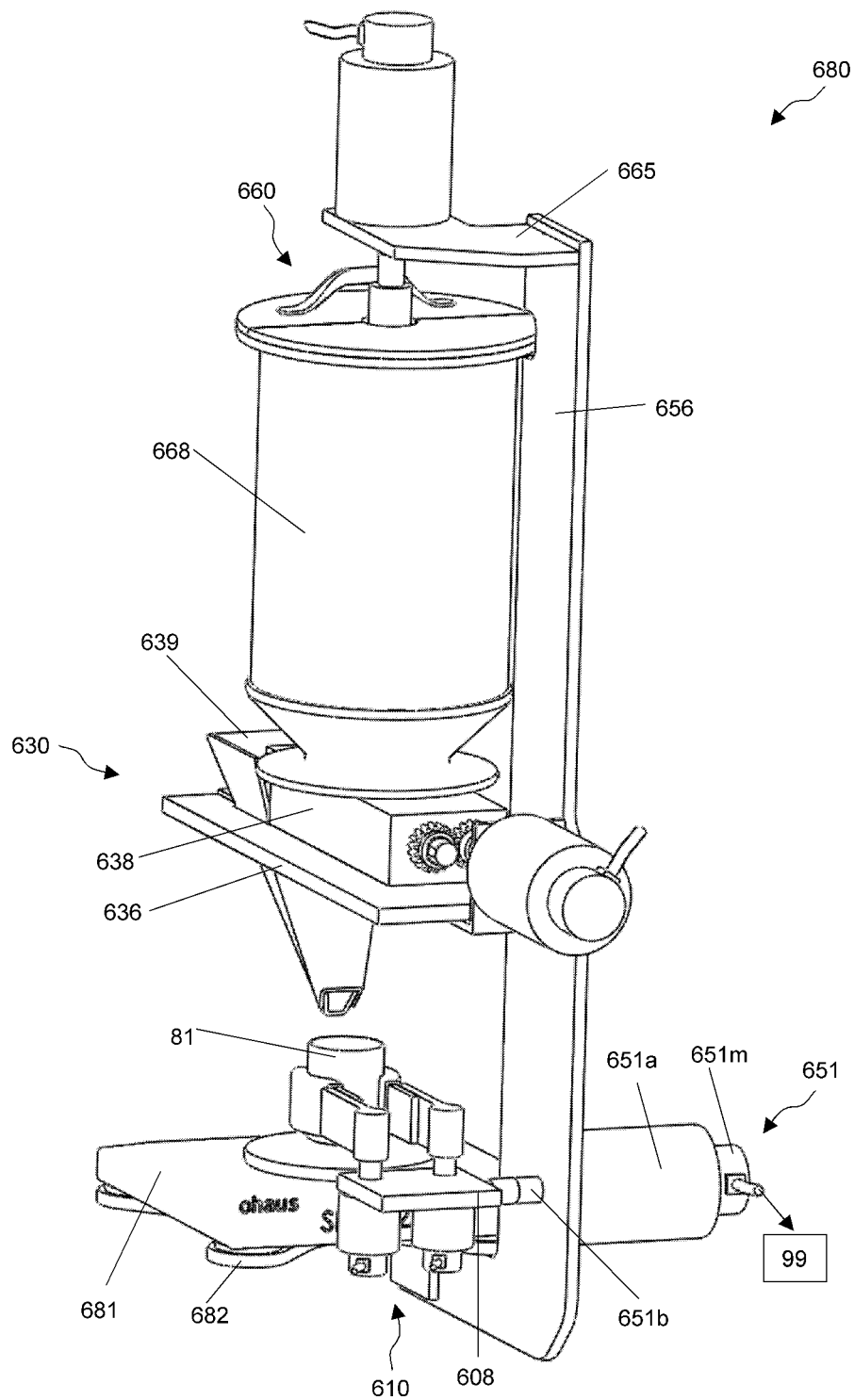
FIG. 19D shows an aerial view of the ingredient dispensing apparatus.

Referring to FIG. 19D, an ingredient dispensing apparatus 680 comprises: a mixing mechanism 660 (as in FIG. 19C); a double screw mechanism 630 (as in FIG. 19B); a container gripping mechanism 610 (as in FIG. 19A); a support component 656; an electronic scale 681 mounted on the support component 656 by a connector 682; and a rotational motion mechanism 651 comprising a stationary member 651a and a moving member 651b which is constrained to rotate relative to the stationary member 651a. The moving member 651b is fixedly connected to the support component 608 of the container gripping mechanism 610, and the stationary member 651a is fixedly connected to the support component 656. The rotational motion mechanism 651 further comprises a motor 651m referred to as a driving member, which can drive a back-and-forth rotation of the moving member 651b, and hence of the support component 608, between a first end-position and a second end-position, relative to the stationary member 651a (or equivalently, relative to the support component 656). The electronic scale 681 is connected to the computer system 99 of FIG. 1 via wires (not shown in figures) to communicate with the computer system 99 and the electronic scale 681 can weigh the ingredient container 81 and the food or food ingredients contained therein. The computer system 99 can then compute the weight of the food or food ingredients by subtracting the weight of the ingredient container 81. The motion mechanism 651 is connected to the computer system 99 in the sense that the motor 651m is connected to the computer system 99 via wires or by wireless means, and the computer system 99 may be configured to control the motions produced by the motion mechanism 651.

The support component 636 of the double screw mechanism 630 and the support component 665 of the mixing mechanism 660 are fixedly connected to the support component 656. The outlet of the container 668 is connected to the inlet of the container 638. It should be noted that the support component 656 may be referred as the support component of the ingredient dispensing apparatus 680.

When the rotational motion mechanisms 661 and 631 respectively rotate the main shaft 667 and the screw shaft 635, the food or food ingredients in the container 668 may be pushed through the container 638 and eventually dispensed into the ingredient container 81 through the funnel 639. The rotational motion mechanisms 661 and 631 and the electronic scale 681 are connected to the computer system 99, and the computer system 99 can dynamically control the timing of the rotational motion mechanisms 661 and 631 with assistance from signals from the electronic scale 681.

When the support component 608 of the container gripping mechanism 610 is rotated to the first end-position, the grippers 620a and 620b in the container gripping mechanism 610 can be rotated to their first end-positions to grip an ingredient container 81 which may contain or otherwise hold food or food ingredients. When the ingredient container 81 is thus gripped, the axis of the gripped ingredient container 81 is configured to be vertical (although this is not a strict requirement). After the ingredient container 81 is gripped by the container gripping mechanism 610, the computer system 99 would control the rotational motion mechanism 651 to rotate the support component 608 of the container gripping mechanism 610 to the second end-position. During this period, the ingredient container 81 is kept gripped by the grippers 620a and 620b. Therefore, the ingredient container 81 and the grippers 620a and 620b are rotated by the same angle as the support component 608. In particular, the food or food ingredients contained in the ingredient container 81 can be unloaded as the ingredient container 81 is turned. The angle of rotation of the support component 608 from the first end-position to the second end-position is between 90 and 180 degrees (e.g., 150 degrees). After the dispensing of the food or food ingredients contained or held in the ingredient container 81, the gripped container 81 and (the support component 608 of) the container gripping mechanism 610 may be returned to the first end-position, when the rotational motion mechanism 651 rotates the support component 608 backward.

When the support component 608 of the container gripping mechanism 610 is at the first end-position, the grippers 620a and 620b can be rotated to their second end-positions to release an ingredient container 81 on the electronic scale 681, and the support component 608 of the container gripping mechanism 610 is kept at the first end-position. After a time (as needed), the grippers 620a and 620b of the container gripping mechanism 610 may be returned to the first end-position, when the weight of the food or food ingredients entering the ingredient container 81 reaches a certain value, and the computer system 99 controls that no further food or food ingredients are added to the ingredient container 81.

Figure 20:
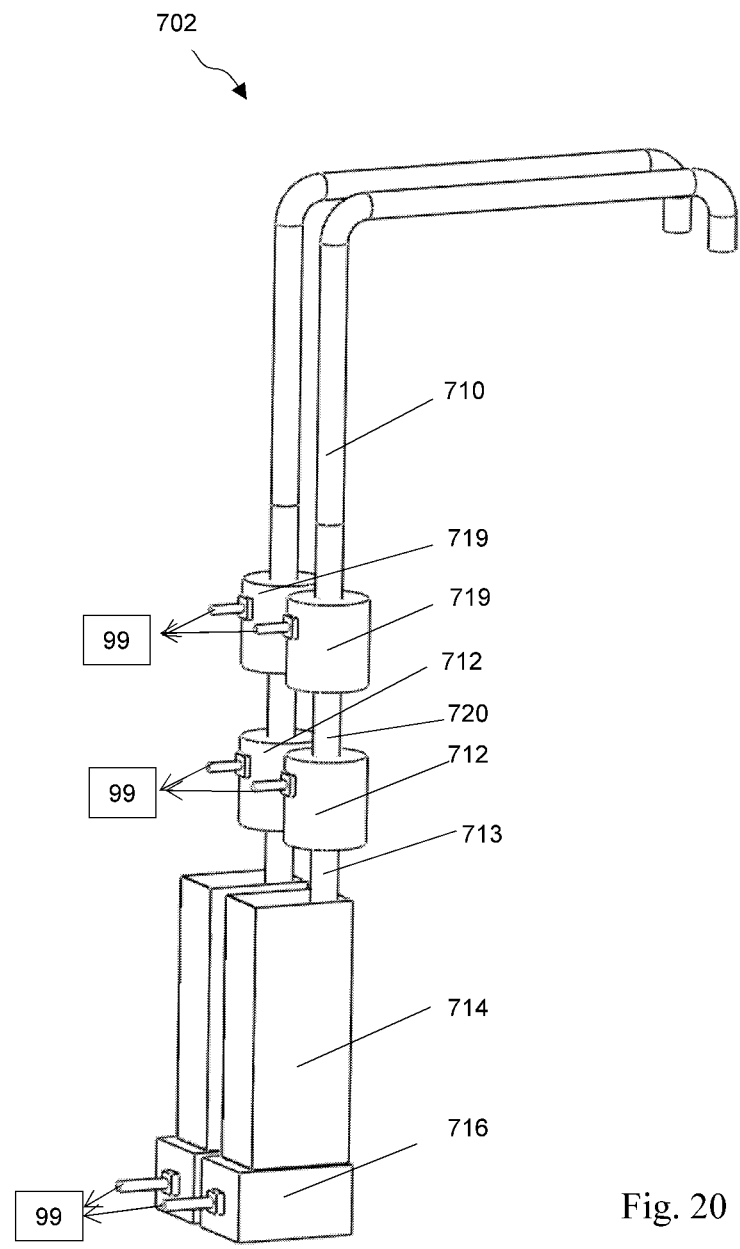
FIG. 20 shows an aerial view of a liquid dispensing apparatus.

Referring to FIG. 20, a liquid dispensing apparatus 702 comprises: a plurality of liquid pipes 713; a plurality of pipes 720; a plurality of flowmeters 719; a plurality of liquid pipes 710; a plurality of liquid pumps 712; a plurality of electronic balance 716; and a plurality of liquid containers 714. Each liquid container 714 is configured to contain a liquid ingredient, e.g., soups, vinegar, or sauces. Each flowmeter 719 is connected to a pair of corresponding pipes 720 and 710. Each pump 712 is connected to a pair of corresponding pipes 720 and 713; and said pipe 713 is inserted into a corresponding liquid container 714, so that the pump 712 can draw liquid from the liquid container 714 and the flowmeter 719 can measure the flow in the corresponding pipes. Each container 714 is positioned on an electronic balance 716, so that the electronic balance 716 can weigh the corresponding container 714. Each electronic balance 716 is connected to the ground by a connector. Each pump 712, each flowmeter 719 and each electronic balance 716 is connected to the computer system 99 of FIG. 1, and the computer system 99 is configured to control the timing and amount of liquid to be drawn from the corresponding liquid container 714.

Figure 21A:
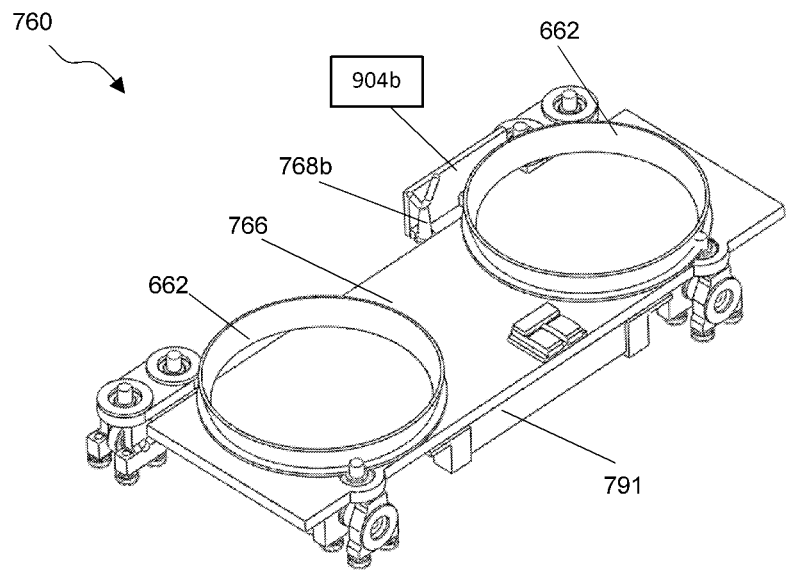
FIG. 21A shows an aerial view of a vehicle.

Referring to FIG. 21A, a vehicle 760 is similarly configured to the vehicle 790 except that: the support component 786 is substituted by a support component 766; the container holders 785a, 785b and 785c are substituted by a plurality of food container holders 662; and the computer 904 is substituted by a computer 904b. The other part numbers in the vehicle 760 are the same as the corresponding part numbers in the vehicle 790. The food container holders 662 are configured to hold a food container 182 so that the movement of said food container 182 may be restricted or limited when the vehicle is moving. The computer 904*b* may control the operations of the electrical or electronic devices of the vehicle 760 by sending signals to the electrical or electronic device. The computer 904*b* may communicate with the computer system 99 of FIG. 1 via a wireless communication device 768*b*.

Figure 21B:
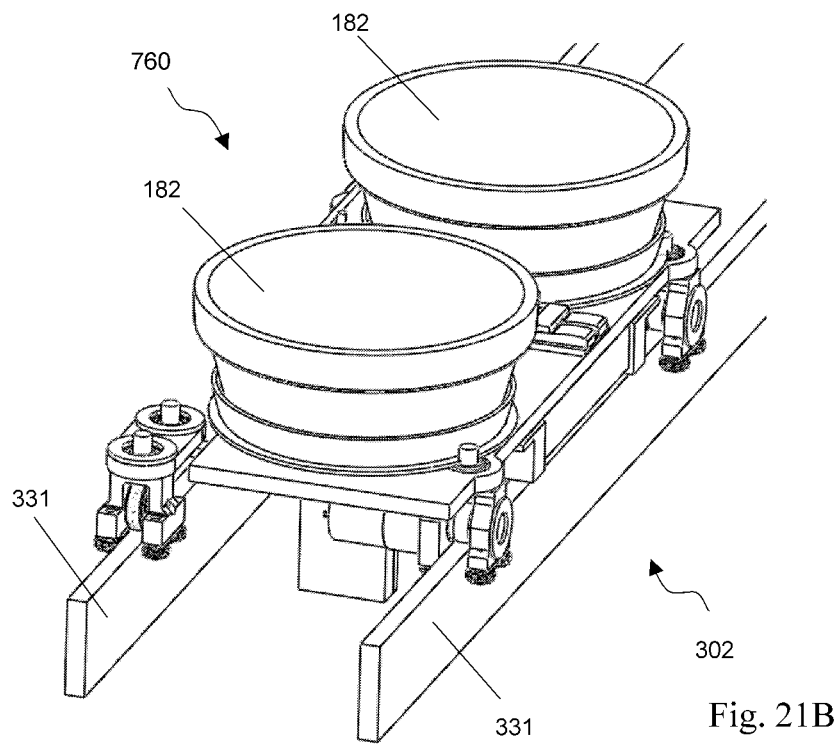
FIG. 21B shows an aerial view of a transport system comprising the vehicle of FIG. 21A.

Referring to FIG. 21B, the transport system 302 comprises a plurality of vehicles 760. The vehicles 760 and the food containers 182 held by the food container holders 662 on the vehicles 760 may move along the mini-rails 331. The transport system 302 can transfer food containers 182. The computer 904*b* is connected to the computer system 99 via wireless means, so that the computer system 99 may control the timing and speed of the vehicles 760. It should be noted that the food container holders 662 in the vehicle 760 may be substituted by a solid shape which can position or hold a food container.

It should be noted that the vehicles 760 may comprise other components for the purpose of staying on the track.

It should be noted that the transport system 302 may comprise track switch mechanisms. The vehicles 760 or 790 may move on different mini-rails by means of a track switch mechanism.

Figure 22A:
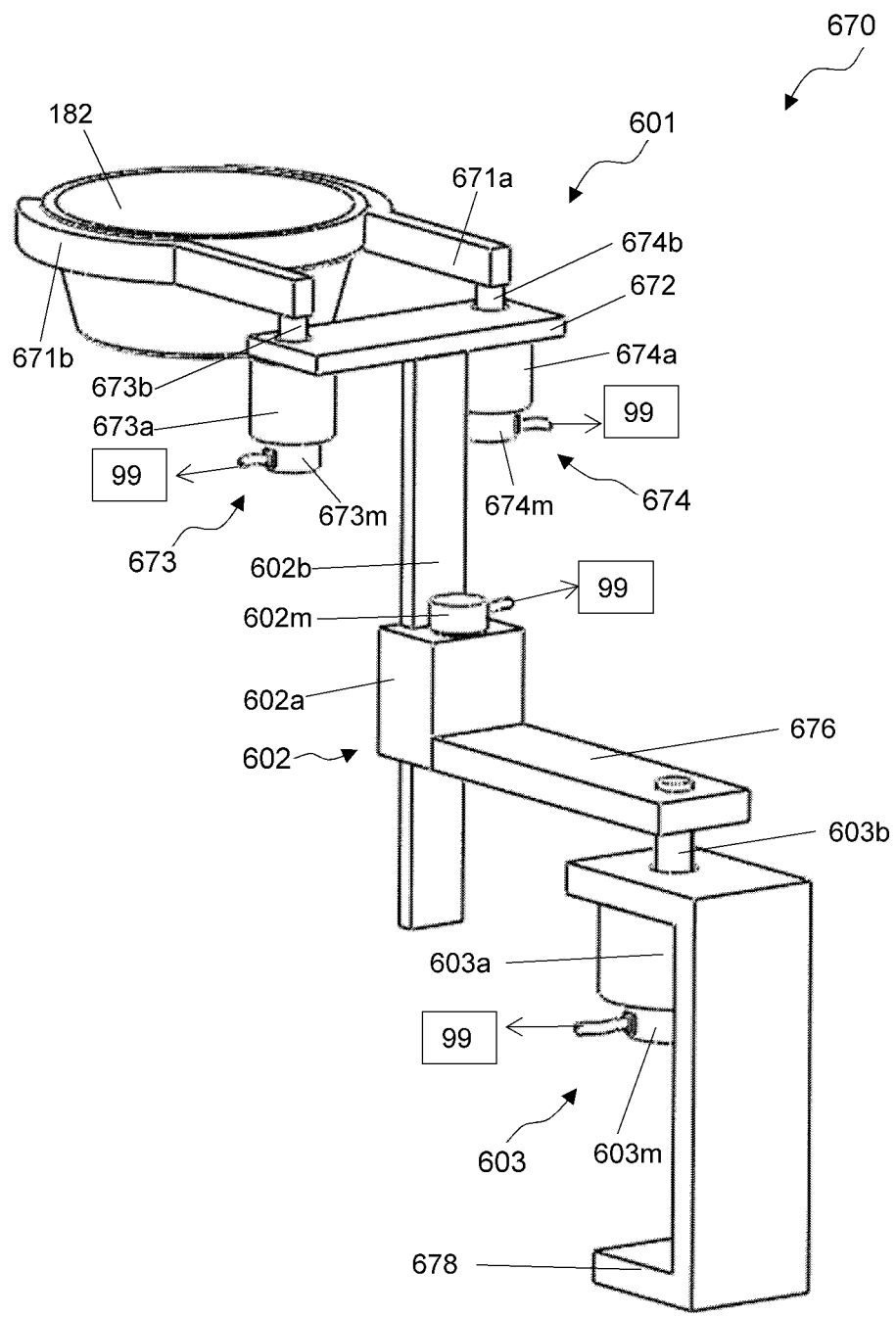
FIG. 22A shows an aerial view a transfer apparatus.

Referring to FIG. 22A, a transfer apparatus 670 comprises a gripping mechanism 601 comprising: gripping devices (also referred to as grippers) 671*a* and 671*b*; and rotational motion mechanisms 673 and 674. The gripping device 671*a* or 671*b* may comprise a rubber or silica gel or other elastic material. The rotational motion mechanism 673 comprises a stationary member 673*a* and a moving member 673*b* which is constrained to rotate relative to the stationary member 673*a*. The rotational motion mechanism 674 comprises a stationary member 674*a* and a moving member 674*b* which is constrained to rotate relative to the stationary member 674*a*. The stationary members 673*a* and 674*a* are fixedly connected to a support component 672. The gripping device 671*a* is rigidly or fixedly connected to the moving member 673*b*. The rotational motion mechanism 673 further comprises a motor 673*m* referred to as a driving member, which can drive a rotation of the moving member 673*b* and hence of the gripping device 671*a* relative to the stationary members 673*a*. Similarly, the gripping device 671*b* is rigidly or fixedly connected to the moving member 674*b*. The rotational motion mechanism 674 further comprises a motor 674*m* referred to as a driving member, which can drive a rotation of the moving member 674*b*, and hence of the gripping device 671*b*, relative to the stationary members 674*a*. The axis of rotation of the rotational motion mechanism 673 is parallel to the axis of rotation of the rotational motion mechanism 674, and the rotational motion mechanisms 673 and 674 are configured to rotate the respective gripping devices 671*a* and 671*b* anti-synchronously around a pair of parallel axes. Each of the gripping devices 671*a* and 671*b* is rotated between a first end-position and a second end-position. At the first end-positions, the gripping devices 671*a* and 671*b* may together grip a food container 182. At the second end-positions, the gripping devices 671*a* and 671*b* can open up and release the food container 182.

The transfer apparatus 670 further comprises a vertical motion mechanism 602 comprising a stationary member 602*a* and a moving member 602*b* which is configured to be moved vertically and linearly relative to the stationary member 602*a*. The moving member 602*b* is rigidly or fixedly connected to the support component 672 of the gripping mechanism 601. The vertical motion mechanism 602 further comprises a motor 602*m* referred to as a driving member, which can drive a vertical linear motion of the moving member 602*b* and hence of the support component 672 relative to the stationary member 602*a*. The transfer apparatus 670 further comprises a rotational motion mechanism 603 comprising a stationary member 603*a* and a moving member 603*b* which is constrained to rotate relative to the stationary member 603*a*. The moving member 603*b* is rigidly or fixedly connected to the stationary member 602*a* of the vertical motion mechanism 602 via a connector 676, and the stationary member 603*a* is fixedly connected to the ground via a connector 678 referred to as a support component. The rotational motion mechanism 603 further comprises a motor 603*m* referred to as a driving member, which can drive a rotation of the moving member 603*b*, and hence of the stationary member 602*a*, relative to the stationary member 603*a* (or equivalently, relative to the support component 678). The motion mechanisms 673, 674, 602 and 603 may be connected to the computer system 99 of FIG. 1 in the sense that the motors 673*m*, 674*m*, 602*m* and 603*m* are connected to the computer system 99 via wires or by wireless means, and the computer system 99 may be configured to control the motions produced by the motion mechanisms 673, 674, 602 and 603 of the transfer apparatus 670. The transfer apparatus 670 may be controlled by the computer system 99 to grip a food container 182, and then move the food container vertically, and then horizontally, and then release the food container 182 at a different position.

Figure 22B:
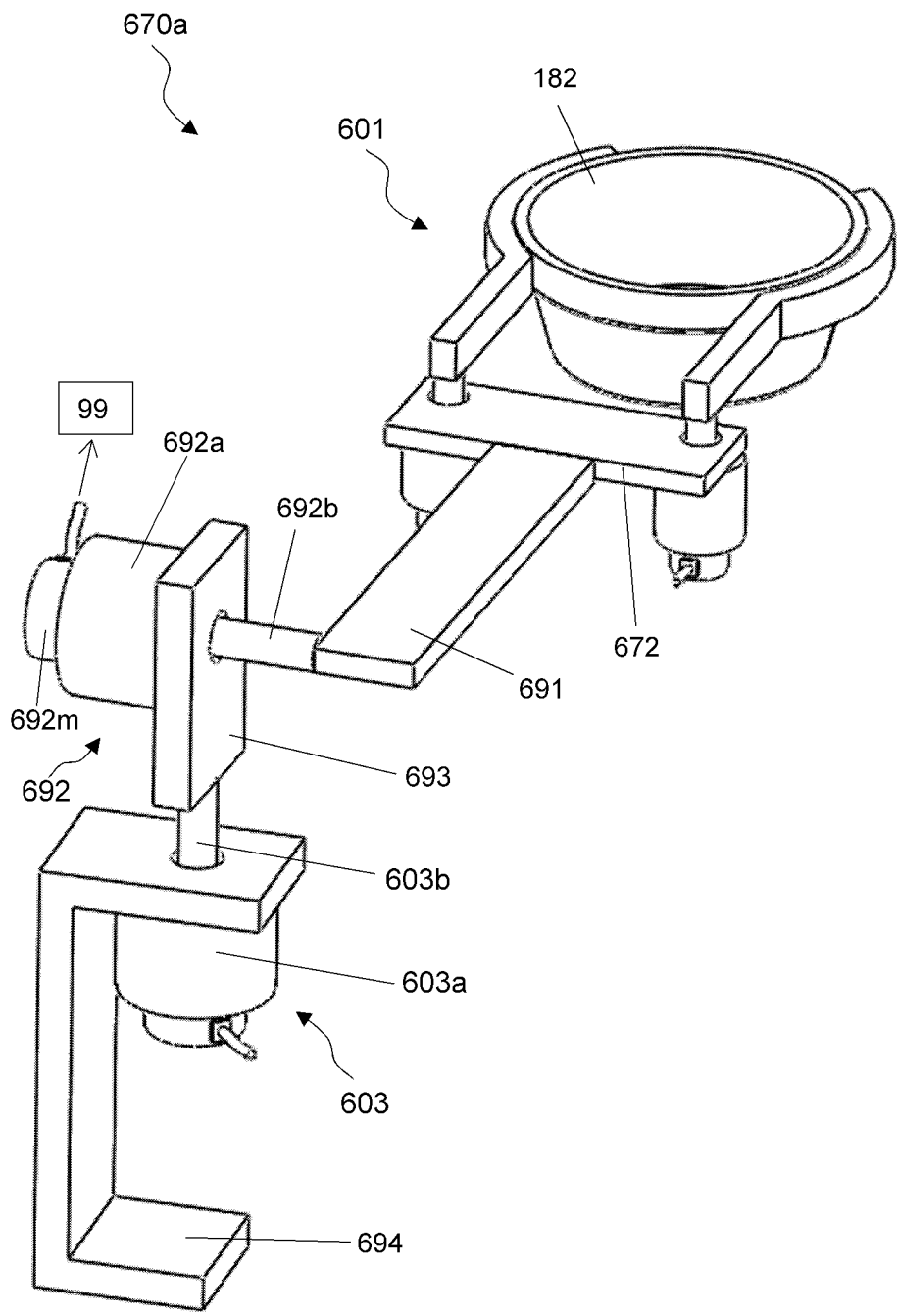
FIG. 22B shows an aerial view of a transfer apparatus.

Referring to FIG. 22B, a transfer apparatus 670*a* comprises the gripping mechanism 601 and the rotational motion mechanism 603 of a transfer apparatus 670 (as shown in FIG. 22A). The transfer apparatus 670*a* further comprises a rotational motion mechanism 692 comprising a stationary member 692*a* and a moving member 692*b* which is constrained to rotate relative to the stationary member 692*a*. The moving member 692*b* is rigidly or fixedly connected to the support component 672 of the gripping mechanism 601 via a connector 691, and the stationary member 692*a* is fixedly connected to a rigid component 693. The rotational motion mechanism 692 further comprises a motor 692*m* referred to as a driving member, which can drive a back- and forth rotation of the moving member 692*b* and hence of the support component 672, between a first end-position and a second end-position, relative to the stationary member 692*a* (or equivalently, relative to the rigid component 693). When an arc segment of the rotation between the first end-position and the second end-position in the support component 672 rotating is close to a straight line, the back- and forth rotation of the support component 672 can be thought of as a back-and-forth vertical linear motion. The moving member 603*b* of the rotational motion mechanism 603 is rigidly or fixedly connected to the stationary member 692*a* of the rotational motion mechanism 692 via the rigid component 693, and the stationary member 603*a* is fixedly connected to the ground via a connector 694 referred to as a support component. The motor 603*m* of the rotational motion mechanism 603 can drive a rotation of the moving member 603*b*, and hence of the stationary member 692*a*, relative to the stationary member 603*a* (or equivalently, relative to the support component 694). The transfer apparatus 670*a* may be connected to the computer system 99 of FIG. 1 in the sense that the motors 673*m*, 674*m*, 692*m* and 603*m* are connected to the computer system 99 via wires or by wireless means, and the computer system 99 may be configured to control the motions produced by the motion mechanisms 673, 674, 692 and 603 of the transfer apparatus 670*a*. The transfer apparatus 670*a* may be controlled by the computer system 99 to grip a food container 182, and then move the food container vertically, and then horizontally, and then release the food container 182 at a different position.

It should be noted that the gripping mechanism 601 may be substituted by other types of gripping mechanisms.

It should be noted that the transfer apparatus 670 may be substituted by the transfer apparatus 670*a* or other transfer apparatuses for the purpose of transferring a food container. Such a transfer apparatus may comprise a robot arm and a vacuum chuck.

Figure 22C:
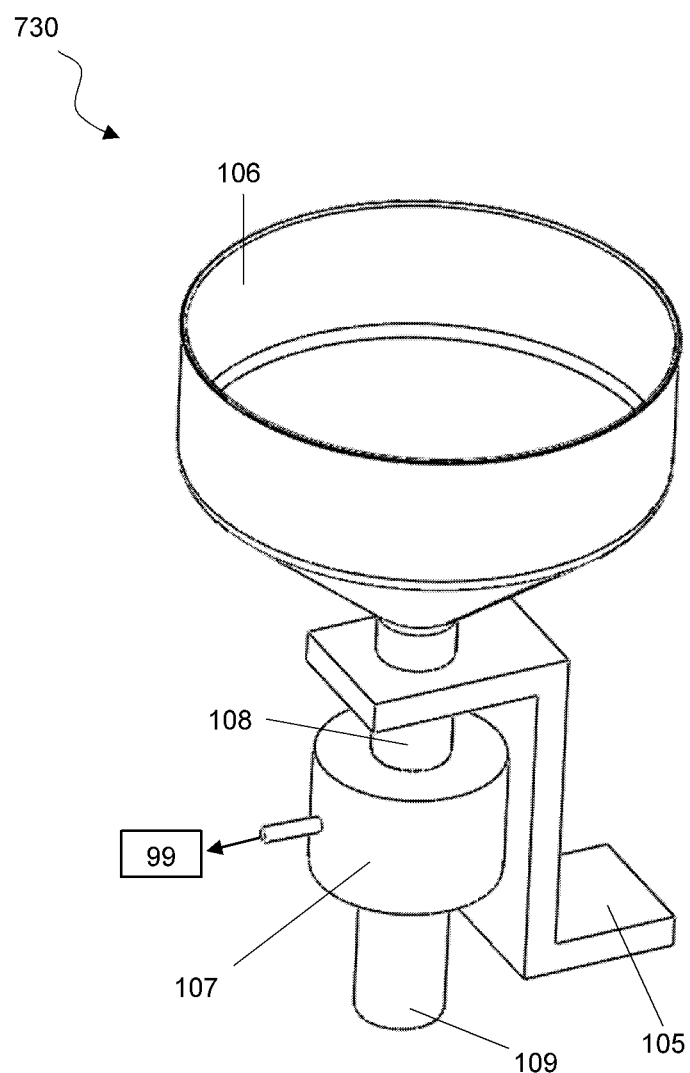
FIG. 22C shows an aerial view of a wastewater disposal apparatus.

Referring to FIG. 22C, a wastewater disposal apparatus 730 comprises a sink 106 and a garbage disposal 107 which is connected to the sink, right below the sink. The sink 106 and the garbage disposal are fixedly connected to the ground via a connector 105; and a pipe is connected to the garbage disposal to flow wastewater to a sewage or a wastewater tank. The wastewater may be dispensed to the sink 106, which is connected to the garbage disposal and sewage or wastewater tank. The garbage disposal 107 may be connected to the computer system 99 of FIG. 1, which may be configured to control the power supply to the garbage disposal.

Figure 22D:
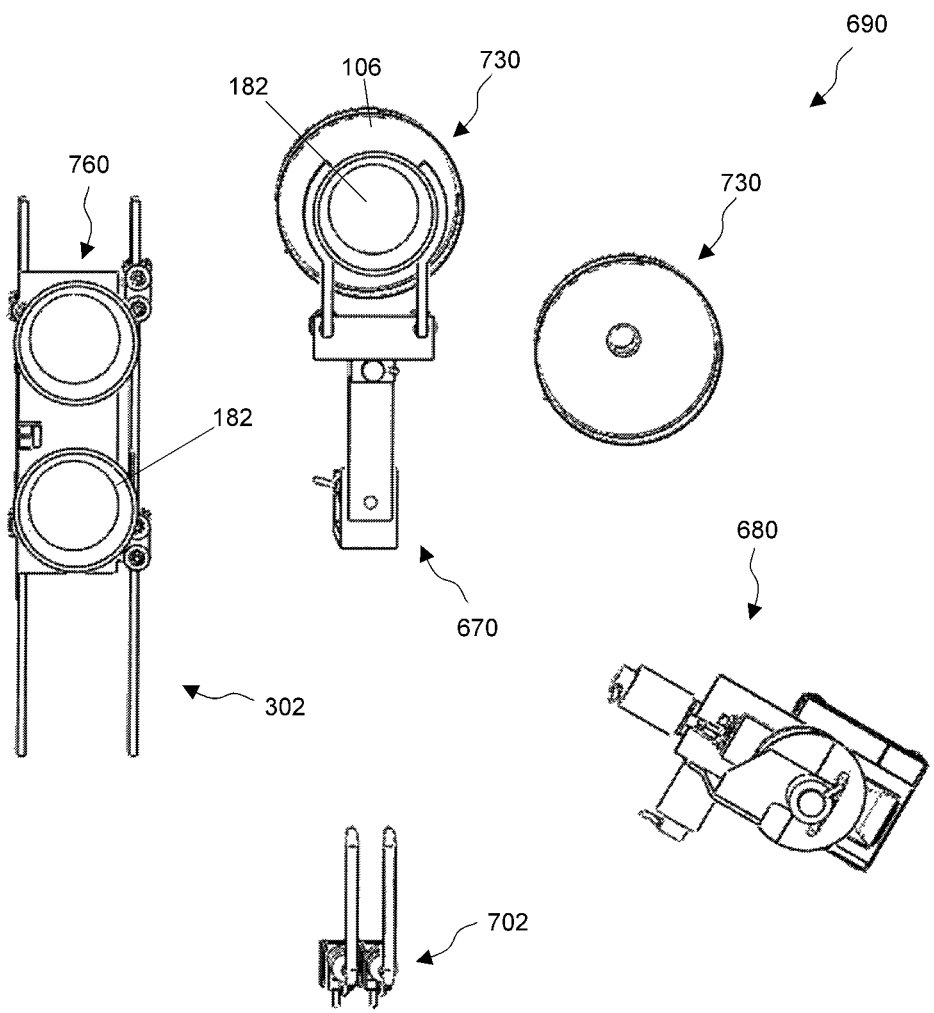
FIG. 22D shows an aerial view of a receiving system comprising the transport system of FIG. 21B, the ingredient dispensing apparatus of FIG. 19D, the transfer apparatus of FIG. 22A and the liquid dispensing apparatus of FIG. 20.

Referring to FIG. 22D, a receiving system 690 comprises: a transfer apparatus 670 (as in FIG. 22A); and a number of wastewater disposal apparatuses 730 (as shown in FIG. 22C). The positions of the support component 678 of the transfer apparatus 670 and the connectors 105 of the wastewater disposal apparatuses 730 are fixed relative to each other. The receiving system 690 further comprises: a liquid dispensing apparatus 702 (as shown in FIG. 20) and an ingredient dispensing apparatus 680 (as shown in FIG. 19D). A cooked food in the cookware 11 may be dispensed by the cooking apparatus 103 (of FIG. 3), and a cooked food in the basket 801 may be dispensed by the food dispensing apparatus 830 (of FIG. 16D). The pumps 712 of the liquid dispensing apparatus 702 can draw a liquid ingredient from the liquid containers 714 through the liquid pipes 710. The computer system 99 of FIG. 1 can control the transfer apparatus 670 to produce an intermittent rotation in the gripping mechanism 601 and the gripped food container 182. The rotation angle in any intermittent rotation may be the same, although this is not a strict requirement. At each stop of the intermittent rotation, the following processes may be completed: (1) when the food container 182 that is gripped by the gripping mechanism 601 of the transfer apparatus 670 is positioned right above a sink 106, said food container can receive a cooked food which is dispensed by the food dispensing apparatus 830 from the cooking apparatus 860; (2) when said food container 182 is positioned right above another sink 106, said food container 182 can receive a cooked food which is dispensed by the motion mechanism 140 from the cooking apparatus 103; (3) when said food container 182 is positioned right next to the ingredient dispensing apparatus 680, said food container can receive food or food ingredients dispensed by the ingredient dispensing apparatus 680 from an ingredient container 81; (4) when said food container 182 is positioned next to the liquid dispensing apparatus 702, said food container can receive liquid ingredients dispensed by the liquid dispensing apparatus 702 from the liquid containers 714; and (5) when said food container 182 is positioned next to the transport system 302, said food container may be transferred to a container holder of a vehicle 760 in the transport system 302 by the transfer apparatus 670, and said vehicle 760 may move said food container 182 to an area accessible by humans.

Figure 22E:
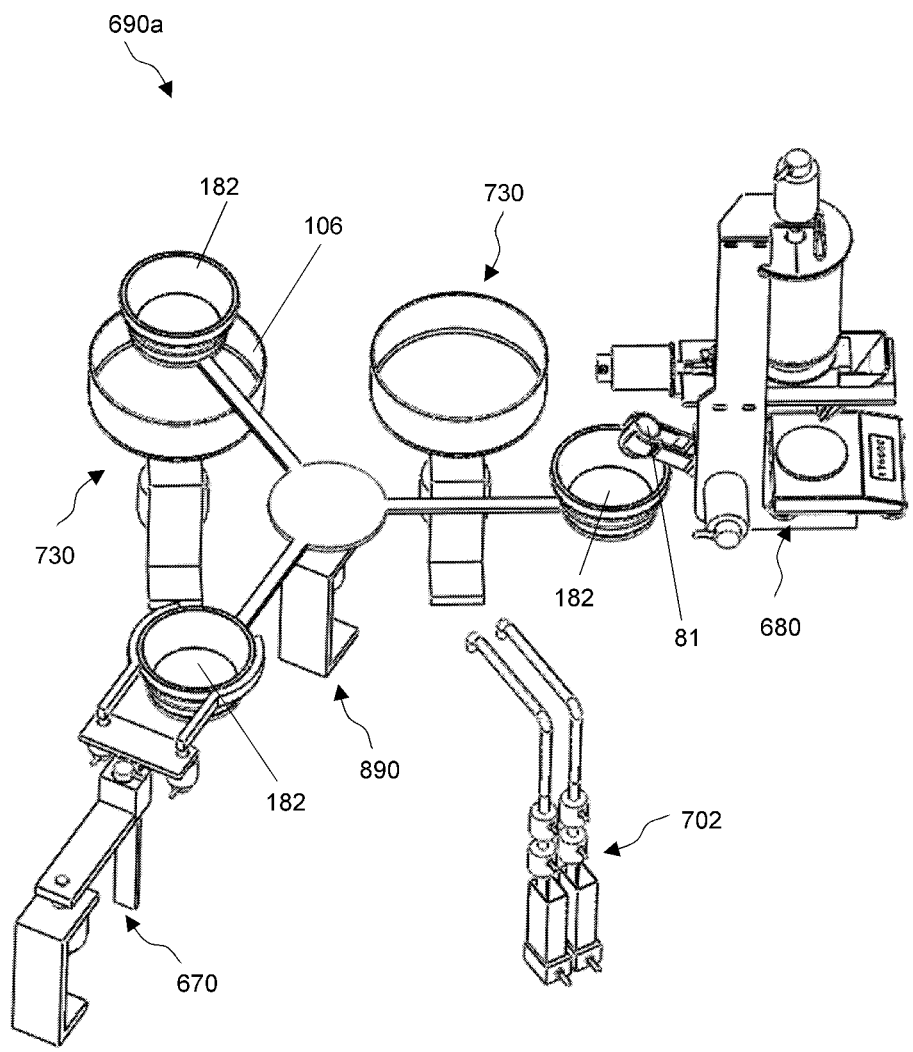
FIG. 22E shows an aerial view of a receiving system comprising the transport apparatus of FIG. 18, the ingredient dispensing apparatus of FIG. 19D, the transfer apparatus of FIG. 22A and the liquid dispensing apparatus of FIG. 20.
Figure 23:
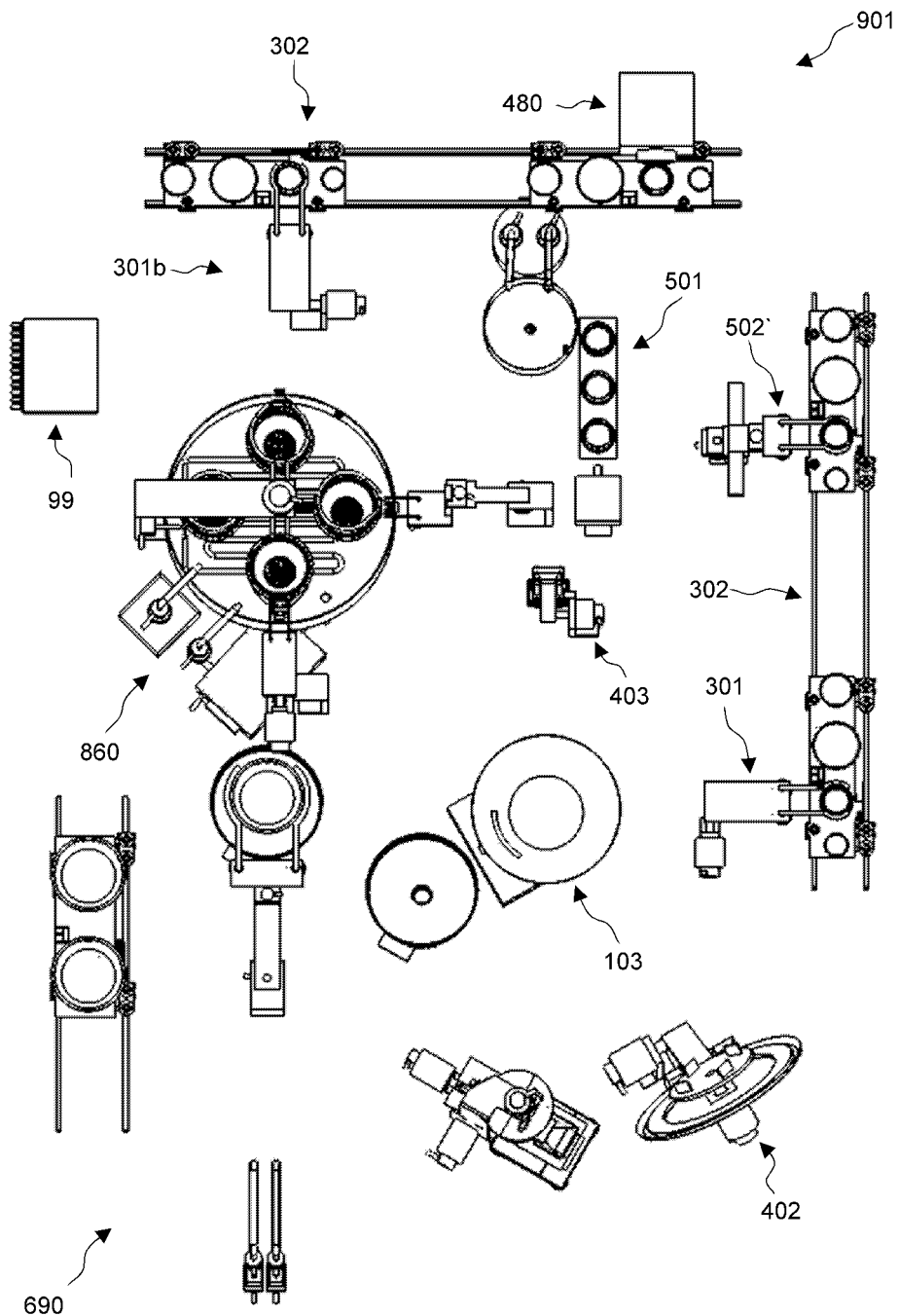
FIG. 23 shows an aerial view of a cooking system.

Referring to FIG. 22E, a receiving system 690*a* comprises: a transport apparatus 890 (as in FIG. 18); an ingredient dispensing apparatus 680 (as in FIG. 19D); a transfer apparatus 670 (as in FIG. 22A); and a number of wastewater disposal apparatuses 730 (as shown in FIG. 22C). The positions of the support component 678 of the transfer apparatus 670, the connectors 105 of the wastewater disposal apparatuses 730, and the support component 891 of the transport apparatus 890 are fixed relative to each other. The liquid dispensing apparatus 702 and the ingredient dispensing apparatus 680 are positioned next to the receiving system 690*a*. A cooked food in the cookware 11 may be dispensed by the cooking apparatus 103, and a cooked food in the basket 801 may be dispensed by the food dispensing apparatus 830. The pumps 712 of the liquid dispensing apparatus 702 can draw a liquid ingredient from the liquid containers 714 through the liquid pipes 710. The computer system 99 of FIG. 1 can control the transport apparatus 890 to produce an intermittent rotation in the rotatable component 899 and the accessories attached on it. The rotation angle in any intermittent rotation may be the same, although this is not a strict requirement. At each stop of the intermittent rotation, the following processes may be completed: (1) when a food container 182 on the transport apparatus 890 is positioned right above the sink 106 of a wastewater disposal apparatus 730, said food container can receive a cooked food which is dispensed by the food dispensing apparatus 830 from the cooking apparatus 860; (2) when said food container 182 is positioned right above the sink 106 of another wastewater disposal apparatus 730, said food container can receive a cooked food which is dispensed by the motion mechanism 104 from the cooking apparatus 103; (3) when said food container 182 is positioned right next to the ingredient dispensing apparatus 680, said food container can receive food or food ingredients dispensed by the ingredient dispensing apparatus 680 from an ingredient container 81; (4) when said food container 182 is positioned next to the liquid dispensing apparatus 702, said food container can receive liquid ingredients dispensed by the liquid dispensing apparatus 702 from the liquid containers 714; and (5) when said food container 182 is positioned next to the transfer apparatus 670, said food container may be gripped and moved by the transfer apparatus 670 to be positioned on a vehicle 760 of the transport system 302 or a transport apparatus, and said vehicle 760 or transport apparatus may move said food container 182 to an area accessible by humans.

It should be noted that the receiving system 690 may be substituted by the receiving system 690*a* or other receiving system for the purpose of receiving cooked food from the cooking apparatus 103 and the cooking apparatus 860, and receiving food or food ingredients from the ingredient dispensing apparatus 680, and receiving liquid ingredients dispensed from the liquid dispensing apparatus 702. Such a receiving system may comprise a robot arm.

In some embodiments, referring to FIGS. 23-25D, a cooking system 901 comprises (from left to right): a cooking apparatus 860 (as in FIGS. 14D-14E); a computer system 99 (as in FIG. 1); a receiving system 690 (as in FIG. 22D); a transport system 302 (as shown in FIG. 9A); an ingredient dispensing apparatus 301*b* (see below); an ingredient dispensing apparatus 301 (as in FIG. 8); a cooking apparatus 103 (as in FIG. 3); a cleaning apparatus 402; a liquid dispensing apparatus 403 (as in FIG. 4B); a storage apparatus 501 (as in FIG. 11); and a loading apparatus 502 (as in FIG. 12). The liquid dispensing apparatus 403 can dispense liquid ingredients into the cookware 11 (as shown in FIG.

5A). The ingredient dispensing apparatus 301 is positioned next to the cooking apparatus 103, to dispense food or food ingredients into the cookware 11 of the cooking apparatus 103 (as shown in FIG. 10). The ingredient dispensing apparatus 301b is a copy of the ingredient dispensing apparatus 301 but is positioned next to the cooking apparatus 860, to dispense food or food ingredients into a basket of the cooking apparatus 860 (as shown in FIG. 24B). The part numbers in the mechanism 301b are the same as the corresponding components in the mechanism 301. The ingredient dispensing apparatus 301 in the cooking system 901 may be referred to as a first ingredient dispensing apparatus, and the ingredient dispensing apparatus 301b in the cooking system 901 may be referred to as a second ingredient dispensing apparatus.

The cleaning apparatus 402 is positioned next to the cooking apparatus 103 and can clean the cookware 11. See U.S. patent application Ser. No. 17/069,707 for more details of the cleaning apparatus 402. The entire contents of the application are hereby incorporated herein.

Said loading apparatus 502 is positioned next to the transport system 302 and may load an ingredient container 81 containing food or food ingredients from the storage apparatus 501 to a vehicle 790 in the transport system 302. The vehicle 790 of the transport system 302 may move to a location next to the cooking apparatus 103 so that the food or food ingredients in the ingredient container on the vehicle 790 are dispensed into the cookware 11 of the cooking apparatus 103 by the ingredient dispensing apparatus 301. The timing of arrival of the vehicle 790 at said location is controlled by the computer system 99.

The cooking system 901 further comprises a food processing apparatus 480 which is positioned next to the transport system 302. The food processing apparatus 480 is configured to process and produce a food or food ingredient and then to dispense said food or food ingredient into an ingredient container 81. The vehicle 790 can then move to a position next to the cooking apparatus 860 so that the food or food ingredients in said ingredient container can be dispensed by the ingredient dispensing apparatus 301b into the basket 801 of the cooking apparatus 860. The vehicle 790 may alternatively move to a position next to the cooking apparatus 103 to have said food or food ingredient dispensed into the cookware 11

Figure 24A:
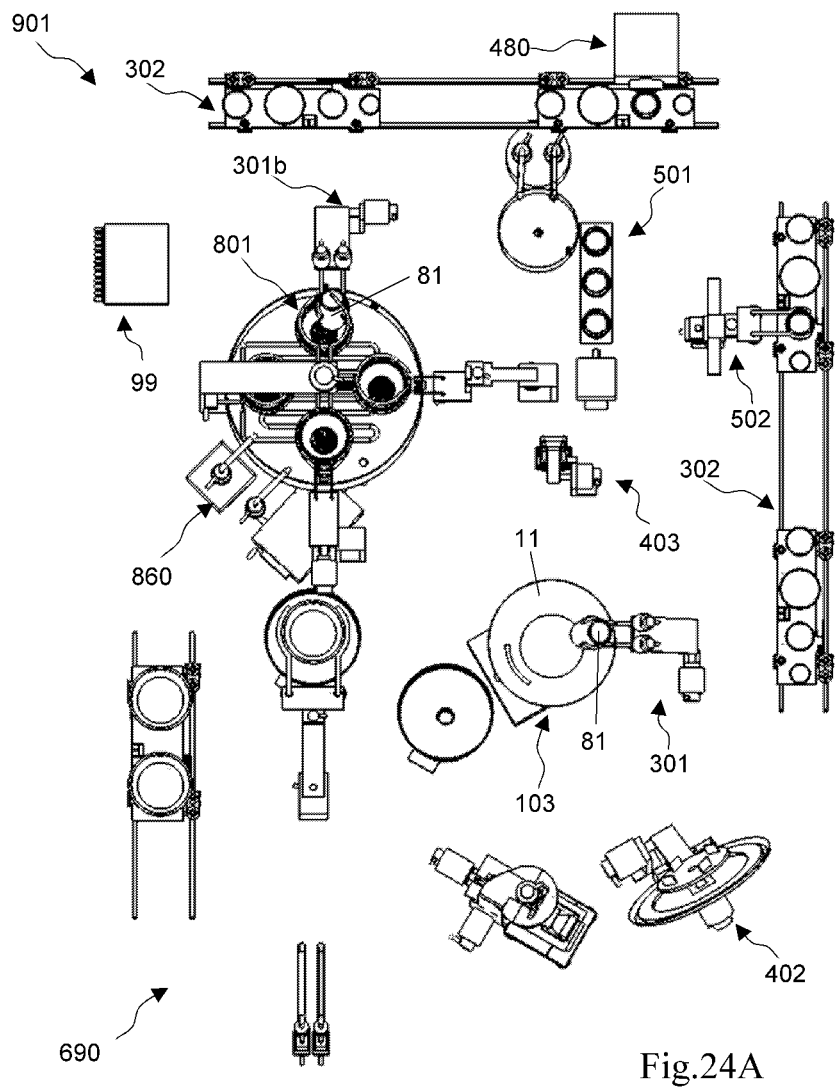
FIG. 24A shows an aerial view of the cooking system of FIG. 23 showing the dispensing of food or food ingredients from an ingredient container on a transport system into a basket and showing the dispensing of food or food ingredients from an ingredient container on the transport system into the cookware.
Figure 24B:
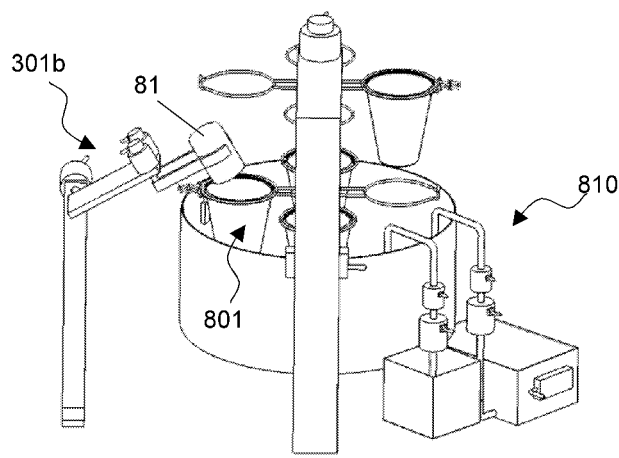
FIG. 24B shows an aerial view of a close-up view of the dispensing of food or food ingredients from an ingredient container on a transport system into a basket.

As shown in FIGS. 24A-24B, the gripping devices of the ingredient dispensing apparatus 301b may grip an ingredient container 81 containing food or food ingredients and then the gripping devices and the ingredient container are rotated to dispense the food or food ingredients from the ingredient container 81 into a basket 801 of the cooking apparatus 860 held by a lower basket holder 811a. Meanwhile the basket 801 is at a certain position relative to the support component 349 of the ingredient dispensing apparatus 301b, and food or food ingredients in the basket 801 may be fried, boiled, or otherwise cooked in the heated liquid in the liquid container 814 of the cooking apparatus 860, to produce a first cooked food. Then, the basket 801 is rotated to a certain position relative to the support component 829 of the transfer apparatus 820, and the transfer apparatus 820 may grip the basket 801 and move it to a certain position relative to the spraying and soaking apparatus 850, so that the first cooked food in the basket 801 may be immersed in a liquid in the liquid container 858 of the spraying and soaking apparatus 850, and the sprayer 851a of the spraying and soaking apparatus 850 can spray liquid on the first cooked food in the basket 801. Next, the transfer apparatus 820 may move the basket 801 and release it, to let the basket 801 be held by an upper basket holder 811b. The basket 801 may be left at this position for a period of time, to let the excessive liquid on the first cooked food drip down into the liquid container 814.

The gripping devices of the ingredient dispensing apparatus 301 may grip an ingredient container 81 containing food or food ingredients and then the gripping devices and the ingredient container are rotated to dispense the food or food ingredients from the ingredient container 81 into the cookware 11 of the cooking apparatus 103 (see FIG. 10). Meanwhile the cookware 11 is at a certain position relative to the support component 349 of the ingredient dispensing apparatus 301, and the motion mechanism 104 of the cooking apparatus 103 may move the cookware 11 of the cooking apparatus 103 to stir or mix the food or food ingredients in the cookware 11, to produce a second cooked food It should be noted that the gripping devices of the ingredient dispensing apparatus 301b may also be moved to grip an ingredient container 81 containing food or food ingredients and then the gripping devices and the ingredient container are rotated to dispense the food or food ingredients from the ingredient container 81 to a basket 801 which is held by an upper basket holder 811b.

Then, the basket 801 is rotated to a certain position relative to the support component 829 of the transfer apparatus 820, and the transfer apparatus 820 may grip and move the basket 801 to a position so that the basket 801 can be held by a lower basket holder 811a. At this position, the food or food ingredients in the basket 801 are fried, boiled, or otherwise cooked in the heated liquid contained in the liquid container 814 of the cooking apparatus 860.

It should be noted that one may optionally configure the ingredient dispensing apparatus 301b to dispense food or food ingredients from an ingredient container 81 to a basket 801 which is held by a lower basket holder 811a or an upper basket holder 811b.

Figure 25A:
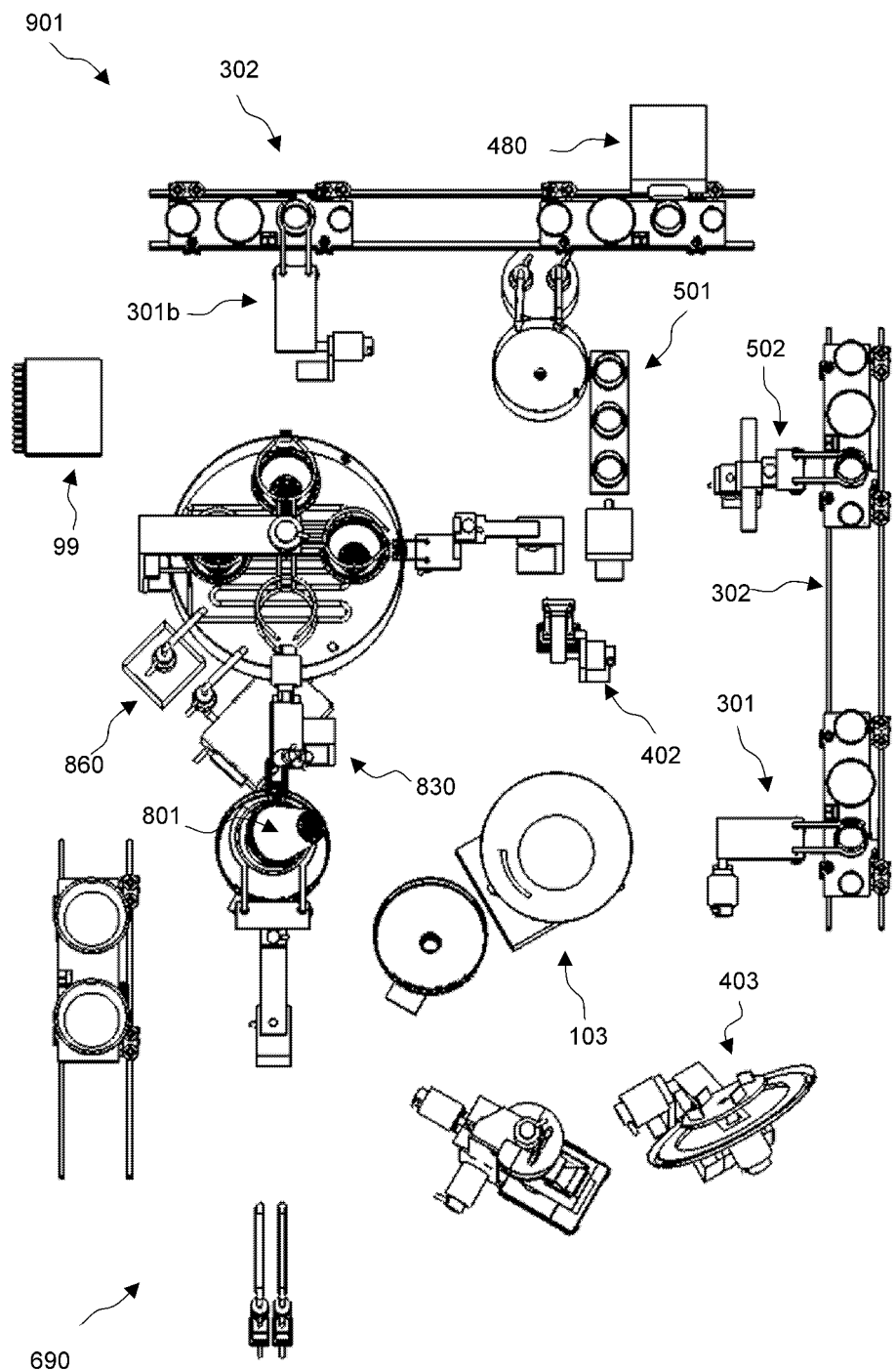
FIG. 25A shows an aerial view of the cooking system showing the dispensing of a cooked food from a basket into a food container.
Figure 25B:
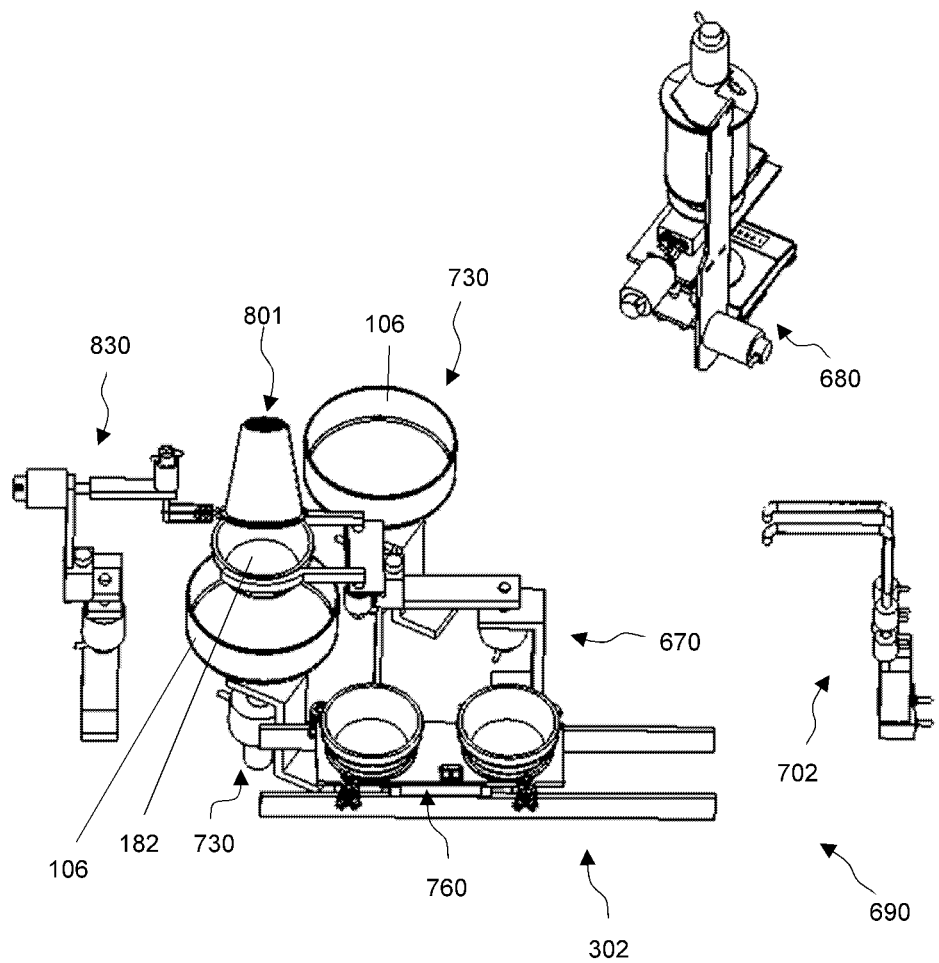
FIG. 25B shows an aerial view of the close-up view of the dispensing.
Figure 25C:
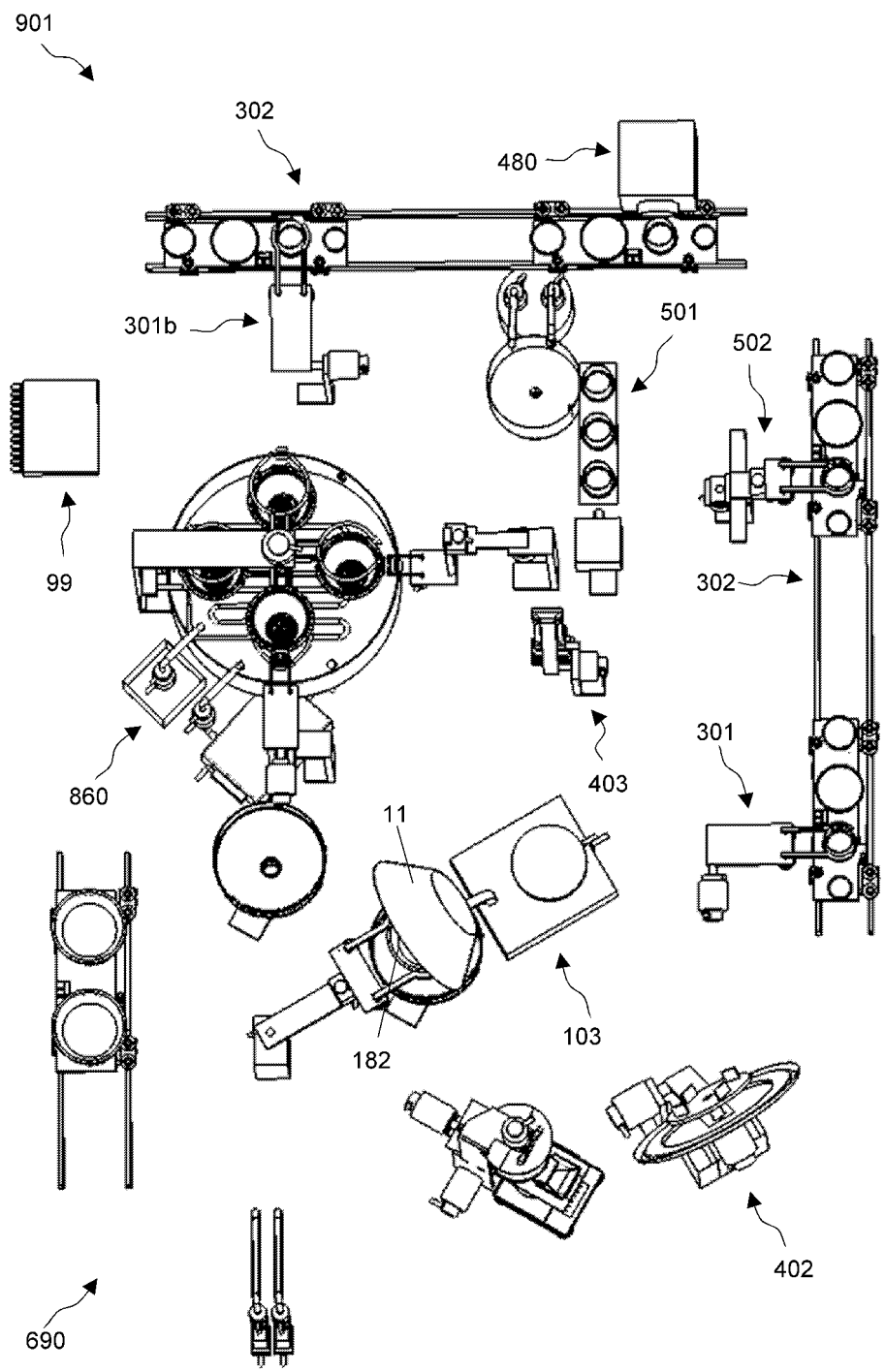
FIG. 25C shows an aerial view of the cooking system showing the dispensing of a cooked food from the cookware into a food container.
Figure 25D:
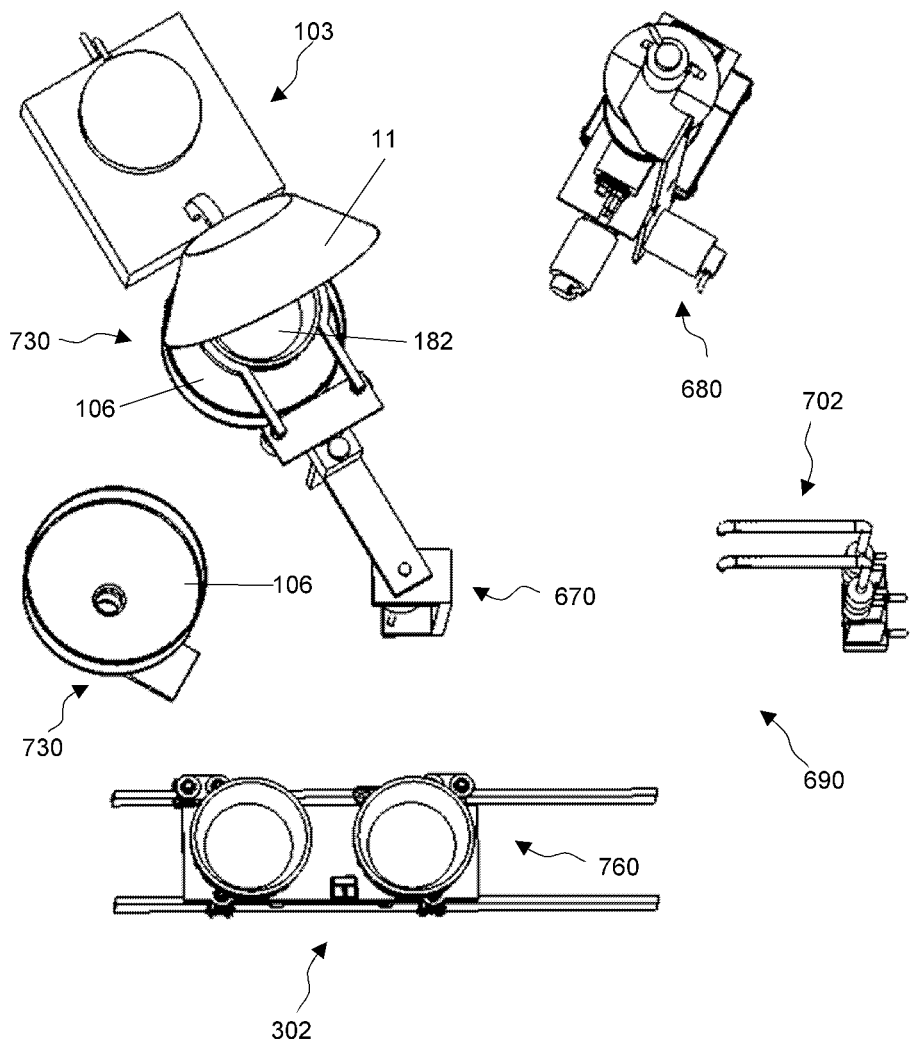
FIG. 25D shows an aerial view of the close-up view of the dispensing.

Then, as shown in FIGS. 25A-25D, when the basket 801 that is held by an upper basket holder 811b is rotated to a certain position relative to the support component 842 of the food dispensing apparatus 830, and when a food container 182 which is gripped by the transfer apparatus 670 in the receiving system 690 is transferred to a position next to the food dispensing apparatus 830 where the food container 182 is positioned right above the sink 106 of a wastewater disposal apparatus 730, the food dispensing apparatus 830 may grip and move the basket 801 and turn it over, so that the first cooked food contained in the basket 801 may be dispensed into the food container 182 (see FIG. 25B). Then, the transfer apparatus 670 in the receiving system 690 transfers the gripped food container 182 to a position next to the cooking apparatus 103 where the gripped food container 182 is positioned right above the sink 106 of another wastewater disposal apparatus 730, and then the motion mechanism 104 of the cooking apparatus 103 can rotate the cookware 11 to dispense a cooked food from the cookware 11 to the gripped food container 182 (see FIG. 25D). And the transfer apparatus 670 in the receiving system 690 transfers the gripped food container 182 to a position next to the ingredient dispensing apparatus 680, the ingredient dispensing apparatus 680 may grip an ingredient container 81 containing food or food ingredients and then rotate the ingredient container to dispense the food or food ingredients from the ingredient container 81 into the gripped food container 182. Then the transfer apparatus 670 in the receiving system 690 transfers the gripped food container 182 to a position next to the liquid dispensing apparatus 702, so that the liquid dispensing apparatus 702 may dispense liquid food ingredients from the liquid container 714 to the gripped food container 182. All these foods or food or food ingredients dispensed into the food container 182 may together form a food product that can be served to customers. Then the transfer apparatus 670 can transfer said food container 182 to a vehicle 760 of the transport system 302; and said vehicle 760 may move said food container 182 to an area accessible by humans. The cleaning apparatus 402 is positioned next to the cooking apparatus 103 and can clean the cookware 11.

The cooking apparatus 860 in the cooking system 901 may be referred to as a first cooking apparatus and the basket 801 may be referred to as a first cookware. The first cooking apparatus 860 comprises: a cooking apparatus 810; a transfer apparatus 820; a food dispensing apparatus 830; and a spraying and soaking apparatus 850. The food dispensing apparatus 830 may move and turn the basket 801 to dispense a first cooked food from the basket 801 of the cooking apparatus 860 to a food container 182.

The cooking apparatus 103 in the cooking system 901 may be referred to as a second cooking apparatus and the cookware 11 may be referred to as a second cookware. Said second cooking apparatus 103 comprises a motion mechanism 104. Said motion mechanism 104 may comprise: a stirring motion mechanism, referred to as a first motion mechanism, and an unloading motion mechanism, referred to as a second motion mechanism. The stirring motion mechanism can move the cookware 11 of the second cooking apparatus 103 to stir or mix the food or food ingredients in the cookware 11 of the second cooking apparatus 103 during a cooking process. The unloading motion mechanism may turn the cookware 11 to dispense a second cooked food from the cookware 11 to a food container 182 which is gripped by the transfer apparatus 670 in the receiving system 690.

The computer system 99 is connected to the mechanisms and apparatuses 103, 402, 403, 301, 301b, 860, 480, 501, 502. The computer system 99 is also connected to the transport system 302 to control the movements of the vehicles 790 and 760 of the transport system 302, and the computer system 99 is also connected to the receiving system 690 to control the movements of the food containers 182 that is gripped by the transfer apparatus 670 in the receiving system 690.

It should be noted that in the cooking system 901, a food cooked by the first cooking apparatus 860 can be dispensed to a food container and a food cooked by the second cooking apparatus 103 can be dispensed to the same food container. The food container 182 can be transferred by transfer apparatus 670 in the receiving system 690 to a position next to the first cooking apparatus to receive a cooked food from the first cooking apparatus and then to a position next to the second cooking apparatus to receive a cooked food from the second cooking apparatus.

In the cooking system 901, the cooking apparatus 860 is positioned near the following mechanisms and apparatuses: the receiving system 690; the cooking apparatus 103; and the ingredient dispensing apparatus 301b. The cooking apparatus 103 is positioned near the following mechanisms and apparatuses: the cleaning apparatus 402; the liquid dispensing apparatus 403, the ingredient dispensing apparatus 301 which is also next to the transport system 302; and the cooking apparatus 860.

The computer system 99 comprises a memory. The computer system is configured to store various data in the computer system's memory.

As shown in FIG. 26, the following tasks are performed by the computer system 99 prior to the operation of the cooking system 901.

In Step 711, the computer system 99 stores (in the computer system's memory) a program, configured to send or receive signals to and from the motion mechanisms, inductive stoves, temperature sensors and pumps of the cooking system 901.

In Step 712, a database is installed in the computer system 99.

In Step 713, each of the cooking apparatuses, liquid dispensing apparatuses, ingredient dispensing apparatuses, transport system, and cleaning apparatus are assigned a unique ID. The computer system 99 stores the IDs of these apparatuses and mechanisms.

In Step 714, the computer system 99 stores the information of the structure of each vehicle of the transport system 302, including the ingredient container types that can be placed on the holders of the vehicle 790.

In Step 715, the computer system 99 stores programs for controlling the transport system 302. The programs are configured to control a vehicle 790 so that the vehicle 790 may move and stop at a pre-scheduled time at a position near the cooking apparatus 103 (or respectively 860) of the cooking system 901, where an ingredient container on a given holder of the vehicle is at a dispensing position relative to the cooking apparatus 103 (or respectively 860). The programs are also configured to control a vehicle 760 so that the vehicle 760 may move and stop at a pre-scheduled time at a position where the transfer apparatus 670 can transfer a food container containing a cooked food to the container holder of the vehicle 760.

In Step 716, the computer system 99 stores a list of foods which may be cooked by the cooking system 901.

In Step 717, for each food item in the list of Step 716, the computer system 99 stores a cooking program configured to control the motion mechanisms, inductive stoves, pumps, and devices in the cooking system 901.

In Step 718, for each food item in the list of Step 716, the computer system 99 stores types and quantities of food or food ingredients, relative timing of their dispensing and the respective ID of the destination cooking apparatus for each ingredient to be dispensed into; wherein the relative timing refers to the timing relative to the timing of the program of Step 717 corresponding to the food. Food or food ingredients contained in an ingredient container is to be dispensed into a basket or cookware in the destination cooking apparatus or a food container.

Figure 27:
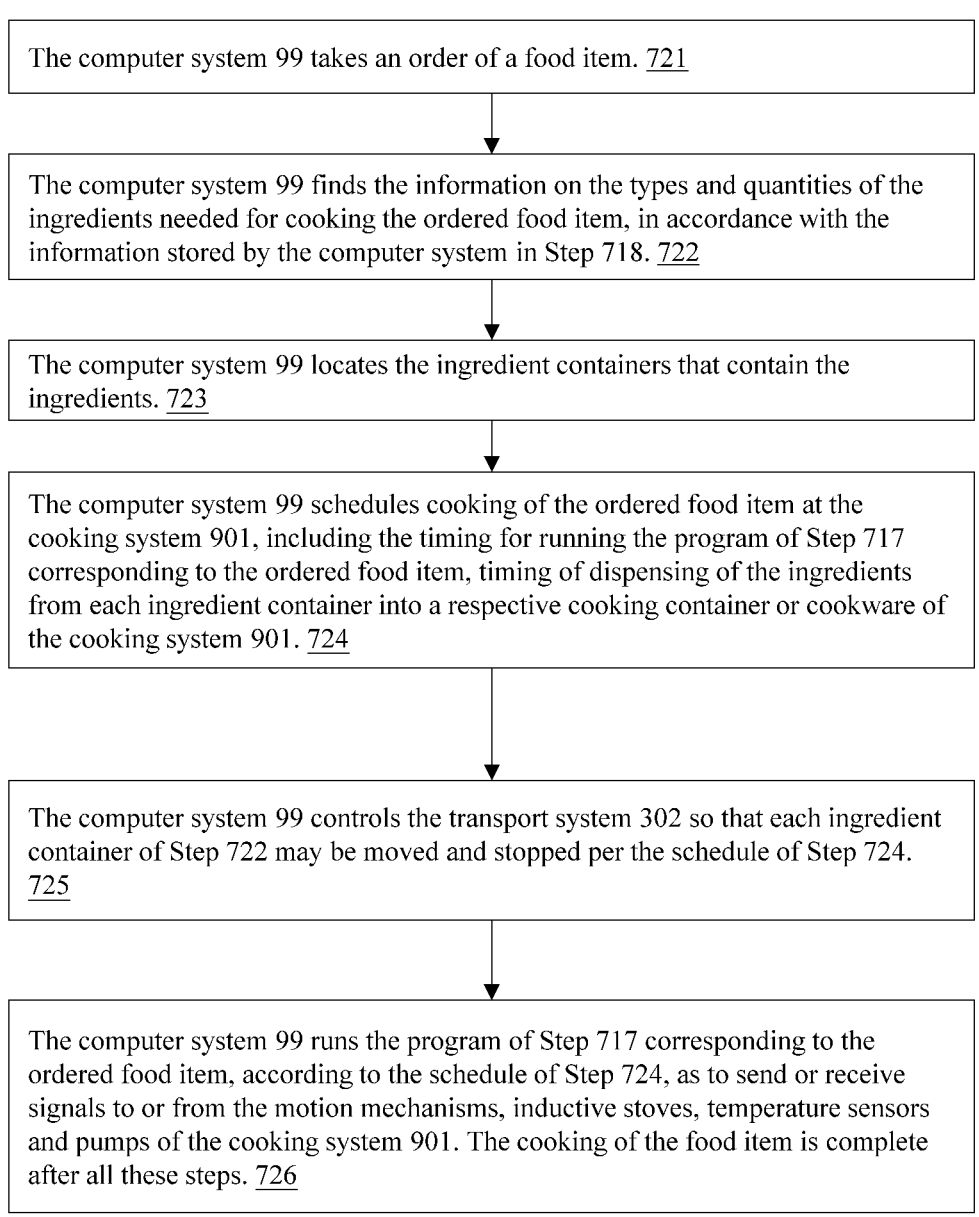
FIG. 27 is a flow chart showing the procedures of the computer system in the cooking system of FIG. 23 during the cooking of a food.

As shown in FIG. 27, the following tasks are routinely performed by the computer system 99 during the operation of the cooking system 901.

In Step 721, the computer system 99 takes an order of a food item. The order may be placed by a human either at the computer system 99, or at a computer which sends the order to the computer system 99.

In Step 722, for the ordered food item of Step 721, the computer system 99 finds the information on the types and quantities of the ingredients needed for cooking the ordered food item. Such information was stored by the computer system 99 in Step 718.

In Step 723, the computer system 99 locates the ingredient containers that contain the food or food ingredients found in Step 722. The ingredients may be dispensed from some larger containers into said ingredient containers. Alternatively, ingredients may already be in the ingredient containers, and their locations stored in the memory of the computer system 99.

In Step 724, the computer system 99 schedules the cooking of the ordered food item at cooking system 901. The schedule includes the timing for running the program of Step 717 corresponding to the ordered food item. The schedule also includes the timing of dispensing of the ingredients from each ingredient container into a cookware or a basket of the cooking system 901, in accordance with the stored information by the computer system 99 in Step 718.

In Step 725, the computer system 99 controls the transport system 302 so that each ingredient container of Step 722 may be moved and stopped per the schedule of Step 724.

In Step 726, the computer system 99 runs the program of Step 717 corresponding to the ordered food item, according to the schedule of Step 724, to send or receive signals to or from the motion mechanisms, inductive stoves, temperature sensors and pumps of the cooking system 901.

After all these steps, the cooking of the food item, including dispensing of the semi cooked foods and other ingredient to a food container, is complete.

Figure 28:
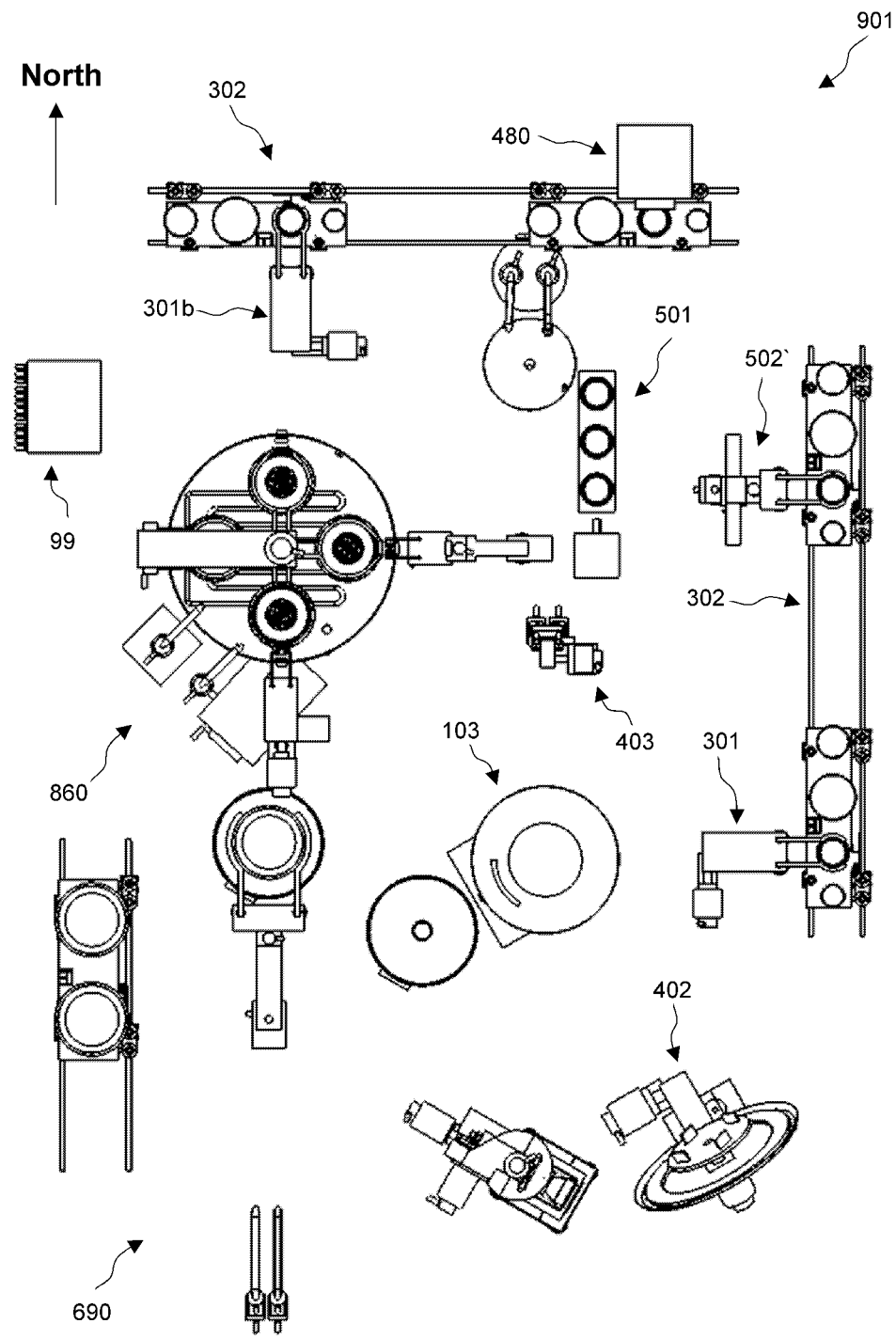
FIG. 28 shows a plan view of a positioning of various mechanisms and apparatuses in the cooking system of FIG. 23.

The 3-dimensional positioning of these mechanisms and apparatuses in the cooking system 901 can be done in various ways. For example, the receiving system 690 and the ingredient dispensing apparatus 301b, may be respectively positioned on the southern, and northern sides of the first cooking apparatus 860, and the ingredient dispensing apparatus 301 may be positioned in the southeastern side of the first cooking apparatus 860. The cleaning apparatus 402, the second cooking apparatus 103 and the liquid dispensing apparatus 403 may be positioned on the southeastern of the first cooking apparatus 860; see FIG. 28.

Figure 29A:
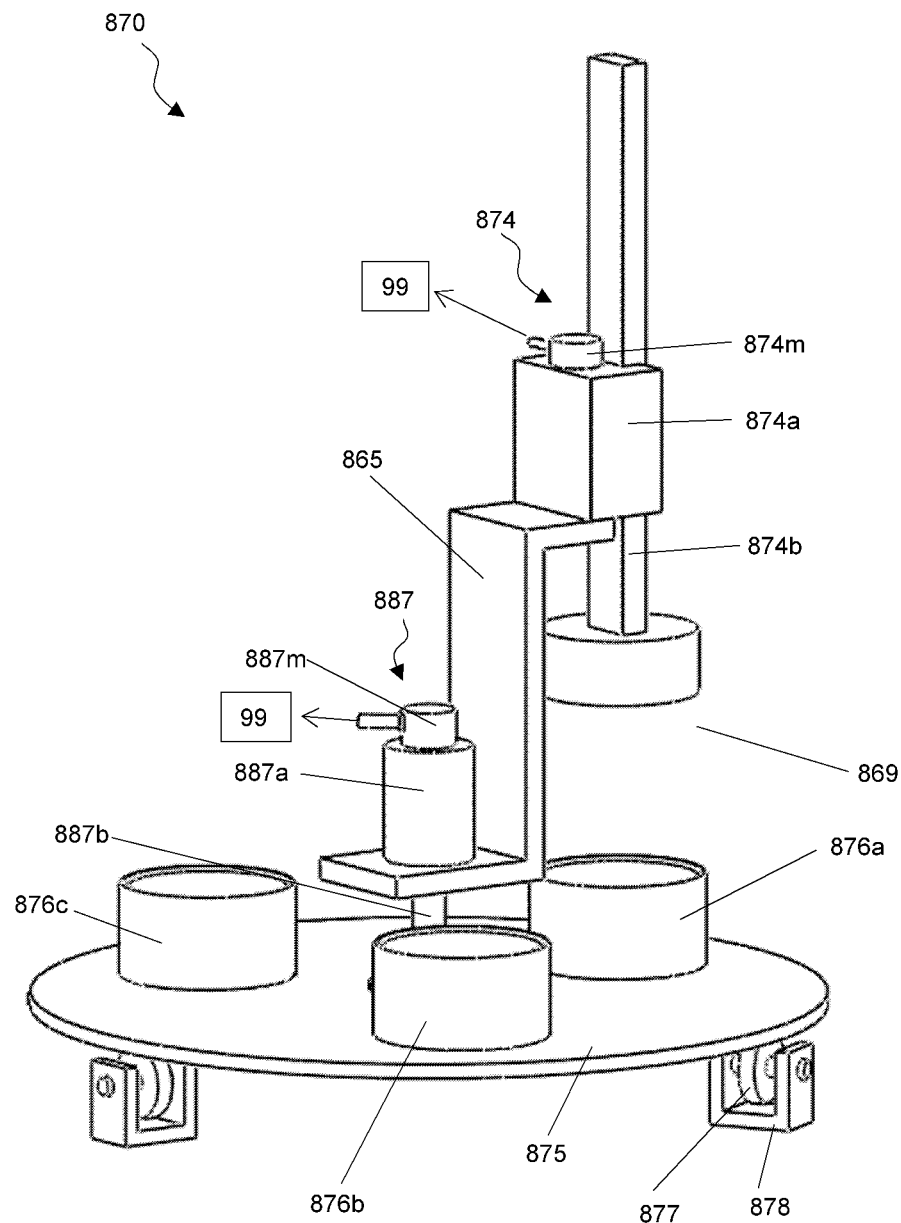
FIGS. 29A-29B show aerial views of a noodle making apparatus.
Figure 29B:
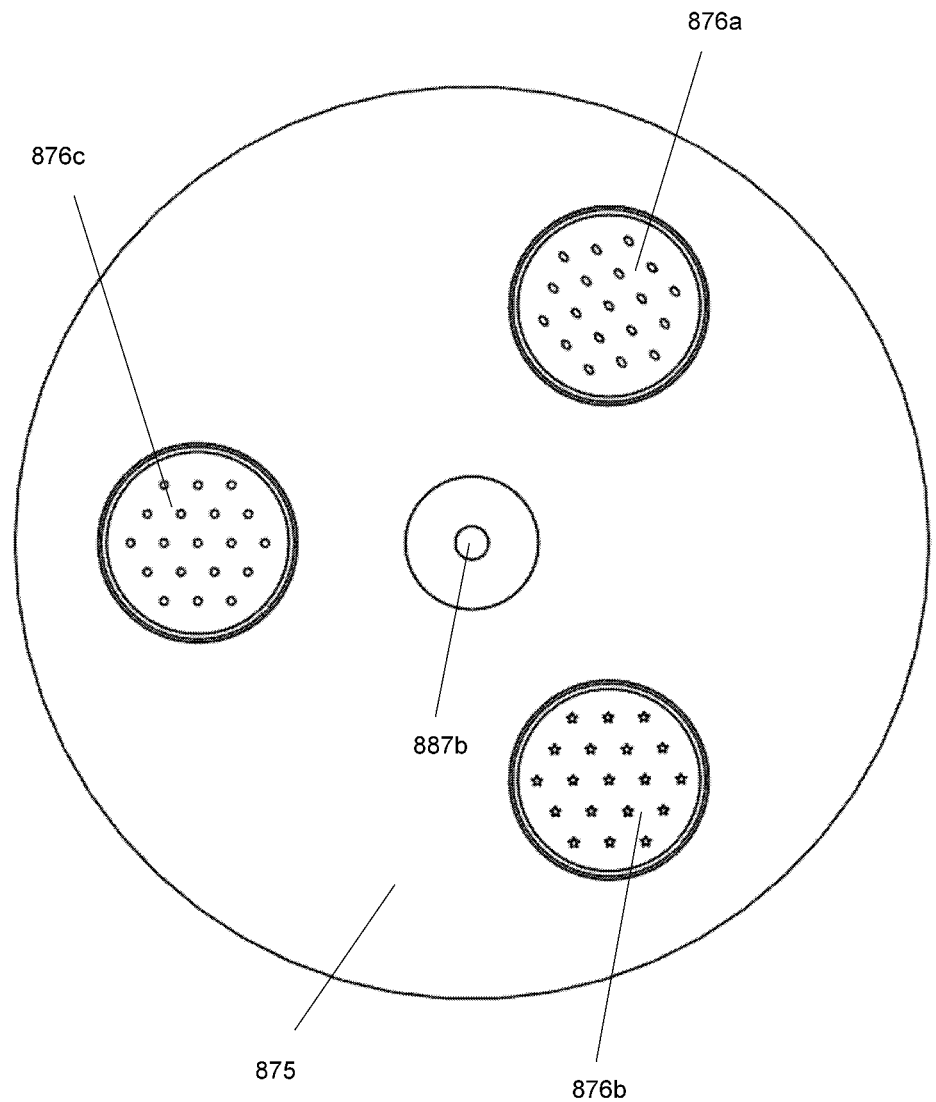
Figure 30:
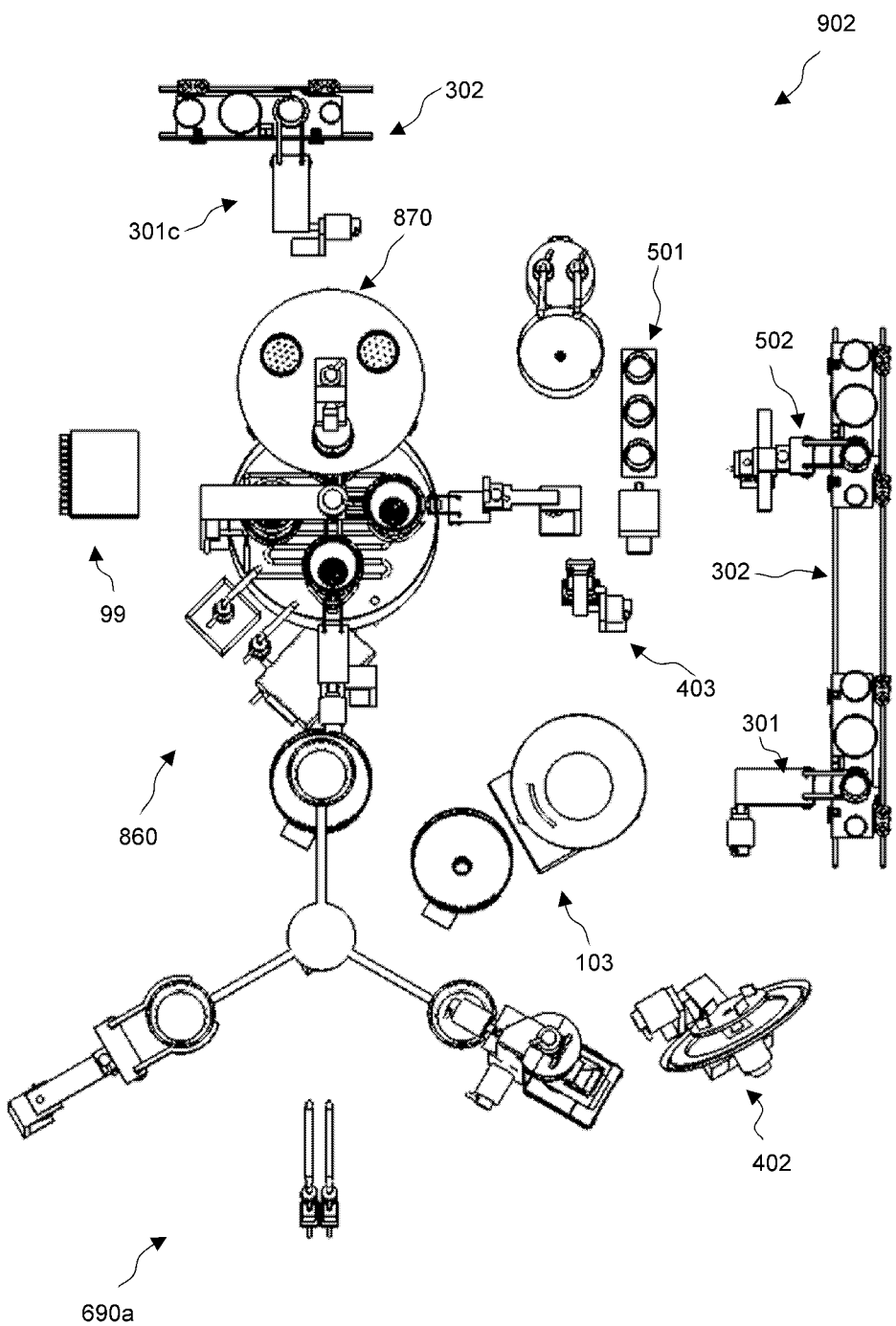
FIG. 30 shows an aerial view of a cooking system.

Referring to FIGS. 29A-29B, a noodle making apparatus 870 comprises: a turntable 875 comprising a vertical rotational axis; a plurality of cylinder-shaped cups 876a, 876b and 876c; and a part 869 in the shape of a solid cylinder. The cup 876a has a plurality of oval holes at bottom; the cup 876b has a plurality of round holes at bottom; and the cup 876c has a plurality of star-shaped holes at bottom (see FIG. 29B). The cups 876a, 876b and 876c are cyclically and symmetrically positioned around the axis of the turntable 875 and are fixedly connected to the turntable 875.

The noodle making apparatus 870 further comprises a vertical motion mechanism 874 and a rotational motion mechanism 887. Said rotational motion mechanism 887 comprises a stationary member 887a and a moving member 887b which is constrained to rotate relative to the stationary member 887a. The moving member 887b is rigidly or fixedly connected to the turntable 875, and the stationary member 603a is fixedly connected to a support component 865. The rotational motion mechanism 887 further comprises a motor 887m referred to as a driving member, which can drive a rotation of the moving member 887b, and hence of the turntable 875, relative to the stationary member 887a (or equivalently, relative to the support component 865). Said vertical motion mechanism 874 comprises a stationary member 874a and a moving member 874b which is configured to be moved vertically and linearly relative to the stationary member 874a. The moving member 874b is rigidly or fixedly connected to the part 869, and the stationary member 874a is fixedly connected to the support component 865. The vertical motion mechanism 874 further comprises a motor 874m referred to as a driving member, which can drive a vertical linear motion of the moving member 874b and hence of the part 869, relative to the stationary member 874a (or equivalently, relative to the support component 865). The motion mechanisms 887 and 874 may be connected to the computer system 99 of FIG. 1 in the sense that the motors 887m and 874m are connected to the computer system 99 via wires or by wireless means, and the computer system 99 may be configured to control the motions produced by the motion mechanisms 887 and 874 of the noodle making apparatus 870.

The noodle making apparatus 870 further comprises a plurality of wheels 877. Each wheel 877 is mounted on a corresponding support component 878 which is fixedly connected to the support component 865 via a corresponding connector (hidden in figure). The wheels 877 are used to provide support to the turntable 875.

In the noodle making apparatus 870, the vertical motion mechanism 874 can produce a back-and-forth motion of the part 869 between two end-positions along a vertical direction: a first end-position at the lower height; and a second end-position at the higher height. When the part 869 is moved from the second end-position to the first end-position, the part 869 is pressed into a cup 876a, 876b or 876c, and a dough in the cup 876a, 876b or 876c is squeezed by the part 869, then the noodles are extruded from the holes at bottom of said cup. At the second end-position of the part 869 in the back-and-forth motion, the part 869 is far away from the turntable 875, and doughs in an ingredient container may be dispensed into said cup.

It should be noted that the vertical motion mechanism 874 may be substituted by a linear actuator or other motion mechanism that can produce a linear motion.

It should be noted that the turntable 875 may be substituted by any rotatable component.

It should be noted that the rotational motion mechanism 887 may produce an intermittent rotation of the turntable 875 and the accessories attached to it. The rotation angle in any intermittent rotation may be the same, although this is not a strict requirement. At each stop of the intermittent rotation, following processes are completed: (1) some ingredient dispensing apparatuses may dispense doughs into a cup 876a, 876b or 876c; (2) the vertical motion mechanism 874 moves the part 869 to the first end-position to squeeze doughs in the cup directly under the part 869, so that the noodles are extruded from the holes of the cup; and (3) the vertical motion mechanism 874 moves the parts 869 to the second end-positions.

It should be noted that the noodle making apparatus 870 may be combined with a dough making apparatus comprising one or more of the following: a flour dispensing apparatus, a liquid dispensing apparatus, other ingredient dispensing apparatus; a mixer configured to mix flour with liquid and other ingredients as to make a dough; and a dispensing mechanism configured to dispense the dough from the mixer to a cup 876a, 876b, or 876c in the noodle making apparatus 470. There are many known ways to build such a dough making apparatus.

The noodle making apparatus 870 may be substituted by another known noodle making apparatus. The noodle making apparatus 870 may be substituted by a pasta making apparatus, dumpling making apparatus, or other known apparatus configured to process food or food ingredients or food items.

In some embodiments, referring to FIGS. 30-32D, a cooking system 902 comprises (from left to right): a cooking apparatus 860 (as in FIGS. 14D-14E); a noodle making apparatus 870 (as in FIGS. 29A-29B); a computer system 99 (as in FIG. 1); a receiving system 690a (as in FIG. 22E); an ingredient dispensing apparatus 301c; a transport system 302 (as in FIG. 9A); an ingredient dispensing apparatus 301 (as in FIG. 8); a cooking apparatus 103 (as in FIG. 4); a cleaning apparatus 402; a liquid dispensing apparatus 403 (as in FIG. 4B); a storage apparatus 501 (as in FIG. 11); and a loading apparatus 502 (as in FIG. 12). The liquid dispensing apparatus 403 can dispense liquid ingredients into the cookware 11 (as shown in FIG. 5A). The ingredient dispensing apparatus 301 is positioned next to the cooking apparatus 103, to dispense food or food ingredients into the cookware 11 of the cooking apparatus 103 (as shown in FIG. 11). The ingredient dispensing apparatus 301c is a copy of the ingredient dispensing apparatus 301 but is positioned next to the noodle making apparatus 870, to dispense doughs into a cup of the noodle making apparatus 470 (as shown in FIG. 31B). The part numbers in the mechanism 301c are the same as the components in the mechanism 301. The noodle making apparatus 870 is positioned next to the cooking apparatus 860, so that the noodles produced by the noodle making apparatus 870 may be dispensed into a basket 801 of the cooking apparatus 860 (as shown in FIG. 31B). The ingredient dispensing apparatus 301 in the cooking system 902 may be referred to as a first ingredient dispensing apparatus, and the ingredient dispensing apparatus 301c in the cooking system 902 may be referred to as a second ingredient dispensing apparatus. The liquid dispensing apparatus 403 may dispense liquid ingredients into the cookware 11 (as shown in FIG. 6C).

Said loading apparatus 502 is positioned next to the transport system 302 and may load an ingredient container 81 containing food or food ingredients from the storage apparatus 501 to a vehicle 790 in the transport system 302. The vehicle 790 in the transport systems 302 may move to a location next to the cooking apparatus 103 so that the food or food ingredients in the ingredient container on the vehicle 790 are dispensed into the cookware of the cooking apparatus 103 by the ingredient dispensing apparatus 301. The vehicle 790 of the transport systems 302 may move to a location next to the noodle making apparatus 870 so that doughs in the ingredient container on the vehicle 790 are dispensed into a cup of the noodle making apparatus 870 by the ingredient dispensing apparatus 301c. The timing of arrival of the vehicle 790 at said location is controlled by the computer system 99.

Figure 31A:
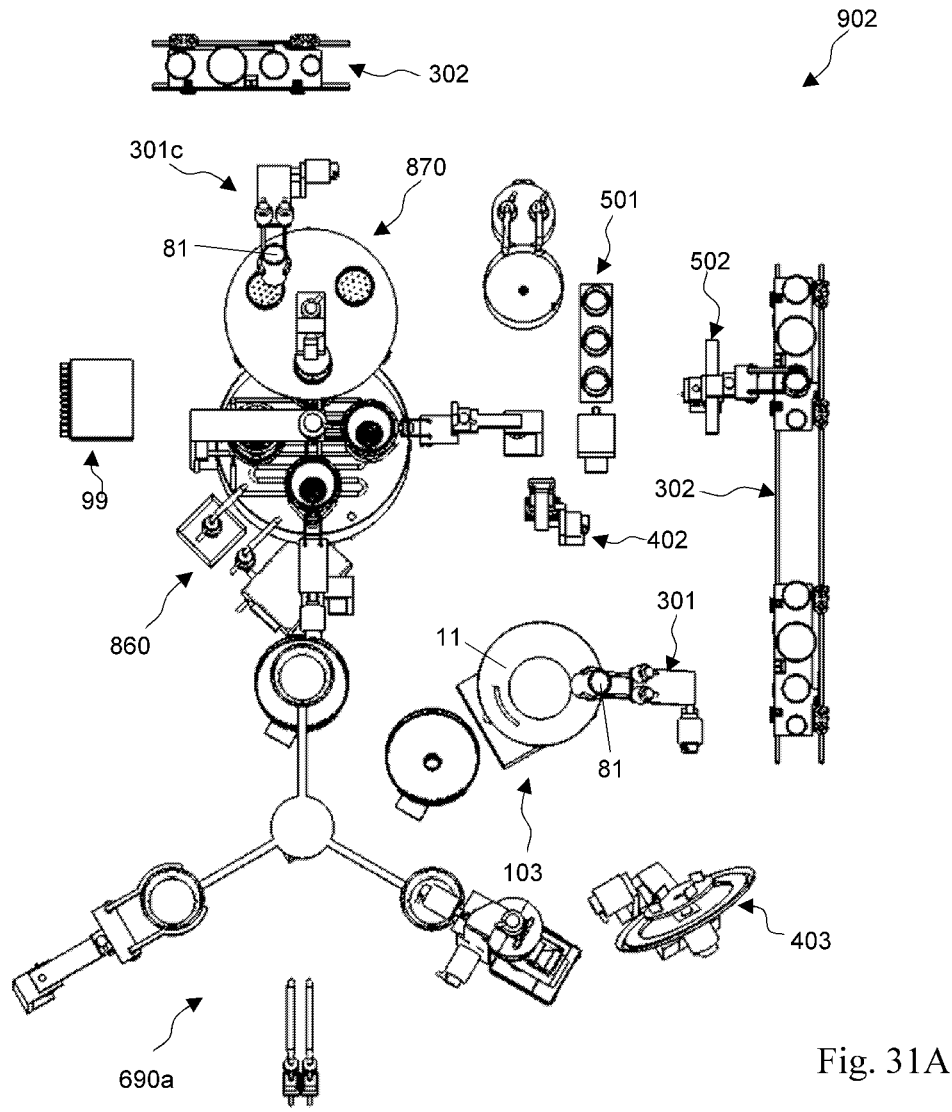
FIG. 31A shows an aerial view of the cooking system of FIG. 30 showing the dispensing of doughs from an ingredient container on a transport system into a cup with holes at bottom and showing the dispensing of food or food ingredients from an ingredient container on another transport system into the cookware.
Figure 31B:
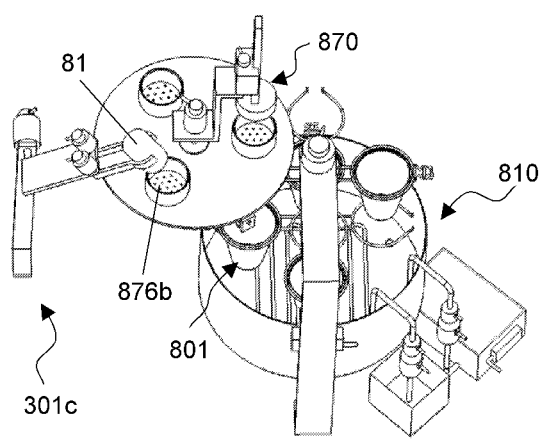
FIG. 31B shows an aerial view of a close-up view of the dispensing of doughs from an ingredient container on a transport system into a cup with holes at bottom.

As shown in FIGS. 31A-31B, the gripping devices of the ingredient dispensing apparatus 301c in the cooking system 902 may grip an ingredient container 81 containing doughs and then the gripping devices and the ingredient container are rotated to dispense doughs from the ingredient container 81 into a cup of the noodle making apparatus 870. The noodles produced by the noodle making apparatus 870 may be dispensed into a basket 801 of the cooking apparatus 860 held by a lower basket holder 811a. Meanwhile the basket 801 is at a certain position relative to the support component 349 of the ingredient dispensing apparatus 301c, and the noodles in the basket 801 may be fried, boiled, or otherwise cooked in the heated liquid in the liquid container 814 of the cooking apparatus 860, to produce a first cooked food. Then, the basket 801 is rotated to a certain position relative to the support component 829 of the transfer apparatus 820, and the transfer apparatus 820 may grip the basket 801 and move it to a certain position relative to the spraying and soaking apparatus 850, so that the first cooked food in the basket 801 may be immersed in a liquid in the liquid container 858 of the spraying and soaking apparatus 850, and the sprayer 851a of the spraying and soaking apparatus 850 can spray liquid on the first cooked food in the basket 801. Next, the transfer apparatus 820 may move the basket 801 and release it, to let the basket 801 be held by an upper basket holder 811b. The basket 801 may be left at this position for a period of time, to let the excessive liquid on the first cooked food drip down into the liquid container 814.

The gripping devices of the ingredient dispensing apparatus 301 may grip an ingredient container 81 containing food or food ingredients and then the gripping devices and the ingredient container are rotated to dispense the food or food ingredients from the ingredient container 81 into the cookware 11 of the cooking apparatus 103 (see FIG. 10). Meanwhile the cookware 11 is at a certain position relative to the support component 349 of the ingredient dispensing apparatus 301; and the motion mechanism 104 of the cooking apparatus 103 may move the cookware 11 of the cooking apparatus 103 to stir or mix the food or food ingredients in the cookware 11, to produce a second cooked food.

It should be noted that the gripping devices of the ingredient dispensing apparatus 301c may also be moved to grip an ingredient container 81 containing doughs and then the gripping devices and the ingredient container are rotated to dispense doughs from the ingredient container 81 to a cup of the noodle making apparatus 870. The noodles produced by the noodle making apparatus 870 may be dispensed into a basket 801 which is held by an upper basket holder 811b. Then, the basket 801 is rotated to a certain position relative to the support component 829 of the transfer apparatus 820, and the transfer apparatus 820 may grip and move the basket 801 to a position so that the basket 801 can be held by a lower basket holder 811a. At this position, the noodles in the basket 801 are fried, boiled, or otherwise cooked in the heated liquid contained in the liquid container 814 of the cooking apparatus 860.

It should be noted that one may optionally configure the noodle making apparatus 870 to dispense the noodles into a basket 801 which is held by a lower basket holder 811a or an upper basket holder 811b.

Figure 32A:
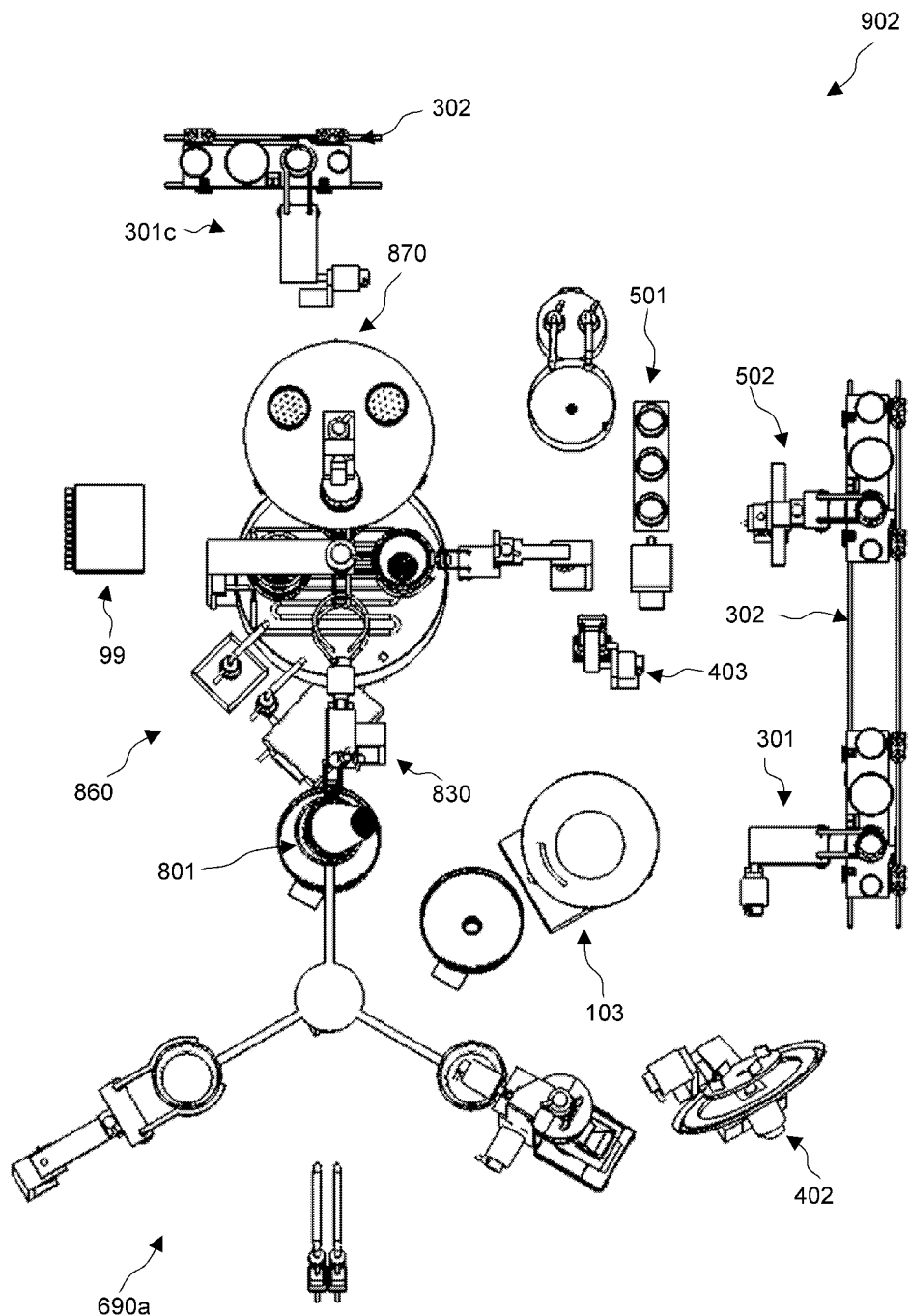
FIG. 32A shows an aerial view of the cooking system showing the dispensing of a cooked food from a cookware into a food container.
Figure 32B:
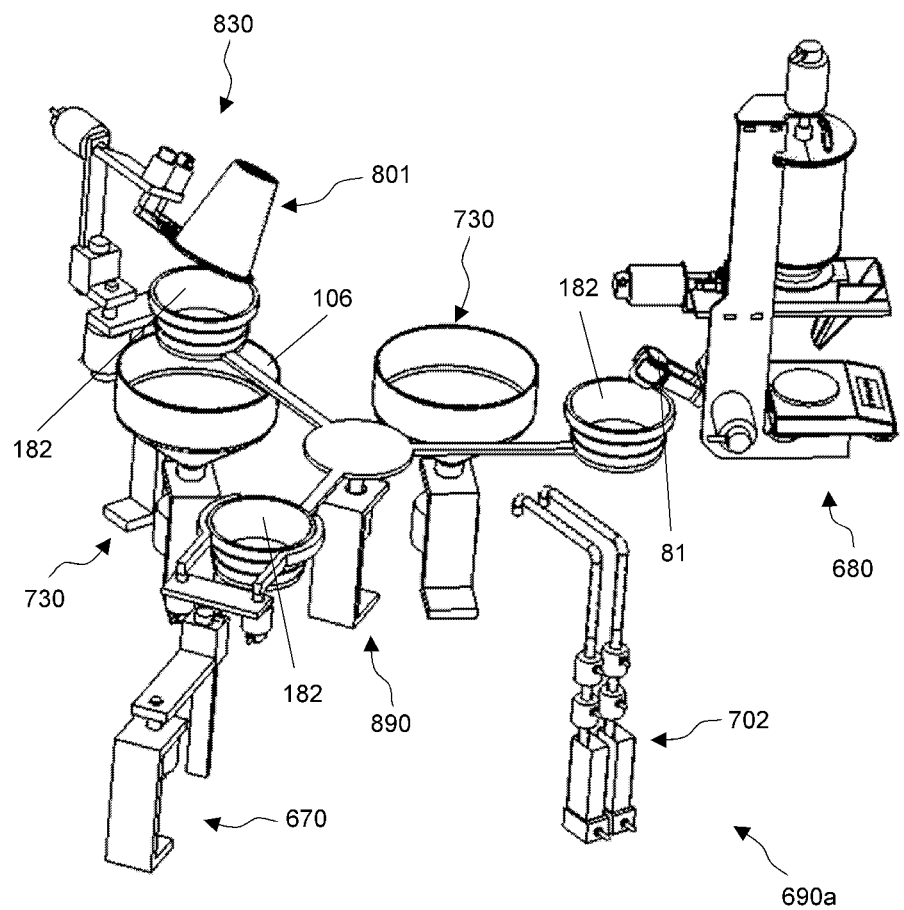
FIG. 32B shows an aerial view of the close-up view of the dispensing.
Figure 32C:
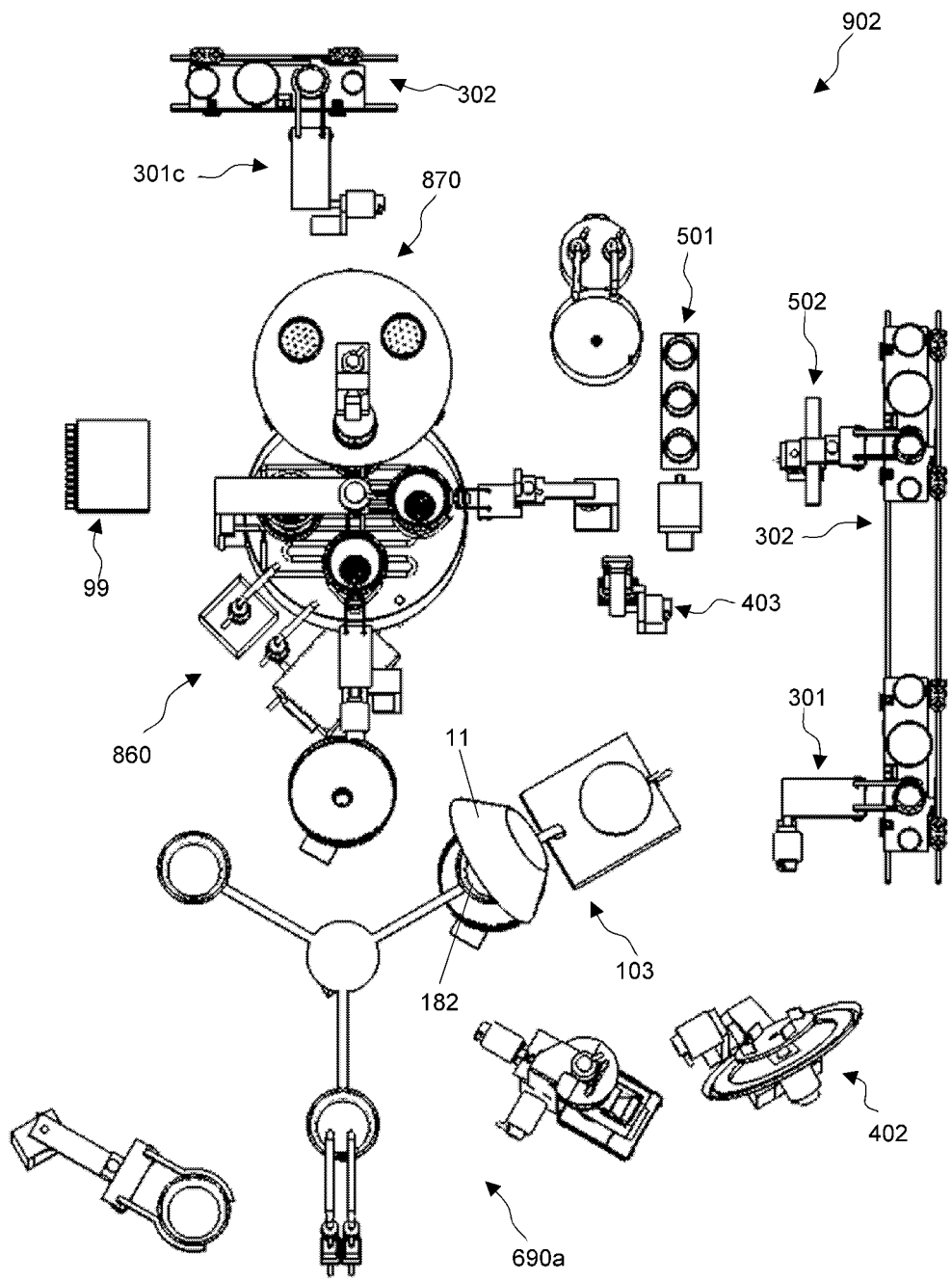
FIG. 32C shows an aerial view of the cooking system showing the dispensing of a cooked food from the cookware into a food container.
Figure 32D:
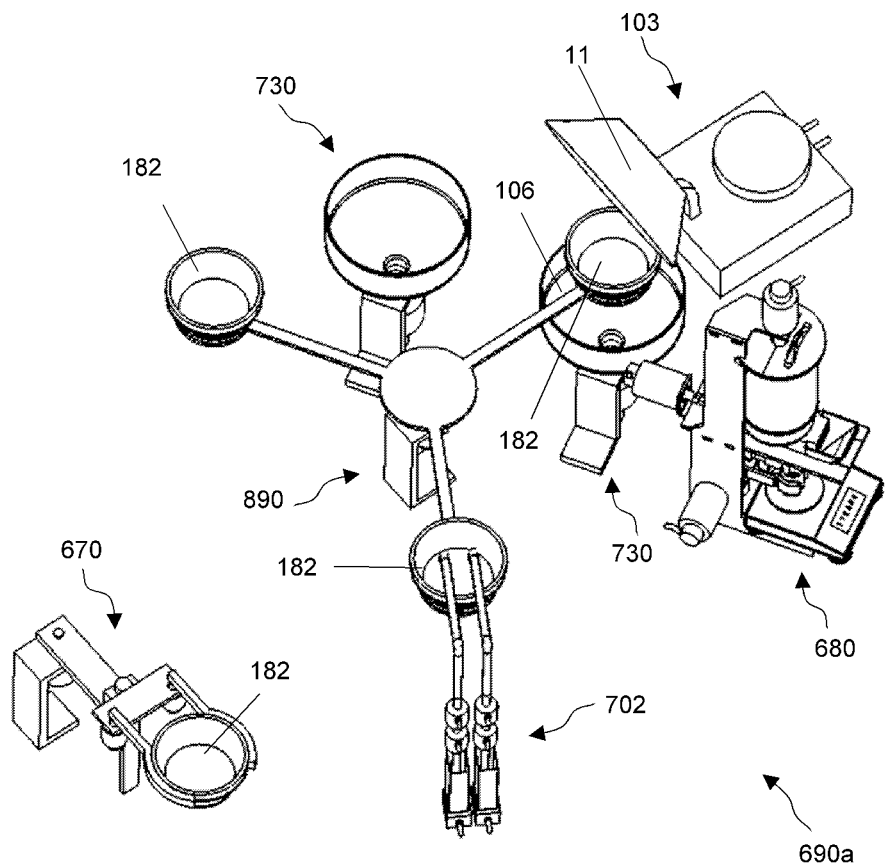
FIG. 32D shows an aerial view of the close-up view of the dispensing.

Then, as shown in FIGS. 32A-32D, when the basket 801 held by an upper basket holder 811b is rotated a certain position relative to the support component 842 of the food dispensing apparatus 830, and when a food container 182 in the transport apparatus 890 of the receiving system 690a is transferred to a position next to the food dispensing apparatus 830 where the food container 182 is positioned right above the sink 106 of a wastewater disposal apparatus 730, the food dispensing apparatus 830 may grip and move the basket 801 and turn it over, so that the first cooked food contained in the basket 801 may be dispensed into the food container 182 (see FIG. 32B). Then, the transport apparatus 890 of the receiving system 690a rotates the food container 182 to a position next to the cooking apparatus 103 where the food container 182 is positioned right above the sink 106 of another wastewater disposal apparatus 730, and then the motion mechanism 104 of the cooking apparatus 103 can rotate the cookware 11 to dispense a cooked food from the cookware 11 to the food container 182 (see FIG. 32D). The transport apparatus 890 of the receiving system 690a rotates the food container 182 to a position next to the ingredient dispensing apparatus 680, the ingredient dispensing apparatus 680 may grip an ingredient container 81 containing food or food ingredients and then rotate the ingredient container to dispense the food or food ingredients from the ingredient container 81 into the food container 182. Then the transport apparatus 890 of the receiving system 690a rotates the food container 182 to a position next to the liquid dispensing apparatus 702, the liquid dispensing apparatus 702 may dispense liquid food ingredients from the liquid container 714 to the food container 182. All these foods or food or food ingredients dispensed into the food container 182 may together form a food product that can be served to customers. Then the transfer apparatus 670 can transfer said food container 182 from the transport apparatus 890 to a transport apparatus or a vehicle, and said transport apparatus or vehicle may move said food container 182 to an area accessible by humans.

The cooking apparatus 860 in the cooking system 902 is referred to as a first cooking apparatus and the basket 801 may be referred to as a first cookware. The first cooking apparatus 860 comprises: a cooking apparatus 810; a transfer apparatus 820; a food dispensing apparatus 830; and a spraying and soaking apparatus 850. The food dispensing apparatus 830 may move and turn the basket 801 to dispense a first cooked food from the basket 801 of the cooking apparatus 860 into a food container 182.

The cooking apparatus 103 in the cooking system 902 may be referred to as a second cooking apparatus. Said second cooking apparatus 103 comprises a motion mechanism comprising: a stirring motion mechanism, referred to as a first motion mechanism; and an unloading motion mechanism, referred to as a second motion mechanism. The stirring motion mechanism can move the cookware 11 of the second cooking apparatus 103 to stir or mix the food or food ingredients in the cookware 11 of the second cooking apparatus 103 during a cooking process. The unloading motion mechanism may rotate and turn the cookware 11 to dispense a second cooked food from the cookware 11 into a food container 182 in the transport apparatus 890 of the receiving system 690*a*.

The computer system 99 is connected to the mechanisms and apparatuses 103, 402, 403, 301, 301*c*, 860, 870, 501, and 502. The computer system 99 is also connected to the transport system 302 to control the movements of the vehicles 790 of the transport system 302, and the computer system 99 is also connected to the receiving system 690*a* to control the movements of the food container 182 in the transport apparatus 890 of the receiving system 690*a*.

It should be noted that in the cooking system 902, the food container 182 can be moved by the transport apparatus 890 of the receiving system 690*a* to a position next to the first cooking apparatus to receive a cooked food by the first cooking apparatus and then to a position next to the second cooking apparatus as to receive a cooked food by the second cooking apparatus. There is not a strict requirement on the sequence of receiving the cooked food.

In the cooking system 902, the cooking apparatus 860 is positioned near the following mechanisms and apparatuses: the receiving system 690*a*; the cooking apparatus 103; and the noodle making apparatus 870 which is also next to the ingredient dispensing apparatus 301*c*. The cooking apparatus 103 is positioned near the following mechanisms and apparatuses: the cleaning apparatus 402; the liquid dispensing apparatus 403; the ingredient dispensing apparatus 301 which is also next to the transport system 302; and the cooking apparatus 860.

The computer system 99 comprises a memory. The computer system configured to store various data in the computer system's memory.

As shown in FIG. 33, the following tasks are performed by the computer system 99 prior to the operation of the cooking system 902.

In Step 731, the computer system 99 stores (in the computer system's memory) a program, configured to send or receive signals to and from the motion mechanisms, inductive stoves, temperature sensors and pumps of the cooking system 902.

In Step 732, a database is installed in the computer system 99.

In Step 733, each of the cooking apparatuses, liquid dispensing apparatuses, ingredient dispensing apparatuses, transport system, and cleaning apparatus are assigned a unique ID. The computer system 99 stores the IDs of these apparatuses and mechanisms.

In Step 734, the computer system 99 stores the information of the structure of each vehicle of the transport system 302, including the ingredient container types that can be placed on the holders of the vehicle.

In Step 735, the computer system 99 stores programs for controlling the transport system 302 and the receiving system 690*a*. The programs are configured to control a vehicle of the transport system 302 so that the vehicle may move and stop at a pre-scheduled time at a position near the cooking apparatus 103 (or respectively 860) of the cooking system 902, where an ingredient container on a given holder of the vehicle is at a dispensing position relative to the cooking apparatus 103 (or respectively 860). The programs are also configured to control the transport apparatus 890 of the receiving system 690*a* so that a food container may move and stop at a pre-scheduled time at a position where a food container on a holder of the transport apparatus 890 is at a receiving position relative to the cooking apparatus 860 or 103, the ingredient dispensing apparatus 680 and the liquid dispensing apparatus 702.

In Step 736, the computer system 99 stores a list of foods which may be cooked by the cooking system 902.

In Step 737, for each food item in the list of Step 736, the computer system 99 stores a cooking program configured to control the motion mechanisms, inductive stoves, pumps, and devices in the cooking system 902.

In Step 738, for each food item in the list of Step 736, the computer system 99 stores types and quantities of food or food ingredients, relative timing of their dispensing and the respective ID of the destination cooking apparatus for each ingredient to be dispensed into; wherein the relative timing refers to the timing relative to the timing of the program of Step 737 corresponding to the food. Food or food ingredients contained in an ingredient container are to be dispensed into a basket or cookware in the destination cooking apparatus or a food container of the receiving system 690*a*.

Figure 34:
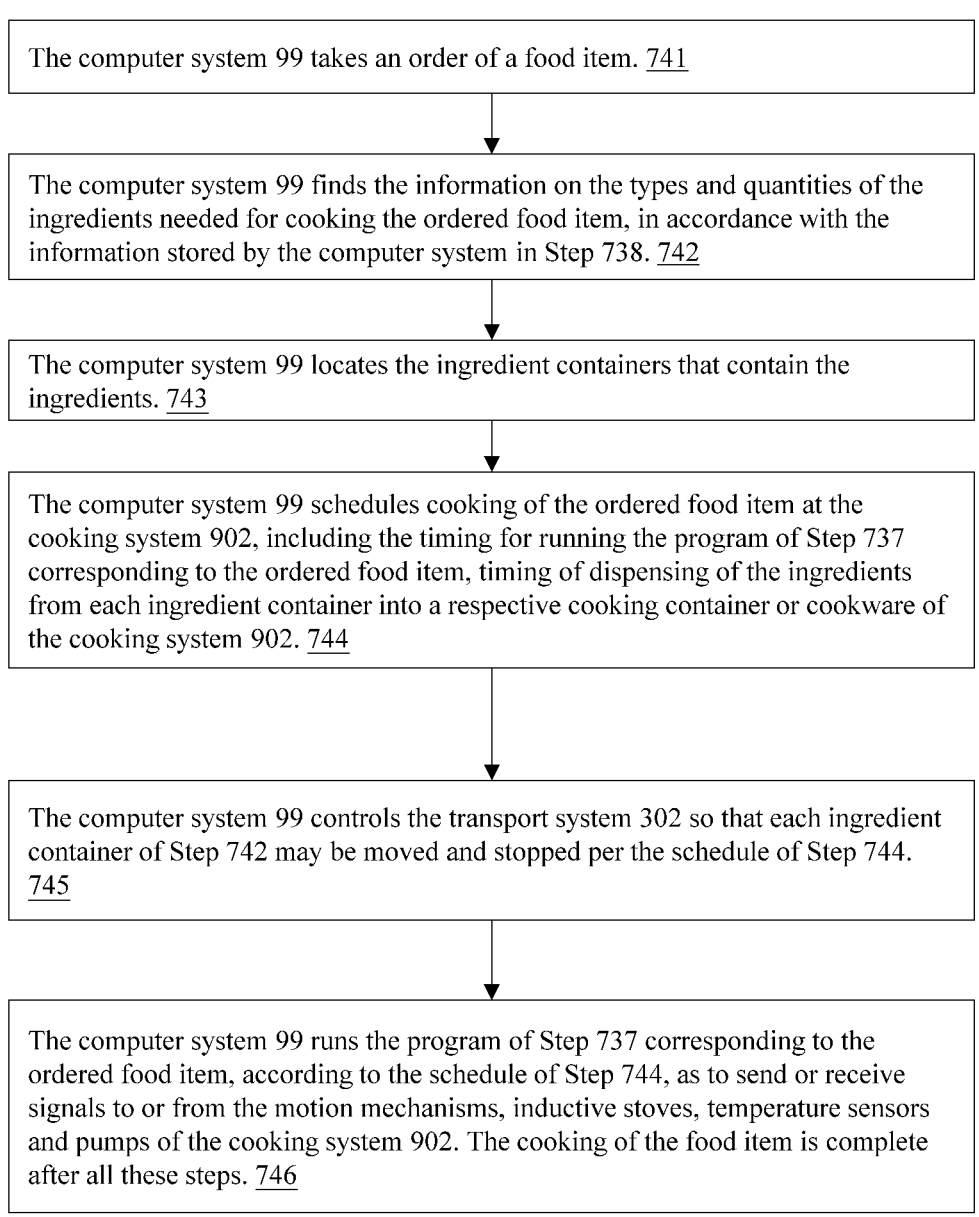
FIG. 34 is a flow chart showing the procedures of the computer system in the cooking system of FIG. 30 during the cooking of a food.

Referring to FIG. 34, the following tasks are routinely performed by the computer system 99 during the operation of the cooking system 902.

In Step 741, the computer system 99 takes an order of a food item. The order may be placed by a human either at the computer system 99, or at a computer which sends the order to the computer system 99.

In Step 742, for the ordered food item of Step 741, the computer system 99 finds the information on the types and quantities of the ingredients needed for cooking the ordered food item. Such information was stored by the computer system 99 in Step 738.

In Step 743, the computer system 99 locates the ingredient containers that contain the food or food ingredients found in Step 742. The ingredients may be dispensed from some larger containers into said ingredient containers. Alternatively, ingredients may already be in the ingredient containers, and their locations stored in the memory of the computer system 99.

In Step 744, the computer system 99 schedules the cooking of the ordered food item at cooking system 902. The schedule includes the timing for running the program of Step 737 corresponding to the ordered food item. The schedule also includes the timing of dispensing of the ingredients from each ingredient container into a cookware or a basket of the cooking system 902, in accordance with the stored information by the computer system 99 in Step 738.

In Step 745, the computer system 99 controls the transport system 302 so that each ingredient container of Step 742 may be moved and stopped per the schedule of Step 744.

In Step 746, the computer system 99 runs the program of Step 737 corresponding to the ordered food item, according to the schedule of Step 744, to send or receive signals to or from the motion mechanisms, inductive stoves, temperature sensors and pumps of the cooking system 902.

After all these steps, the cooking of the food item, including dispensing of the semi cooked foods and other ingredient to a food container, is complete.

Figure 35:
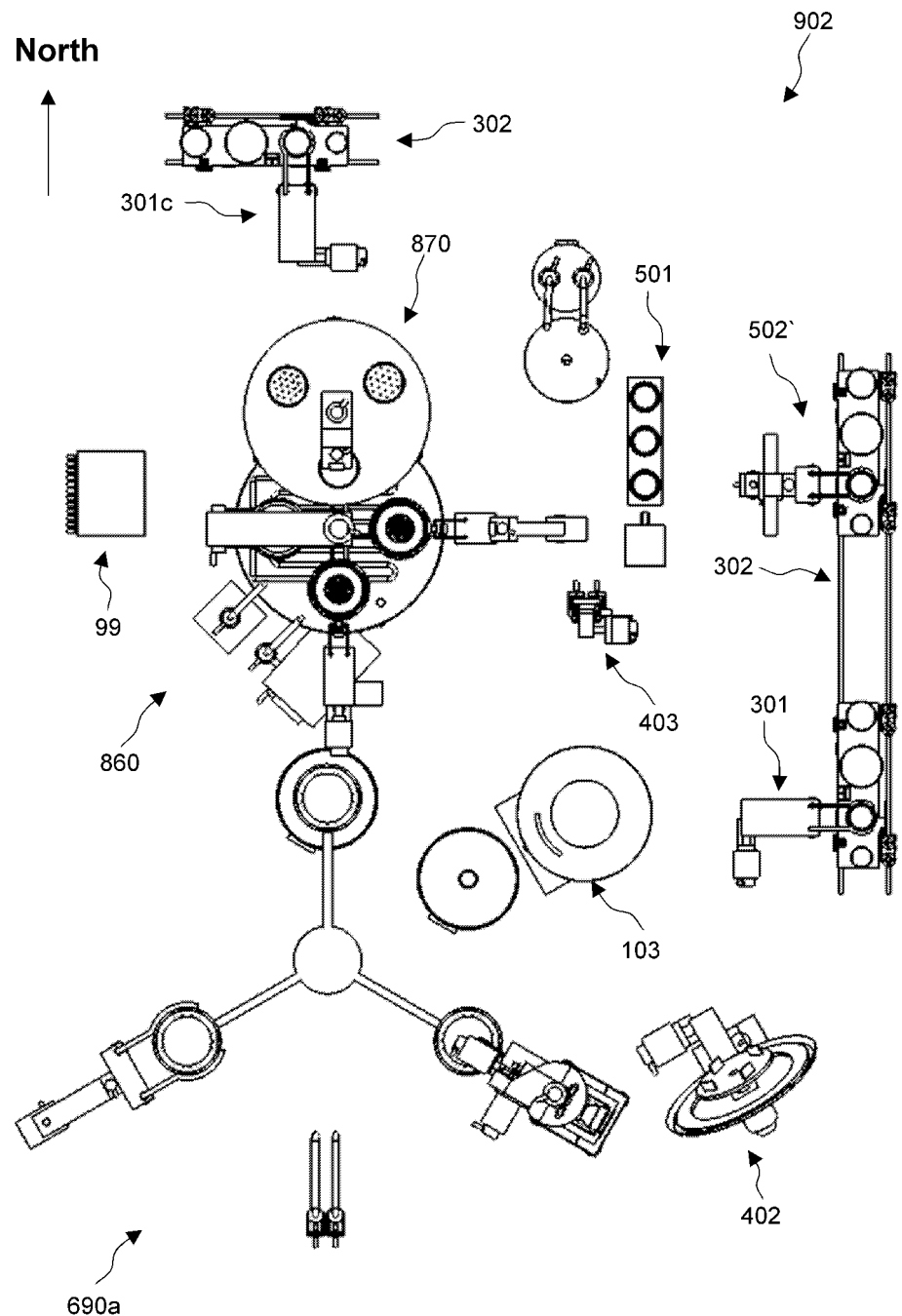
FIG. 35 shows a plan view of a positioning of various mechanisms and apparatuses in the cooking system of FIG. 30.

The 3-dimensional positioning of these mechanisms and apparatuses in the cooking system 902 can be done in various ways. For example, the receiving system 690*a* and the noodle making apparatus 870 may be respectively positioned on the southern, and northern sides of the first cooking apparatus 860, and the ingredient dispensing apparatus 301 may be positioned in the southeastern side of the first cooking apparatus 860. The cleaning apparatus 402, the second cooking apparatus 103 and the liquid dispensing apparatus 403 may be positioned on the southeastern of the first cooking apparatus 860; see FIG. 35.

It should be noted that the cooking apparatus 810 of the cooking apparatus 860 may be configured to comprise only lower basket holders 811*a* but not upper basket holders 811*b*.

The transport system 302 may be substituted by another transport system to move ingredient containers; e.g., a transport system comprising a robot arm.

The ingredient dispensing apparatuses 301 and 301*b* (or 301 and 301*c*) may be combined into one. The ingredient dispensing apparatuses may be substituted by mechanisms each comprising a robot arm.

It should be noted that the ingredient dispensing apparatuses 301, 301*b*, and 301*c*, and the food dispensing apparatus 830, may be substituted by another type of dispensing apparatus, such as the robotic apparatus 222 (of FIG. 7), which is a combination of robot arm and robot fingers. Similarly, the motion mechanism 104 of the cooking apparatus 103 may be substituted by the robot arm 218 (of FIG. 2I), wherein the moving member 217*b* is fixedly connected to the cookware 11. The transfer apparatus 820 or 670 may be substituted by the robotic apparatus 222.

It should be noted that the transport system 302 in the above cooking systems may comprise a single connected system or a plurality of disconnected sub-systems. The transport system may comprise different types of vehicles. The ingredient containers may be configured differently for different types or quantities of ingredients.

The transport system 302 may be substituted by a transport system comprising a cyclic motion mechanism, a turntable or rotatable rigid component, a chain fixed to chain wheels, or a conveyor mechanism, etc.

In the cooking system 901 (or 902), the ingredient dispensing apparatuses 301 and 301*b* (or 301 and 301*c*) may be configured differently. Two or more ingredient dispensing apparatuses may be substituted by a single ingredient dispensing apparatus which may dispense food or food ingredients into any of the cookware, baskets or food containers; wherein said ingredient dispensing apparatus may comprise a robot arm configured to move an ingredient container.

The container holders of the vehicles of the transport system 302 may be configured to have different sizes. The ingredient containers 81 on different holders may be configured to have different sizes. The transport system 302 may comprise two or more sub-systems which are not connected to each other, and the vehicles may be configured differently on different sub-systems.

It should be noted that the drawings in the present patent application are schematic and may not be to scale. The distances between various mechanisms and apparatuses may not be drawn to scale. The 3-dimensional positioning of various mechanisms and apparatuses in a cooking system may be done in various other ways.

For the purpose of the present patent application, the terms "cookware" and "cooking container" have the same meaning.

The baskets in our cooking system may be substituted by other types of cooking containers that are "porous" in the sense that oil can leak out from the cooking container.

A motor may be an AC or DC motor, stepper motor, servo motor, inverter motor, pneumatic or hydraulic motor, etc. A motor may optionally further comprise a speed reducer, encoder, and/or proximity sensor.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination.

A rigid component described in the present patent application can be any type of solid component which has some degree of rigidity in an application, and there is no strict or quantitative requirement for the degree of rigidity. It should be noted that there is no perfect rigid component in our world, as there are always elastic, thermal, and other deformations in any physical subject. A rigid component may comprise one or more of the following: a bar, a tube, a beam, a plate, a board, a frame, a structure, a bearing housing, a shaft. A rigid component can be made of metal such as steel or aluminum, or a mixture of metals, an alloy, a reasonably rigid plastic, wood, or other materials, or a combination of different types of materials.

Similarly, a rigid connection of two or more components can be a connection which has some degree of rigidity in an application, and there is no strict quantitative requirement for the degree of rigidity. A rigid connection may be a welding of two or more metal components. A rigid connection may be a bolting of two or more components; and so on. Clearly, a typical connection of a shaft and a bearing housing by a bearing (and accessories), for example, is not a rigid connection, since the shaft can rotate relative to the bearing housing.

Most common bearings are ball bearings and roller bearings. However, a bearing in the present patent application can be of any type.

A support component described in the present patent application can be any type of rigid component. A support component may be moved or fixed relative to the ground.

Only a few examples and implementations are described. Other implementations, variations, modifications and enhancements to the described examples and implementations may be made without deviating from the spirit of the present invention. For example, the term cookware is used to generally refer to a device for containing or holding food or food ingredients during cooking. For the purpose of present patent application, a cookware can be a wok, a pot, a pan, a basket, a bowl, a dish, a container, a board, a rack, a net, a mesh, or any object used to contain or otherwise hold food or food ingredients during a cooking process. The cooking also is not limited to any particular ethnic styles. The cooking may include but is not limited to: frying (including stir frying), steaming, boiling, roasting, baking, smoking, microwaving etc. The cooking apparatus may or may not use a heater.

Similarly, a food container, ingredient container, or container, can be a bowl, a plate, a cup, ajar, a bottle, a flat board, a basket, a net, a wok, a pan, or any object used to contain or otherwise hold a food or food ingredients. A container can have a rather arbitrary geometric shape. It is possible that different ingredient containers may have different shapes. It is possible that different food containers may have different shapes. It is possible that different cooking containers may have different shapes. It is possible that different cookware may have different shapes.

A gripper is a device used to touch and grip an object such as a container. A gripper can be a rigid or elastic object as in FIGS. 6A-6E. In this patent application, a gripper may be pneumatic gripper, which is an actuating device that uses compressed air as power to pinch or grip an object. A gripper may be a vacuum chuck.

A gripping mechanism can be any mechanism that can be used to grip an object. A gripping mechanism may optionally comprise a gripper such as a vacuum chuck. A gripping mechanism may optionally comprise a plurality of rigid or elastic grippers which are moved to grip an object. A gripping mechanism may optionally comprise a robot hand. In fact, a robot hand may be used as a gripping mechanism for our purposes.

A motion mechanism can be any mechanism that can be used to produce a movement of an object, which may be a component of the motion mechanism or an object that is rigidly or fixedly connected to a component of the motion mechanism. A motion mechanism may produce a linear motion of a component. A motion mechanism may produce a rotation of a component. A motion mechanism may comprise a robot arm. A motion mechanism may be a combination motion mechanism comprising a plurality of motion sub-mechanisms. A motion mechanism may comprise: a crank rod mechanism; eccentric motion mechanism; etc. A motion mechanism may comprise one or more the following parts: motor; encoder; shaft; coupling; bearing housing; bearings and accessories; gear and rack; screw rod and screw nut; cylinder; hydraulic cylinder; electromagnet; cam; eccentric shaft; Geneva mechanism, etc. Motion mechanisms can be more complex and the motions produced by a motion mechanism can be a planar motion, a spherical motion, an oscillatory or vibratory motion; see e.g., U.S. patent application Ser. Nos. 16/997,196, 15/706,136 (in this application a motion mechanism may be referred to as a transport mechanism), Ser. Nos. 15/801,923, and 15/798, 357. The entire contents of the above applications are hereby incorporated herein by reference.

It should be noted that the linear motion produced by the linear motion mechanism may be a linear motion between two end-positions or a linear motion with multiple stop positions. Any robot arm may be used as a motion mechanism for our purposes.

A transfer apparatus can be any apparatus that can be used to transfer an object (such as a container) from one position to another. A transfer apparatus may comprise: a gripping mechanism comprising a support component and one or more grippers; and a combination motion mechanism which is a combination of a plurality of motion sub-mechanisms, said combination motion mechanism being configured to move the support component of the gripping mechanism. A transfer apparatus may comprise a robot arm and a gripping mechanism. A robotic apparatus comprising a combination of a robot arm and a robot hand may be used as a transfer apparatus for our purposes.

An ingredient dispensing apparatus can be any apparatus that can be used to dispense food or food ingredients from an ingredient container into a cookware. A typical dispensing apparatus of food or food ingredients may comprise: a gripping mechanism configured to grip an ingredient container, and a motion mechanism configured to move a (support) component of gripping mechanism. There are more examples in U.S. Pat. No. 10,455,987 and U.S. patent application Ser. No. 15/798,357. In particular, a robotic apparatus comprising a robot hand and robot arm may be used as an ingredient dispensing apparatus. This is often used in prior art.

A food dispensing apparatus can be any apparatus that can be used to dispense a cooked (or semi-cooked) food from a cookware into another container. A food dispensing apparatus may comprise a motion mechanism which moves the cookware. A food dispensing apparatus may alternatively comprise a robotic apparatus comprising a robot arm and a robot hand that moves the cookware, and this is often the case when the cookware is not fixedly attached to another (relatively heavy) mechanism.

There is a difference between transfer apparatus and ingredient (or food) dispensing apparatus, as follows. A dispensing apparatus needs to turn (or rotate) a gripped container upside down or by some angle of say, 90 to 180 degrees, to dispense the food or food ingredients contained in the container into another container. In comparison, a transfer apparatus does not need to turn (or rotate) a gripped container, since the food or food ingredients are not to be dispensed from the container. Indeed, it is advantageous (though not always a strict requirement) for the transfer apparatus to keep the gripped container in an upright or nearly upright position, to not let the food or food ingredients drop out. Even if the container is sealed by a lid, there is no need for the food or food ingredients to touch the lid.

Each vertical motion mechanism as described above may be substituted by a motion mechanism which can produce a linear or non-linear motion in an upward or downward direction, where an upward direction needs not to be exactly vertical. It can have an inclination angle between 0 and 90 degrees. The same applies to each horizontal motion mechanism described above.

A liquid dispensing apparatus can be any apparatus that can be used to dispense a liquid ingredient from a container into a cookware. A liquid dispensing apparatus may comprise liquid pipes, a liquid pump, a valve, and/or flow sensors, etc. There are more examples in U.S. Pat. No. 10,455,987.

A cooking apparatus can be any apparatus comprising a cookware. A cooking apparatus may optionally further comprise a motion mechanism configured to move the cookware. The motion mechanism may optionally comprise a motion sub-mechanism configured to move the cookware to stir food or food ingredients in the cookware. The motion mechanism may optionally comprise a motion sub-mechanism configured to move the cookware to dispense a cooked (or semi-cooked) food from the cookware. A cooking apparatus may optionally comprise a transfer apparatus configured to move the cookware. Said transfer apparatus may optionally grip and turn the cookware to dispense a cooked (or semi-cooked) food from the cookware. Examples of cooking apparatuses are given in U.S. Pat. No. 10,455,987 and U.S. patent application Ser. Nos. 16/997,196, 15/706,136, 16/155,895, 15/801,923, and 15/869,805, the entire disclosures of which are hereby incorporated herein by reference.

A cleaning apparatus can be any apparatus that can be used to clean an object, e.g., a funnel, or a container such as cookware, food container, or ingredient container. A cleaning apparatus comprises a liquid source (e.g., tap water, or a water tank) and a liquid pipe to transfer the liquid from the source to the object; wherein the liquid flow may be controlled by a valve, a liquid pump, and/or by other known techniques; wherein the liquid may be referred to as a cleaning liquid, such as hot water, for the purpose of cleaning the object. In some applications, the liquid may be sprayed on the object at high speed but this is not a requirement. A cleaning apparatus may optionally further comprise a stirrer which is rotated to stir the cleaning liquid in the object, e.g., a container, which is cleaned by the cleaning apparatus. A cleaning apparatus may optionally comprise a motion mechanism configured to move the water pipes and stirrers away from or towards the object, which is cleaned or to be cleaned by the cleaning apparatus.

A transport system can be any system that can be used to transfer a container (such as an ingredient container, a food container, a cookware, or a cooking container). In some applications (but not always), a transport system can move a container after said container is placed on a member of the transport system. For example, a transport system may include a plurality of vehicles each configured to carry and transport a container; wherein the vehicles may optionally move on rail tracks. A transport system may optionally comprise a rotating turntable, or a cyclic motion mechanism, a chain, and/or a belt. Examples of transport system are given in U.S. Pat. No. 10,455,987 and U.S. patent application Ser. Nos. 15/798,357, 16/997,933, and 16/155,895, the entire disclosures of which are hereby incorporated herein by reference. A transport system may only comprise a transfer apparatus.

A container holder is a solid which has an adequate shape so as to position or hold a container of a certain shape.

A container transfer apparatus can be any transfer apparatus used to move a container to a (different) member of a transport system. The container transfer apparatus can optionally be a part of said transport system.

A heater for the purpose of cooking in the known technique may substitute any stove and heater disclosed in the present application.

What is claimed is:

1. A cooking system comprising:
a first cooking apparatus comprising:
a plurality of basket holders, wherein one of the plurality of basket holders is configured to position or hold a basket wherein the basket is used to contain or hold one or more foods or food ingredients; wherein the plurality of basket holders are configured to be rigidly, fixedly, or otherwise connected to each other;
a first motion mechanism configured to move the plurality of basket holders, said first motion mechanism comprising a motor or an actuator;
a liquid container configured to contain a cooking liquid, wherein the cooking liquid is used to fry, boil, or otherwise cook the one or more foods or food ingredients contained or held by the basket while the basket is positioned or held by the basket holder; and
a heater configured to heat the cooking liquid in the liquid container; and
a first dispensing apparatus configured to grip and move the basket to dispense the one or more cooked foods or food ingredients from the basket to a food container, wherein the basket was positioned or held on one of the plurality of basket holders prior to the dispensing, wherein the food container is used to hold one or more cooked foods, said first dispensing apparatus comprising:
a gripping mechanism comprising a support component and one or more grippers, said gripping mechanism being configured to grip the basket; and
a second motion mechanism configured to move the support component of the gripping mechanism, said second motion mechanism comprising a motor; and
a second cooking apparatus comprising:
a cookware configured to contain or otherwise hold one or more foods or food ingredients; and
a third motion mechanism comprising a motor, said third motion mechanism being configured to move the cookware as to dispense a cooked food from the cookware to the food container.

2. The cooking system of claim 1, further comprising a first ingredient dispensing apparatus configured to grip and move an ingredient container as to dispense one or more food ingredients to the cookware of the second cooking apparatus, wherein the ingredient container is used to contain or hold the food ingredients prior to the dispensing, said first ingredient dispensing apparatus comprising:
a gripping mechanism comprising a support component and one or more grippers, said gripping mechanism being configured to grip the ingredient container; and
a fourth motion mechanism comprising a motor, said fourth motion mechanism being configured to move the support component of the gripping mechanism.

3. The cooking system of claim 1, further comprising a second ingredient dispensing apparatus configured to grip and move an ingredient container as to dispense one or more food ingredients to the basket when the basket is positioned or held by one of the plurality of basket holders of the first cooking apparatus, wherein the ingredient container is used to contain or hold the food ingredients prior to the dispensing, said second ingredient dispensing apparatus comprising:
a gripping mechanism comprising a support component and one or more grippers, said gripping mechanism being configured to grip the ingredient container; and
a fifth motion mechanism comprising a motor, said fifth motion mechanism being configured to move the support component of the gripping mechanism.

4. The cooking system of claim 1, wherein the gripping mechanism of the first dispensing apparatus comprises one or more robot fingers, wherein the second motion mechanism of the first dispensing apparatus comprises a robot arm.

5. The cooking system of claim 1, further comprising a transfer apparatus configured to move the food container as to receive the one or more cooked foods or food ingredients produced by the first cooking apparatus, wherein the transfer apparatus is configured to move the food container as to receive the cooked food produced by the second cooking apparatus, wherein the transfer apparatus comprises:
  a gripping mechanism comprising a support component and one or more grippers, said gripping mechanism being configured to grip the food container; and
  a sixth motion mechanism comprising a motor, said sixth motion mechanism being configured to move the support component of the gripping mechanism.

6. The cooking system of claim 1, further comprising a transport apparatus configured to move the food container as to receive the one or more cooked foods or food ingredients produced by the first cooking apparatus, wherein the transport apparatus is configured to move the food container as to receive the cooked food produced by the second cooking apparatus, wherein the transport apparatus comprises:
  a container holder comprising a solid shape configured to position or hold the food container; and
  a seventh motion mechanism comprising a motor, said seventh motion mechanism being configured to move the container holder.

7. The cooking system of claim 1, further comprising a cleaning apparatus configured to clean the cookware of the second cooking apparatus, said cleaning apparatus comprising one or more pipes configured to flow cleaning water into the cookware.

8. The cooking system of claim 1, further comprising a transport system configured to move the food container.

9. The cooking system of claim 8, wherein the transport system comprises a vehicle.

10. The cooking system of claim 8, further comprising a loading apparatus configured to load the food container to the transport system.

11. The cooking system of claim 1, wherein the third motion mechanism of the second cooking apparatus comprises a robot arm.

12. The cooking system of claim 1, further comprising a noodle making apparatus configured to make noodles, wherein the noodles are configured to be dispensed into the basket when the basket is positioned or held by one of the plurality of basket holders.

13. The cooking system of claim 1, wherein the first motion mechanism of the first cooking apparatus is configured to cyclically move the plurality of basket holders.

14. The cooking system of claim 1, wherein the first motion mechanism of the first cooking apparatus is configured to rotate the basket holders.

15. A cooking system comprising:
  a first cooking apparatus comprising:
    a plurality of basket holders, wherein one of the plurality of basket holders is configured to position or hold a basket wherein the basket is used to contain or hold one or more foods or food ingredients, wherein the basket holders are configured to be rigidly, fixedly, or otherwise connected to each other;
    a first motion mechanism configured to move the plurality of basket holders, said first motion mechanism comprising a motor;
    a first liquid container configured to contain a cooking liquid, wherein the cooking liquid is used to fry, boil, or otherwise cook the one or more foods or food ingredients contained or held by the basket while the basket is positioned or held by the basket holder;
    a heater configured to heat the cooking liquid in the first liquid container; and
    a food dispensing apparatus configured to grip and move the basket to dispense the one or more cooked foods or food ingredients from the basket to a food container, wherein the food container is used to hold one or more cooked foods, wherein the basket is positioned or held by one of the plurality of basket holders prior to the dispensing, said food dispensing apparatus comprising:
      a gripping mechanism comprising a support component and one or more grippers, said gripping mechanism being configured to grip the basket; and
      a second motion mechanism comprising a motor said second motion mechanism being configured to move the support component of the gripping mechanism; and
  a liquid dispensing apparatus configured to dispense a liquid ingredient to the food container, said liquid dispensing apparatus comprising:
    a second liquid container configured to hold a liquid ingredient;
    one or more liquid pipes; and/or
    a liquid pump configured to pump a quantity of the liquid from the second liquid container to the food container.

16. The cooking system of claim 15, wherein the first motion mechanism of the first cooking apparatus is configured to cyclically move the basket holders.

17. The cooking system of claim 15, further comprising an ingredient dispensing apparatus configured to dispense a food ingredient to the food container, said ingredient dispensing apparatus comprising a double screw mechanism, the double screw mechanism comprising:
  a pair of screw shafts;
  a rotational motion mechanism configured to rotate the pair of screw shafts wherein the rotational motion mechanism comprises a motor.

18. The cooking system of claim 15, further comprising:
  an ingredient dispensing apparatus configured to grip and move an ingredient container as to dispense one or more food ingredients to the basket, wherein the ingredient container is used to contain or hold the food ingredients prior to the dispensing, said ingredient dispensing apparatus comprising:
    a gripping mechanism comprising a support component and one or more grippers, said gripping mechanism being configured to grip the ingredient container; and
    a third motion mechanism comprising a motor, said third motion mechanism being configured to move the support component of the gripping mechanism.

19. The cooking system of claim 18, wherein the gripping mechanism of the ingredient dispensing apparatus comprises one or more robot fingers, wherein the third motion mechanism of the ingredient dispensing apparatus comprises a robot arm.

20. A cooking system comprising a first cooking apparatus comprising:
  a plurality of first basket holders; wherein one of the first basket holders is configured to position or hold a basket wherein the basket is used to contain or hold one or more foods or food ingredients, wherein the plurality of first basket holders are configured to be rigidly, fixedly, or otherwise connected to each other;
  a plurality of second basket holders, wherein one of the second basket holders is also configured to position or hold the basket, wherein the plurality of second basket holders are configured to be rigidly, fixedly, or otherwise connected to each other;

a first motion mechanism configured to move the plurality of first basket holders, said first motion mechanism comprising a motor;

a liquid container configured to contain a cooking liquid which is used to fry, boil, or otherwise cook the one or more foods or food ingredients contained or held in the basket while the basket is positioned or held by the basket holder;

a heater configured to heat the cooking liquid in said liquid container; and a transfer apparatus configured to grip and move the basket between the first basket holder and the second basket holder, said transfer apparatus comprising:
- a gripping mechanism comprising a support component and one or more grippers, said gripping mechanism being configured to grip the basket; and
- a second motion mechanism comprising a motor, said second motion mechanism being configured to move the support component of the gripping mechanism.

21. The cooking system of claim 20, further comprising a food processing apparatus configured to make a noodle, a pasta, or other food, and to dispense the noodle, pasta, or other food into the basket when the basket was positioned or held by one of the plurality of first basked holders or the plurality of second basket holders.

* * * * *